United States Patent
Geng et al.

(10) Patent No.: US 9,993,015 B2
(45) Date of Patent: Jun. 12, 2018

(54) ICE CREAM MAKER

(71) Applicant: BREVILLE PROPERTY LIMITED, New South Wales (AU)

(72) Inventors: Bin Geng, Zetland (AU); Mark Thomas, Leichhardt (AU); Eddie Siu, Beaconsfield (AU); Lochana Subasekara Widanagamage Don, Caringbah (AU)

(73) Assignee: BREVILLE PTY LIMITED, Alexandria (AU)

( * ) Notice: Subject to any disclaimer, the term of this patent is extended or adjusted under 35 U.S.C. 154(b) by 39 days.

(21) Appl. No.: 14/903,588

(22) PCT Filed: Jul. 15, 2014

(86) PCT No.: PCT/AU2014/000720
§ 371 (c)(1),
(2) Date: Jan. 7, 2016

(87) PCT Pub. No.: WO2015/006802
PCT Pub. Date: Jan. 22, 2015

(65) Prior Publication Data
US 2016/0366906 A1    Dec. 22, 2016

(30) Foreign Application Priority Data

Jul. 16, 2013   (AU) .............................. 2013902626
Jul. 11, 2014   (AU) .............................. 2014902673

(51) Int. Cl.
*A23G 9/12*    (2006.01)
*A23G 9/04*    (2006.01)
(Continued)

(52) U.S. Cl.
CPC ................. *A23G 9/12* (2013.01); *A23G 9/04* (2013.01); *A23G 9/16* (2013.01); *A23G 9/22* (2013.01);
(Continued)

(58) Field of Classification Search
CPC .......... A23G 9/12; A23G 9/281; A23G 9/224; A23G 9/228; A23G 9/22; A23G 9/16;
(Continued)

(56) References Cited

U.S. PATENT DOCUMENTS 817,674 A  *  4/1906  Schmidt ................... A23G 9/12
                                                    366/230
898,048 A  *  9/1908  Hart ......................... A23G 9/12
                                                    366/149
(Continued)

FOREIGN PATENT DOCUMENTS

EP    1 524 196 A1    4/2005
EP    2 255 673 A1   12/2010
(Continued)

OTHER PUBLICATIONS

Examination Report for Australian Patent Application No. 2014292798, dated Apr. 4, 2017.
(Continued)

*Primary Examiner* — Emmanuel Duke
(74) *Attorney, Agent, or Firm* — Marshall, Gerstein & Borun LLP

(57) ABSTRACT

An apparatus for making a frozen dessert. The apparatus including a reservoir located within a chassis for receiving a liquid dessert mixture and a rotatable paddle located within the reservoir. The paddle can have a body coupled to at least one respective scraper element by a living hinge, such that the scraper element has a scraping edge that is radially-outward biased by the living hinge for abuttingly engaging
(Continued)

a wall of the reservoir. The reservoir and the axis of rotation can be substantially horizontally directed, with a substantially vertically-orientated lid closing an opening of the reservoir, the lid defining an aperture for receiving the mixture or enabling egress of the frozen dessert.

14 Claims, 68 Drawing Sheets

(51) Int. Cl.
    *A23G 9/16*     (2006.01)
    *A23G 9/22*     (2006.01)
    *B01F 7/00*     (2006.01)
    *B01F 15/06*     (2006.01)
    *H02P 7/03*     (2016.01)
    *B01F 7/04*     (2006.01)
    *B01F 15/00*     (2006.01)
    *H02P 5/68*     (2006.01)
    *A23G 9/28*     (2006.01)

(52) U.S. Cl.
    CPC ............ *A23G 9/224* (2013.01); *A23G 9/228* (2013.01); *A23G 9/281* (2013.01); *B01F 7/00075* (2013.01); *B01F 7/00208* (2013.01); *B01F 7/00583* (2013.01); *B01F 7/04* (2013.01); *B01F 15/00318* (2013.01); *B01F 15/00389* (2013.01); *B01F 15/00435* (2013.01); *B01F 15/00538* (2013.01); *B01F 15/065* (2013.01); *H02P 5/68* (2013.01); *H02P 7/03* (2016.02); *B01F 2015/061* (2013.01); *B01F 2215/0021* (2013.01); *H02P 2205/03* (2013.01); *H02P 2205/07* (2013.01)

(58) Field of Classification Search
    CPC .................. A23G 9/04; B01F 15/00435; B01F 15/00318; B01F 7/04; B01F 15/00538; B01F 15/00389; B01F 7/00583; B01F 15/065; B01F 7/00075; B01F 7/00208; B01F 2215/0021; B01F 2015/061; H02P 7/03; H02P 5/68; H02P 2205/07; H02P 2205/03

See application file for complete search history.

(56) References Cited

U.S. PATENT DOCUMENTS

| | | | |
|---|---|---|---|
| 2,141,045 A | | 12/1938 | Ruttiman |
| 4,732,013 A | * | 3/1988 | Beck ................. A23G 9/12 15/250.41 |
| 4,736,600 A | * | 4/1988 | Brown ............... A23G 9/12 222/146.6 |
| 5,199,278 A | * | 4/1993 | Cocchi .............. A23G 9/086 366/149 |
| 6,817,203 B1 | * | 11/2004 | Rischewski ........ A23G 9/12 165/94 |
| 2008/0173038 A1 | * | 7/2008 | Cocchi .............. A23G 9/045 62/342 |
| 2009/0280214 A1 | * | 11/2009 | Kim .................. A23C 9/1223 426/34 |
| 2010/0175565 A1 | * | 7/2010 | Jejcic ................ A23G 9/12 99/455 |

FOREIGN PATENT DOCUMENTS

| | | |
|---|---|---|
| GB | 191411068 A | 8/1914 |
| GB | 493624 A | 10/1938 |
| GB | 636370 A | 4/1950 |
| WO | WO-2007/119948 A1 | 10/2007 |
| WO | WO-2012/122594 A1 | 9/2012 |

OTHER PUBLICATIONS

Office Action for Chinese Patent Application No. 2014800491586.
Extended European Search Report for European Patent Application No. 14825760.3, dated Feb. 17, 2017.
International Search Report and Written Report for PCT/AU2014/000720, dated Sep. 19, 2014.
International Preliminary Report on Patentability for PCT/AU2014/000720, dated Jan. 19, 2016.

* cited by examiner

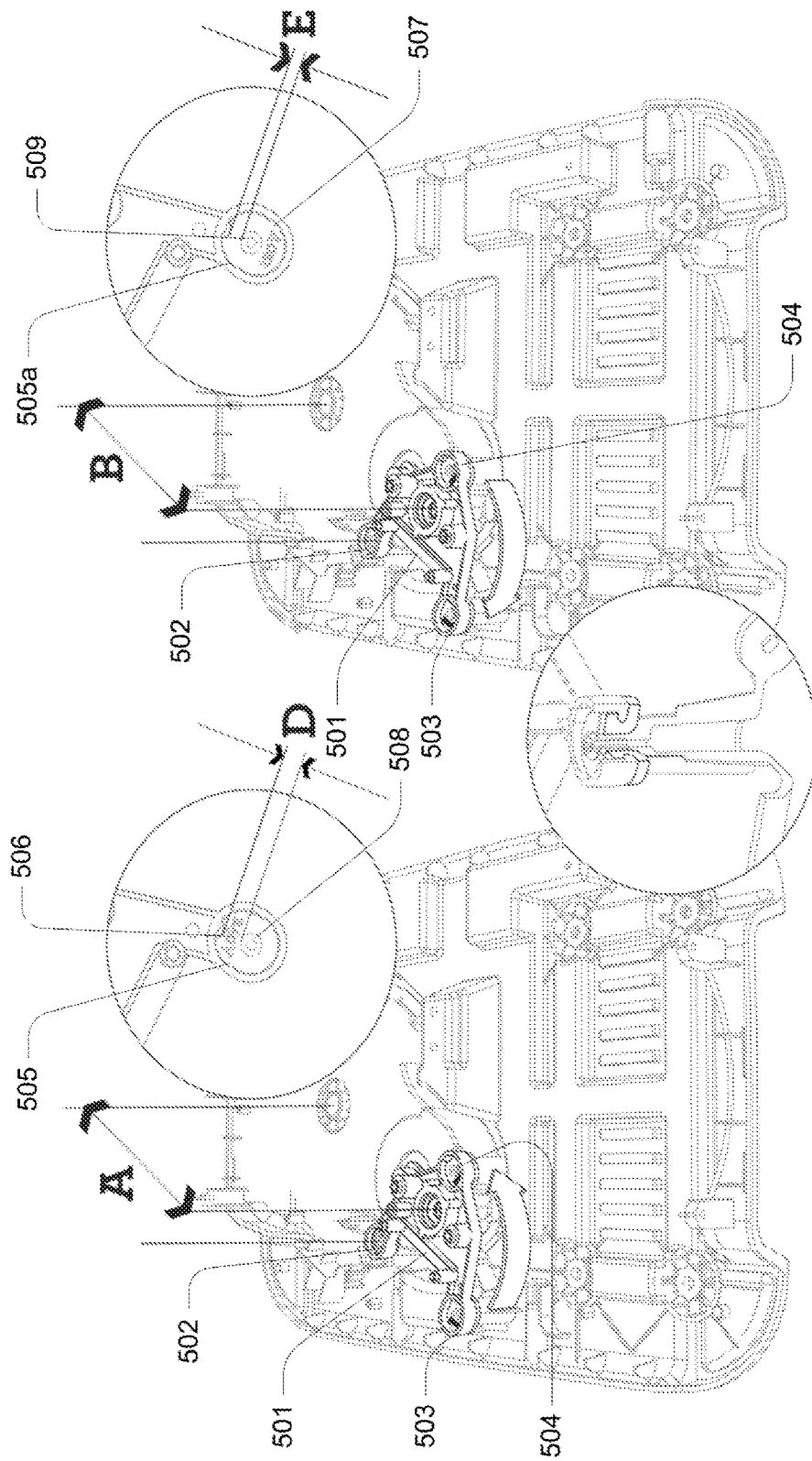

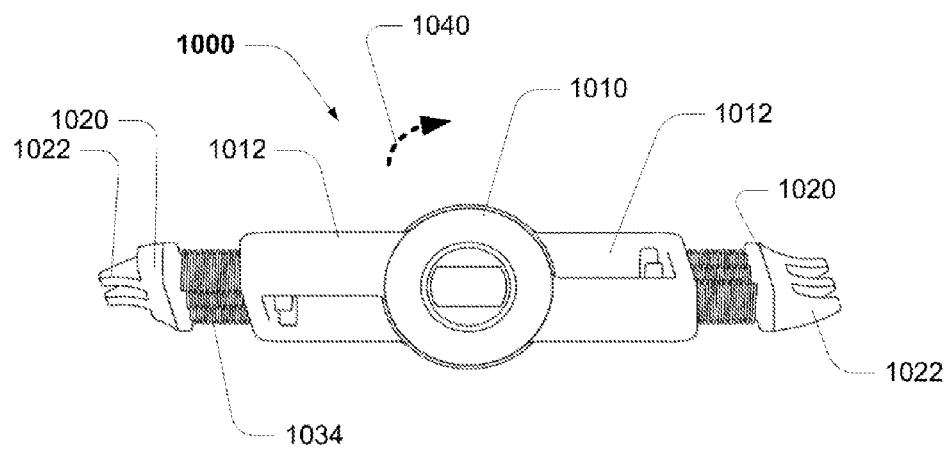
FIG. 48C
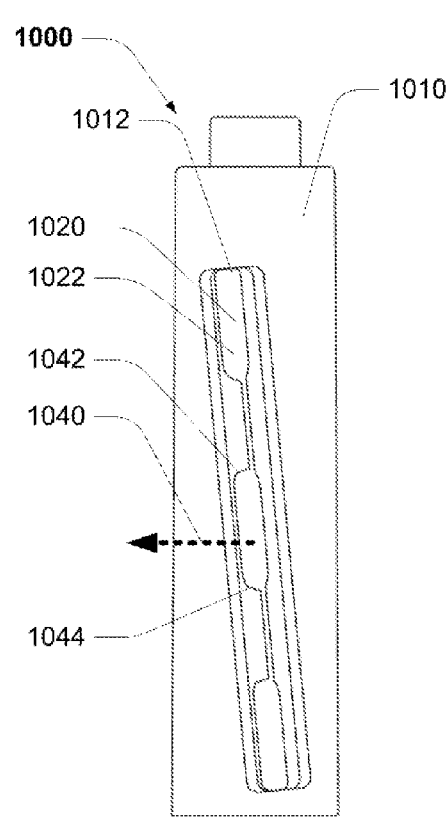 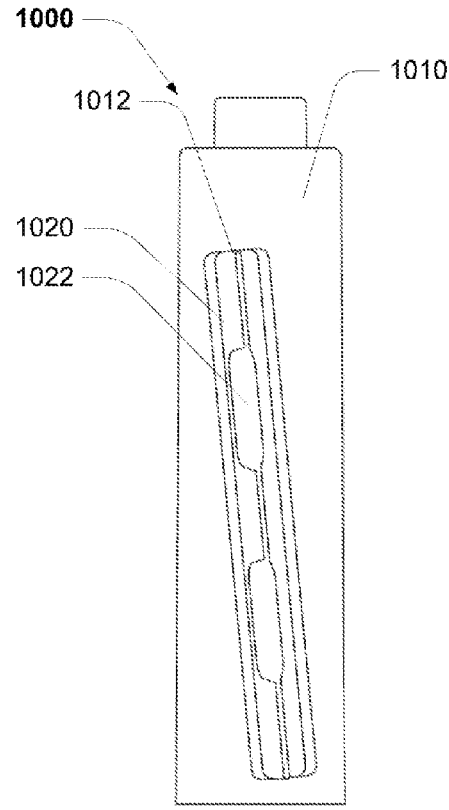
FIG. 48D FIG. 48E

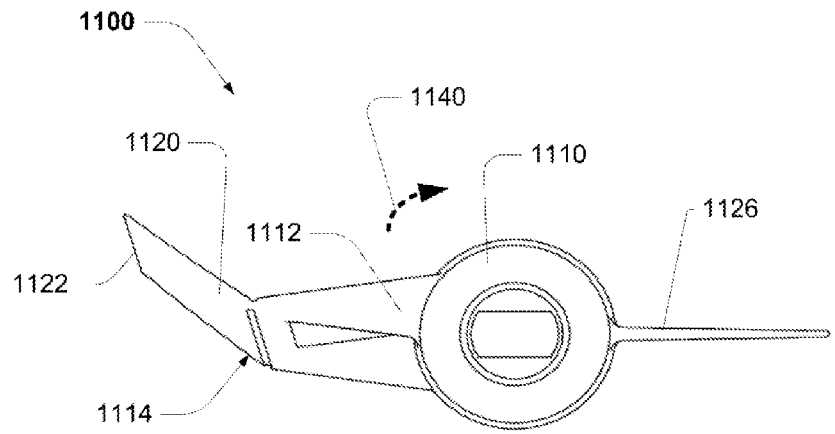
FIG. 50C
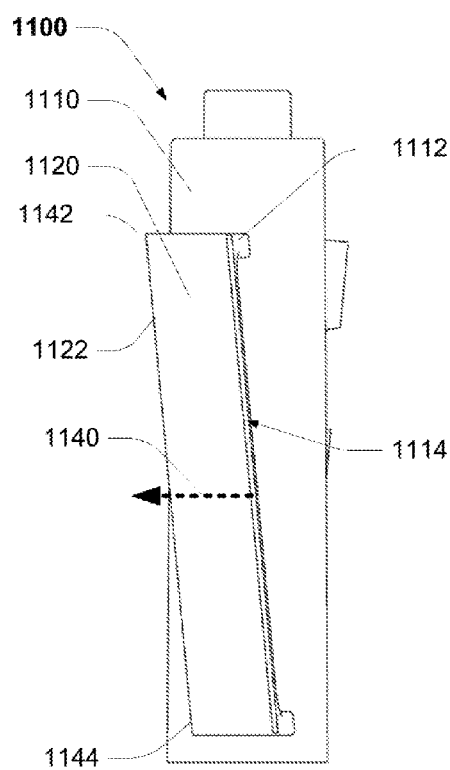 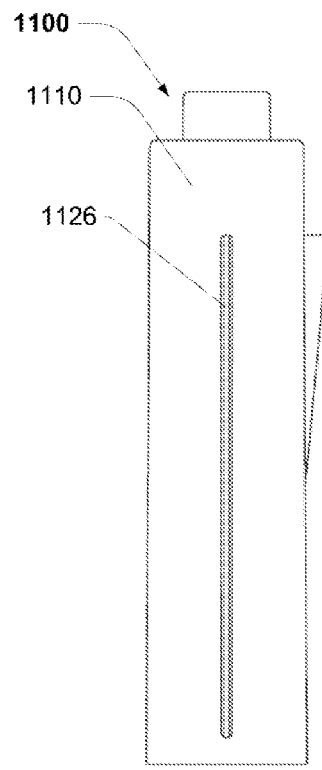
FIG. 50D  FIG. 50E

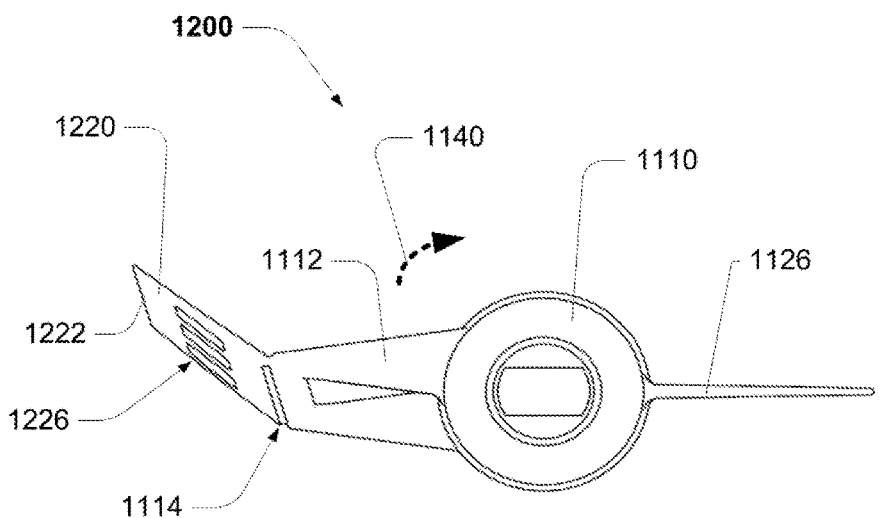
FIG. 52C
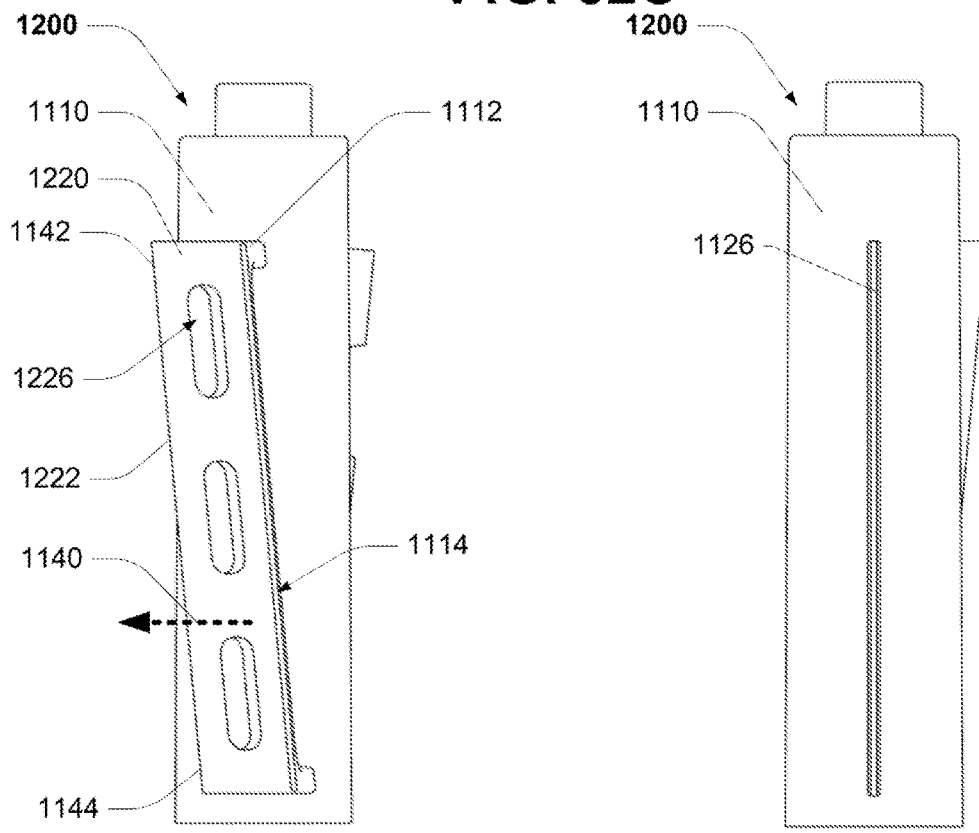
FIG. 52D  FIG. 52E

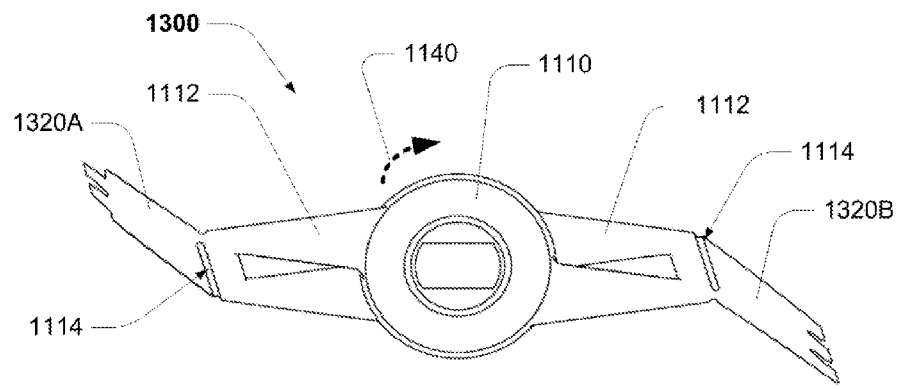
FIG. 54C
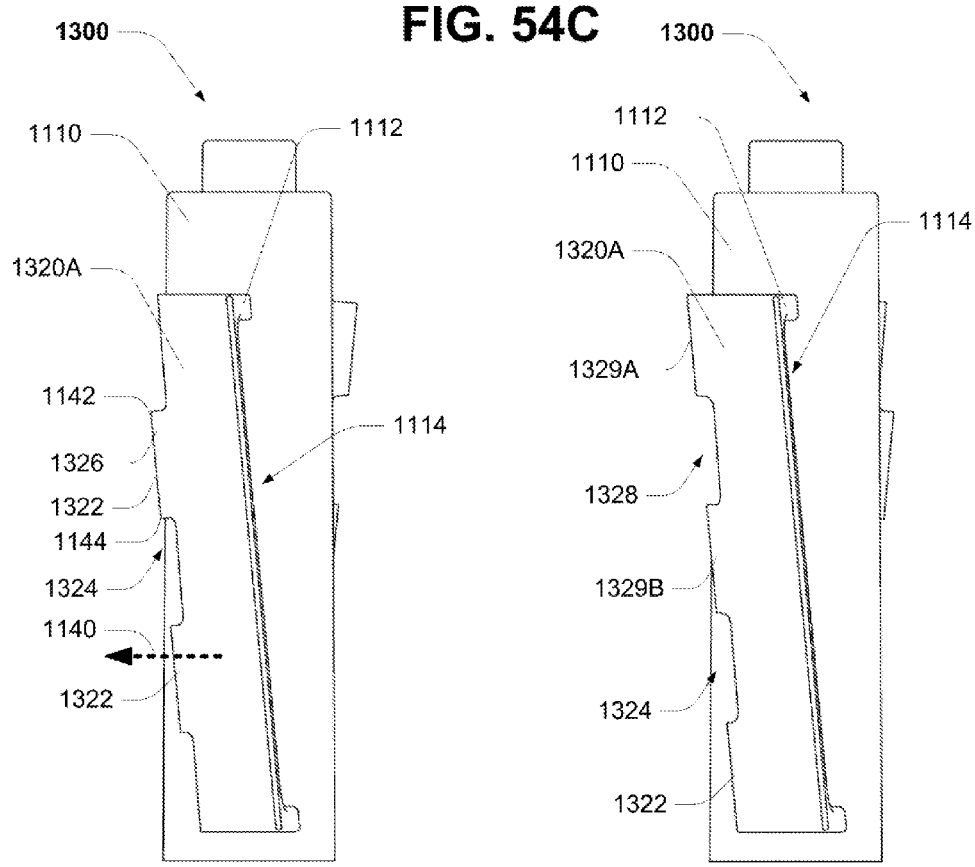
FIG. 54D     FIG. 54E

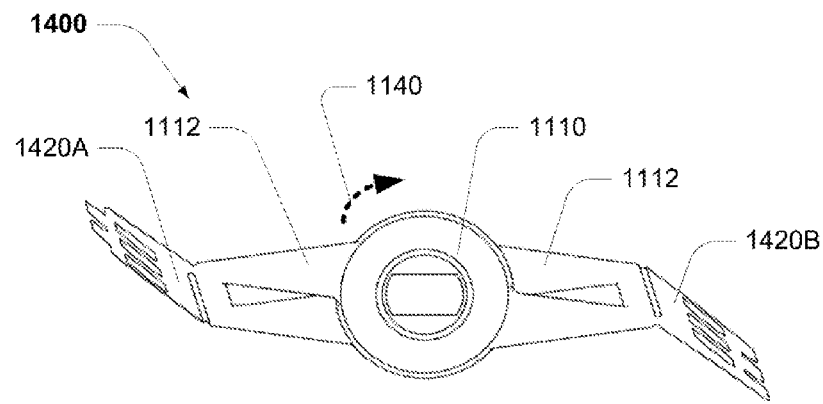
FIG. 56C
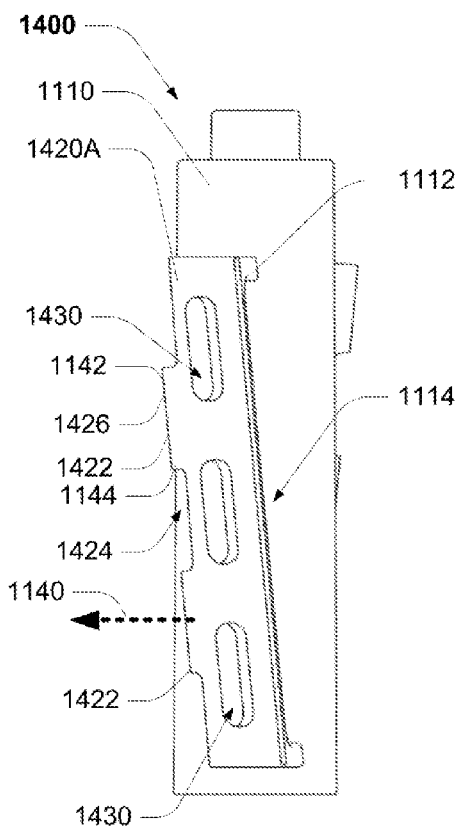
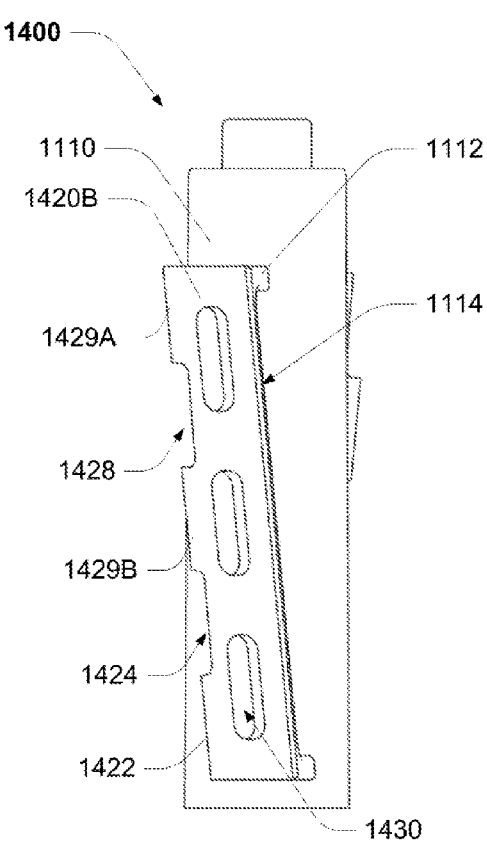
FIG. 56D  FIG. 56E

ICE CREAM MAKER

FIELD OF THE INVENTION

The invention relates to ice cream making machines and more particularly to domestic and commercial ice cream making machines having internal compressors.

The invention has been developed primarily for use in making ice-cream and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Ice cream is a frozen dessert made from ingredients such as cream, milk and eggs and often combined with fruits or other ingredients and flavours. Cream or butterfat gives ice cream its creamy flavour and texture. Milk gives it body and makes it smooth. Stabilizers, such as eggs or gum, are added to give the frozen blend a smooth texture by preventing large ice crystals from forming during the freezing process. Sugar and other flavourings provide sweetness and add to the taste of ice cream. Natural flavourings, such as chopped or whole fruits or nuts, also add a variety of different textures.

The basic liquid ingredients are mixed inside a bowl until it reaches a smooth and consistent consistency before the ice cream is made. Some recipes require this mixture to be heated to produce a smoother, better tasting ice cream. Commercially ice cream production also introduces a pasteurisation process where this mixture is heated to a specific temperature for a length of time, and then cooled immediately. This process slows the growth of bacteria and is required for the commercial production of ice cream.

The most common method for producing ice cream at home is to use an ice cream maker. In modern times this is generally an electrical device that mixes the ice cream mixture while it is cooled inside a household freezer, or using a solution of pre-frozen salt and water, which gradually melts while the ice cream freezes. A domestic ice cream maker is used to make small quantities of ice cream at home. Ice cream makers may stir the mixture by hand-cranking or with an electric motor, and may chill the ice cream by using a freezing mixture, by pre-cooling the machine that requires the ice cream bucket being pre-frozen in a conventional freezer, or by the machine itself using a compressor (similar to a refrigerator).

An ice cream maker must freeze the mixture, and must simultaneously stir or mix it to prevent the formation of ice crystals and to produce smooth and creamy ice cream. The stirring process may also be used to whip or entrain air into the mixture to make the final product light and fluffy.

There are a number of different types of ice cream makers available on the market, but for the purposes of the teachings in this document, we will concentrate on the electrically operated machines. These commonly use an electric motor to drive a blade that in turn mixes the ice cream, whilst cooling is achieved by one of 3 methods.

In one method a double walled bowl is used that contains a solution that freezes below the freezing point of water. This is frozen in a domestic freezer for up to 24 hours before the machine is needed. Once frozen, the bowl is put into the machine, the mixture is added and the machine is switched on. The paddles rotate, stirring the mixture as it gradually freezes through contact with the frozen bowl. Twenty to thirty minutes later, the solution between the double walls of the bowl has thawed, and the ice cream has frozen.

In a second method, the bowl and its contents are mixed inside a domestic freezer. These devices can either be battery powered or the type when the freezer door closes over a power cord which is plugged into a power point outside of the freezer.

In a third method machines have a compressor type freezing mechanism built in and do not require the bowl to be pre-chilled. The cooling system is switched on, and in a few minutes the mixture can be poured in and the motorised blade switched on.

In this document the term ice cream mixture refers to the precursor ingredients in or contents of an ice cream making machine at a time prior to completion of a batch of finished ice cream.

Ice cream making machines are well known. Some utilise salted ice and other machines rely on a compressor for refrigeration. Popular styles of ice cream require the user to add flavouring and texture ingredients referred to as "mixins" at some time after the ice cream making process has begun. Further, although users prefer ice creams of different hardnesses, most machines deliver a finished ice cream of a single hardness, given a particular pre-mixture of ingredients.

The international distribution of such machines sometimes requires the fitting of either a 120 or 220-240 volt motor, depending upon the ultimate destination of use of the machine. Different motors have different torque characteristics. When a machine depends on a direct or indirect measurement of motor load or torque or ice cream hardness, achieving the same torque with different motors can be problematic.

OBJECTS OF THE INVENTION

It is an object of the present invention to overcome or ameliorate at least one of the disadvantages of the prior art, or to provide a useful alternative.

It is an object of the invention in a preferred form to provide a frozen dessert maker that utilizes inbuilt refrigeration and that incorporates advanced features.

It is an object of some embodiments of the technology in a preferred form to provide a lid and handle arrangement that provides both paddle shaft stabilisation and a large mouth opening.

It is another object of the invention in a preferred form to provide an ice cream machine with a removable ice cream making container that interlocks with the machine so as to prevent rotation of that container.

It is a further object of the technology in a preferred form to provide both a method of controller the hardness of the finished ice cream as well as a method of displaying, to the user, a selection made by the user of a particular ice cream hardness.

It is another object of the technology in a preferred form to provide an adjustable motor mount that can accommodate two different motor placements in a single chassis.

SUMMARY OF THE INVENTION

According to an aspect of the invention there is provided a device for making ice-cream, the device comprising:
a body having one or more rotatable paddle;

a cooling chamber supported by the body for receiving an ice-cream mixture, the paddle being adapted to move through the ice-cream mixture;

a sensor module for detecting a hardness measure of the ice-cream mixture;

a processor module coupled to the sensor module for receiving a signal indicative of the hardness measure, the processor module being adapted to control the operation of the one or more paddle.

Preferably, the sensor module monitors speed of a motor driving the one or more rotatable paddle for detecting the hardness measure of the ice-cream mixture.

Preferably, the sensor module monitors input power of a motor driving the one or more rotatable paddle for detecting the hardness measure of the ice-cream mixture. More preferably, the processor module receives the signal indicative of the input power to operate a regulator for maintaining a constant motor speed.

Preferably, the sensor module monitors input current of a motor driving the one or more rotatable paddle for detecting the hardness measure of the ice-cream mixture. More preferably, the processor module receives the signal indicative of the input current to operate a regulator for maintaining a constant motor speed.

Preferably, the sensor module monitors temperature of the ice-cream mixture for detecting the hardness measure of the ice-cream mixture.

Preferably, the difference of the signal over time is indicative of a hardness level of the ice-cream mixture.

Preferably, the cooling chamber is adapted to receive a removable bucket that contains the ice-cream mixture.

Preferably, after the ice-cream mixture has reached a selected hardness, the processor module periodically operates the one or more rotatable paddle to churn the ice-cream mixture to substantially maintain the ice-cream mixture at the selected hardness.

Preferably, after the ice-cream mixture has reached a selected hardness, the processor module periodically operates the cooling element to substantially maintain the ice-cream mixture at the selected hardness.

Preferably, the processor operates a cooling element for a predetermined time period before indicating to a user to introduce the mixture to the cooling chamber.

According to an aspect of the invention there is provided a device for making ice-cream, the device comprising:
a body having one or more rotatable paddle;
a cooling chamber supported by the body for containing an ice-cream mixture, the cooling chamber being associated with a cooling element for cooling the ice-cream mixture;
a processor module being adapted to control the operation of the one or more paddle;
wherein, after the ice-cream mixture has reached a selected hardness, the processor module periodically operates the one or more rotatable paddle to churn the ice-cream mixture to substantially maintain the ice-cream mixture at the selected hardness.

Preferably, the cooling element periodically operates to substantially maintain the ice-cream mixture at the selected hardness.

Preferably, the device further comprises: a sensor module for detecting a hardness measure of the ice-cream mixture; the processor module being coupled to the sensor module for receiving a signal indicative of the hardness measure.

Preferably, the sensor module monitors speed of a motor driving the one or more rotatable paddle for detecting the hardness measure of the ice-cream mixture.

Preferably, the sensor module monitors input power of a motor driving the one or more rotatable paddle for detecting the hardness measure of the ice-cream mixture. More preferably, the processor module receives the signal indicative of the input power to operate a regulator for maintaining a constant motor speed.

Preferably, the sensor module monitors input current of a motor driving the one or more rotatable paddle for detecting the hardness measure of the ice-cream mixture. More preferably, the processor module receives the signal indicative of the input current to operate a regulator for maintaining a constant motor speed.

Preferably, the sensor module monitors temperature of the ice-cream mixture for detecting the hardness measure of the ice-cream mixture.

Preferably, the difference of the signal over time is indicative of a hardness levels of the ice-cream mixture.

Preferably, the cooling chamber is adapted to receive a removable bucket that contains the ice-cream mixture.

According to an aspect of the invention there is provided a device for making dessert, the device comprising:
a body having one or more rotatable paddle;
a cooling chamber supported by the body for containing a dessert mixture, the cooling chamber being associated with a cooling element for cooling the dessert mixture;
a processor module being adapted to control the operation of the one or more paddle;
wherein, before introduction of the dessert mixture, the processor module operates the cooling element to pre-cool the cooling chamber.

Preferably, the processor operates the cooling element for a predetermined time period before indicating to a user to introduce the dessert mixture.

Preferably, the paddle remains stationary for the predetermined time period.

Preferably, the processor module monitors any premature introduction of the dessert mixture; and upon detecting any premature introduction of the dessert mixture, the processor automatically initiates the one or more rotatable paddle to stir the mixture.

Preferably, the processor module monitors insertion of a removable bucket into the cooling chamber.

According to an aspect of the invention there is provided a device for making ice-cream and/or dessert.

Preferably, the processor module can detect insertion of a removable bucket into the cooling chamber.

Preferably, the cooling chamber receives a removable bucket, the cooling chamber and the bucket having cooperating engagement elements for restricting relative rotation there between.

Preferably, a motorized drive train for operating the one or more rotatable paddle is located at least partially part above the cooling chamber.

Preferably, the one or more rotatable paddle has a pivotal portion that pivots into a substantially vertical orientation during paddle ejection. More preferably, the pivotal portion is automatically orientated between an inclined orientation and substantially vertical orientation through selective rotational of the paddle.

Preferably, the paddle has a base element that abuts an inner surface of the cavity containing the mixture for extracting the mixture while removing the paddle.

Preferably, the one or more paddle moves in epicyclic action for making only periodic contact an inner surface of the cavity containing the mixture.

Preferably, a chassis supports at least two motor mounting orientations for receiving a respective one at least two different motors, such that alternative mechanically coupling can be applied between the motor and paddle for achieving a substantially similar toque output when using either of the different motors.

Preferably, a lid is located above the cooling chamber, the lid supports a pivoting portion for providing an aperture for enabling adding of further ingredients to the mixture, the pivot portion substantially extending between the perimeter of the lid.

Preferably, the device includes a heating element for controlling heating of the cooling chamber.

Preferably, the device presents an audible alert when the mixture has reached a predetermined harness.

Preferably, the device include a user interface for enabling user selection of a dessert type, the user selection being used to configure the operation of the paddle and to control torque applied to the paddle.

Preferably, the device includes a temperature sensing element for indicating the temperature of the mixture.

According to an aspect of the invention in a preferred form there is provided a scraping paddle as herein disclosed. Preferably, the scraping paddle is included in a device for making ice-cream and/or dessert.

According to an aspect of the invention in a preferred form there is provided a temperature sensor element as herein disclosed. Preferably, the temperature sensor element is included in a device for making ice-cream and/or dessert.

According to an aspect of the invention in a preferred form there is provided a method for making a dessert as herein disclosed. Preferably, a device for making ice-cream and/or dessert uses the method for making a dessert.

According to an aspect of the invention there is provided an apparatus for making ice-cream and/or Gelato, including one or more features as disclosed herein. Preferably, the apparatus is substantially as herein described with reference to any one of the embodiments of the invention illustrated in the accompanying drawings and/or examples.

According to an aspect of the invention there is provided a method for making ice-cream and/or Gelato, including one or more steps as disclosed herein. Preferably, the method is substantially as herein described with reference to any one of the embodiments of the invention illustrated in the accompanying drawings and/or examples. More preferably, the method is applied by an apparatus incorporating one or more feature disclosed herein.

According to an aspect of the invention there is provided a front loading device for making ice-cream.

Preferably, any device for making ice-cream can include a paddle or scraper as defined herein.

Preferably, any device for making ice-cream can include an interface as defined herein.

BRIEF DESCRIPTION OF THE DRAWING FIGURES

The invention will be described with reference to the following drawing figures in which:

FIG. 42 is a perspective view, illustrating a pivoting motor mount;

FIG. 43 is a perspective of an ice cream machine chassis illustrating a pivoting motor mount that can accept two different motors;

FIG. 48A through FIG. 48E show an embodiment scraping paddle for an ice cream making apparatus;

FIG. 50A through FIG. 50E show an embodiment scraping paddle for an ice cream making apparatus;

FIG. 52A through FIG. 52E show an embodiment scraping paddle for an ice cream making apparatus;

FIG. 54A through FIG. 54E show an embodiment scraping paddle for an ice cream making apparatus;

FIG. 56A through FIG. 56E show an embodiment scraping paddle for an ice cream making apparatus;

BEST MODE AND OTHER EMBODIMENTS OF THE INVENTION

The time it takes to make the finished ice cream in a conventional electric ice cream maker can vary depending on a number of factors:
a) The cooling performance of the individual machine (this should be somewhat constant for an individual machine);
b) The design of the mixing blade and blade rotational speed, as these impact on how effectively the heat is being removed from the ice cream;
c) The ambient temperature;
d) Temperature of the mixture being used (this could vary a lot depending on whether the mixture is heated);
e) The ingredients. Alcohol, sugar, gelatin, fat and stabilizers all freeze at different temperatures. Depending on the composition of the ice cream mixture the hardness of the ice cream produced in a given time will vary (recipe and user accuracy dependent);
f) Personal preferences regarding the hardness of the finished ice cream.

Given these variables it can be difficult for a microprocessor based ice cream machine or a human user to predict the duration of operation of the ice cream maker. Too little time and the ice cream will be too soft and runny. Conversely, operating the machine for longer than necessary will cause the ice cream blade to stop because of the resultant hardness. This will result in the ice cream being too difficult to spoon out and may cause inconsistent textures (hard on the outside closest to the cooling surface, softer in the middle).

Conventionally, this means that it is up to an individual user to monitor the progress of the ice cream mixture throughout the latter stages of the ice cream making by checking texture and consistency periodically.

Figure 1:
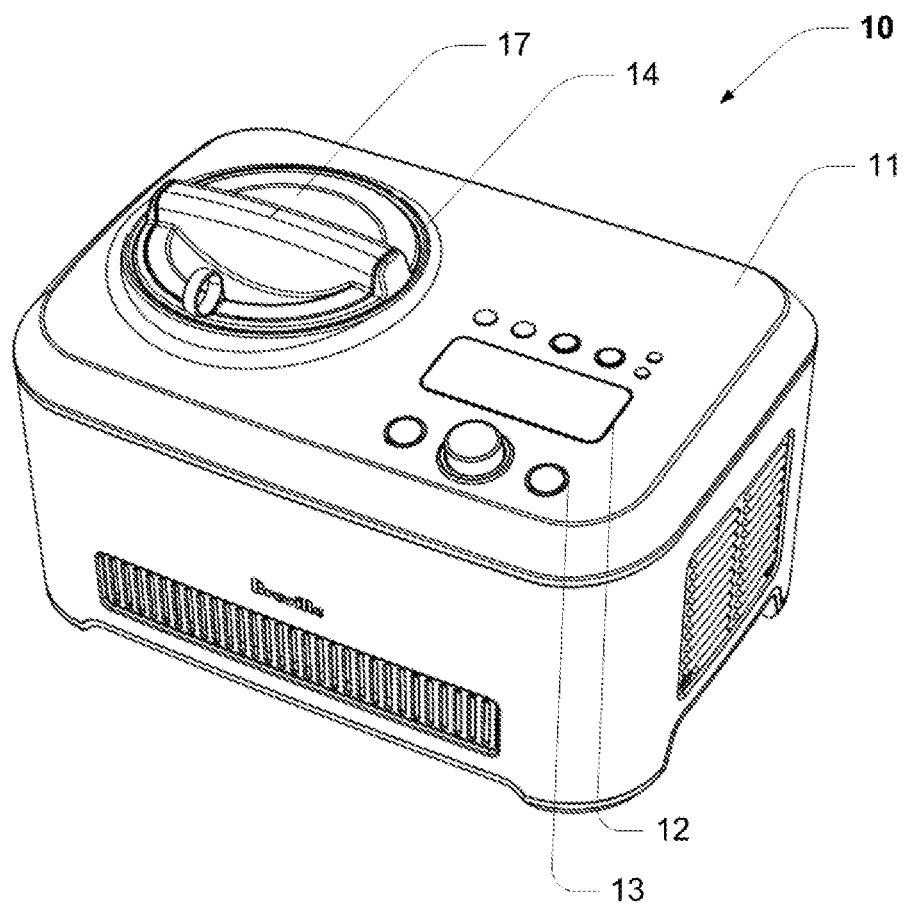
FIG. 1 is a perspective view of an ice cream maker in accordance with the teachings of the present invention.
Figure 2:
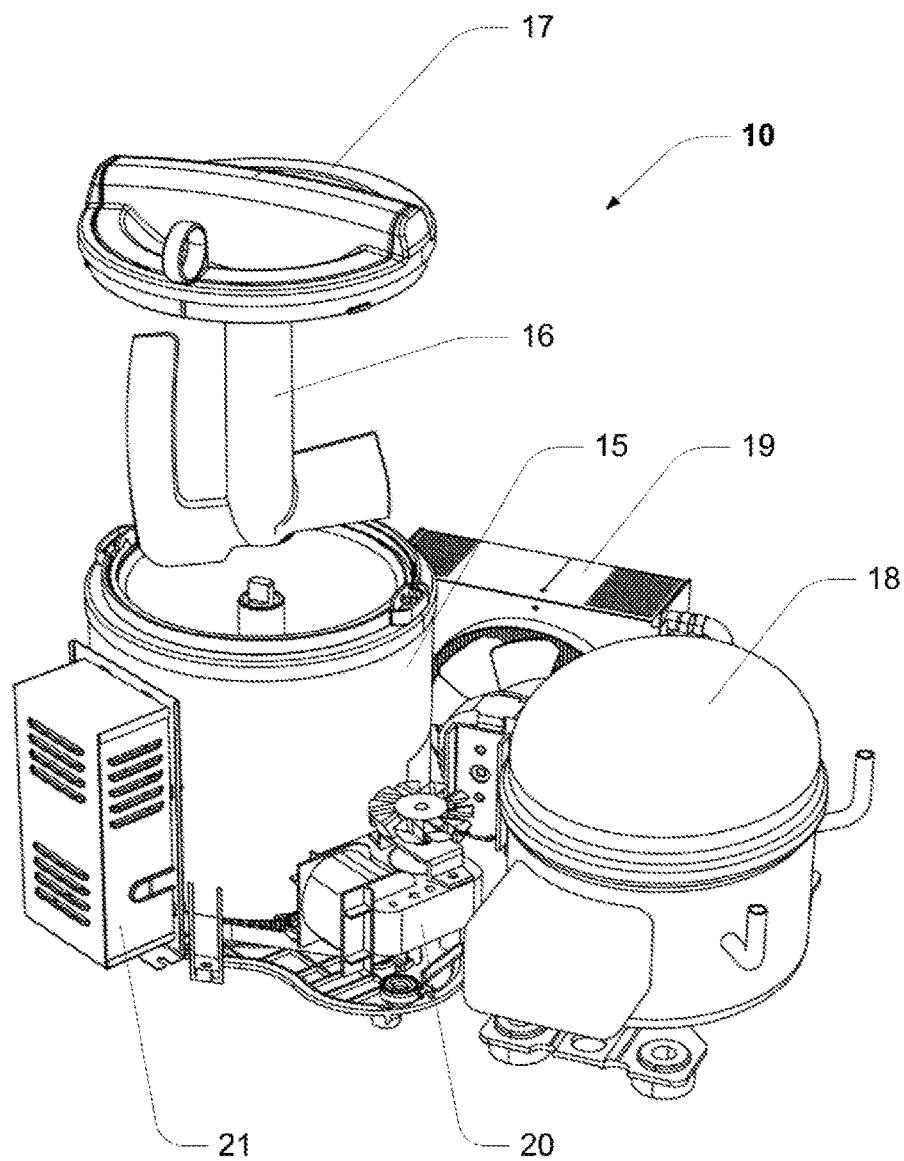
FIG. 2 is a perspective view, partially exploded of the interior of the device depicted in FIG. 1.

As shown in FIG. 1 and FIG. 2, a microprocessor (or MCU) based ice cream making machine 10 comprises a housing 11 that in this example includes an electronic display 12 and various user controls 13. The controls 13 are used to operate the machine, to input preferences and to select options that may appear on the display 12. An upper surface of the housing 11 further comprises a main opening 14 for receiving a removable ice cream bowl 15. The ice cream bowl 15 is adapted to receive a rotating blade assembly 16. The ice cream bowl also has a lid 17.

As shown in FIG. 2, the interior of the housing 11 contains the ice cream bowl 15, a compressor 18 and its fan 19, a motor 20 for driving the rotating blade assembly 16 and a sub-housing 21 for containing electronic components, the microprocessor unit, and other components as required. The housing 11 is also adapted to contain emptyable sub compartments or containers for holding and dispensing mix-ins.

Mix-ins are defined as additional liquid or solid ingredients that are placed into the ice cream mixture to add extra flavour and texture to the finished ice cream. Some examples of mix-ins are nuts, chocolate chips, fruit, liquid flavourings etc. In some instances, it may be preferable to add the mix-ins towards the end of the ice cream making cycle (when the ice cream is almost done) as to retain the integrity of the ingredients without them being exposed to the mixing or stirring process required to make finished ice cream.

With the present technology, a user is not always required to monitor the progress of the ice cream making process when, for example, trying to incorporate softer mix-ins such as fruits and other similar toppings/flavouring. One or more automated mix-in dispensers may be driven through a small motor or solenoid. One ore more automated mix-in dispenser may be integrated electronically with the PCB. The PCB would then in turn "instruct" the mix-ins to be dispensed from within the machine into the ice cream mixture at a given time or times.

One way of determining the progress of the ice cream making process is to detect the actual hardness of the mixture in the bowl.

The hardness sensor of the present technology is employed to monitor the consistency of the ice cream mixture, and this information is used to either stop the ice cream maker when the desired consistency has been reached or try to maintain a particular hardness, by regulating the temperature of the bowl or its contents (and by other means).

The user can select e.g. soft, medium or hard ice cream or ice cream type (e.g. gelato, sorbet, granita, slushie, yoghurt, etc.) from an interface to the machine and the machine then determines (using various means of sensing, algorithms and microprocessor technology) when the ice cream has reached the desired or corresponding hardness. The machine will then switch off automatically or take other action regarding mix-ins while optionally alerting the user, for example, with an audible signal through a speaker or a visual signal through the LCD.

One way to determine hardness of the mixture is to monitor the speed of the motor shaft or the mixing blades while driving the motor under a constant torque. Different hardness levels of ice cream produce different loads on the mixing blades. Therefore if the motor runs at constant torque, the motor speed will change according to the load on the shaft. Once the bowl contents gets harder, load on the motor will increase. Using this method, a speed sensor on the motor shaft is used to predict when the ice cream is set to the selected hardness by measuring the drop in motor shaft speed throughout operation.

The problem with some existing ice cream makers is that even if the mixing blade stops, the compressor keeps cooling the ingredients. The blade is no longer able to spin due to the resistance from the hard ice cream mixture. This results in a hard layer of ice cream around the sides, acting as an insulator to the ice cream mixture in the middle of the bowl. This inconsistent texture is not desirable.

Using a blade speed sensor on the motor or other rotating parts, the invention overcomes this by waiting until the ice cream is hard enough to reduce movement of the ice cream paddle. The MCU senses that the motor has slowed down and in response, turns off the compressor to pause the freezing. As the ice cream melts, momentarily (either a timed interval or interval or using an algorithm based on temperature/time and its rate of change) the MCU can deliver power back to the motor and sense feedback from the speed sensor. If the ice cream is still too hard, the computer would register a low rpm reading and continue to wait until a pre-determined rpm is able to be achieved by the motor. In tandem, the compressor could also be instructed to start up to resume cooling or freezing after a certain rpm is achieved by the motor. FIG. 2 illustrates the relationship between motor speed and time during this activity.

Figure 3:
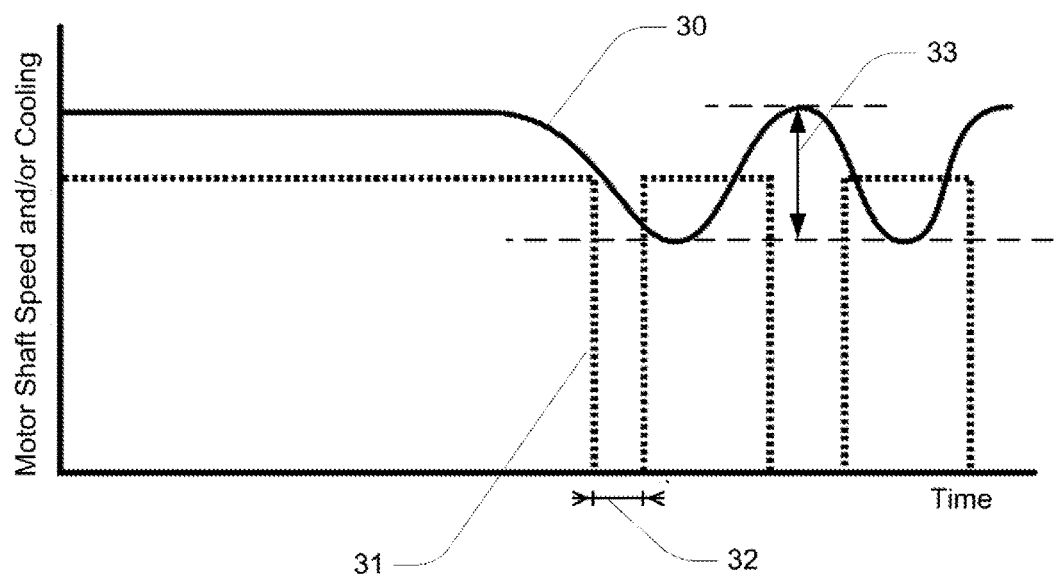
FIG. 3 is a graph illustrating the relationship between motor speed and time in an ice cream making process.

In another mode where softer ice cream may be desired, the speed sensor detects when the ice cream mixture is in the process of becoming hard, and by cycling the compressor on/off to maintain a consistency that is able to allow the ice cream paddle to rotate. As shown in FIG. 3 the MCU regulates the compressor and the blade assembly, operating one of them or both of them intermittently to achieve a consistency that is maintained within an acceptable range over an extended time period. The vertical axis represents the approximately motor shaft speed as influenced by the action of the cooling mechanism or compressor. When the shaft speed decreases 30 the cooling mechanism can be switched off 31 over one or more successive intervals 32 so as to maintain a shaft speed (or ice cream mixture hardness) within an acceptable range 33.

Detecting the speed changes under constant motor torque, it is possible to measure the ice cream mixture hardness level over time.

Further, motor torque is related to the motor input voltage, input current, driving frequency or input power. Therefore, regulating one or more of the aforementioned factors, (dependent on motor type) can serve to regulate the motor torque.

A second way to determine hardness is to measure the motor output torque, (or input voltage, current driving frequency or input power) while maintaining a constant speed of the motor or the mixing blades.

As described in FIG. 3, as the ice-cream mixture gets harder, load on the blades (or motor) will be increased. Motor torque can be related to the input power, driving frequency, current or the input voltage which is depend on the motor type. Therefore while maintaining a constant speed of the motor or the mixing blades, it is possible to detect hardness levels by monitoring motor input power, current, voltage or driving frequency.

There are several exemplary methods of measure the motor speed:
 use of Hall Effect sensor or magnet sensor,
 use of pulse counter disk with, for example, infra red or photo diode receiver/transmitter, and
 back EMF measurements from the motor.

There are several methods for regulating the motor speed. The device can regulate the motor input voltage, current, driving frequency or pulse width modulation base on the speed measured from the motor. One or more of these methods can be applied, based on the motor type used in the system.

Figure 4:
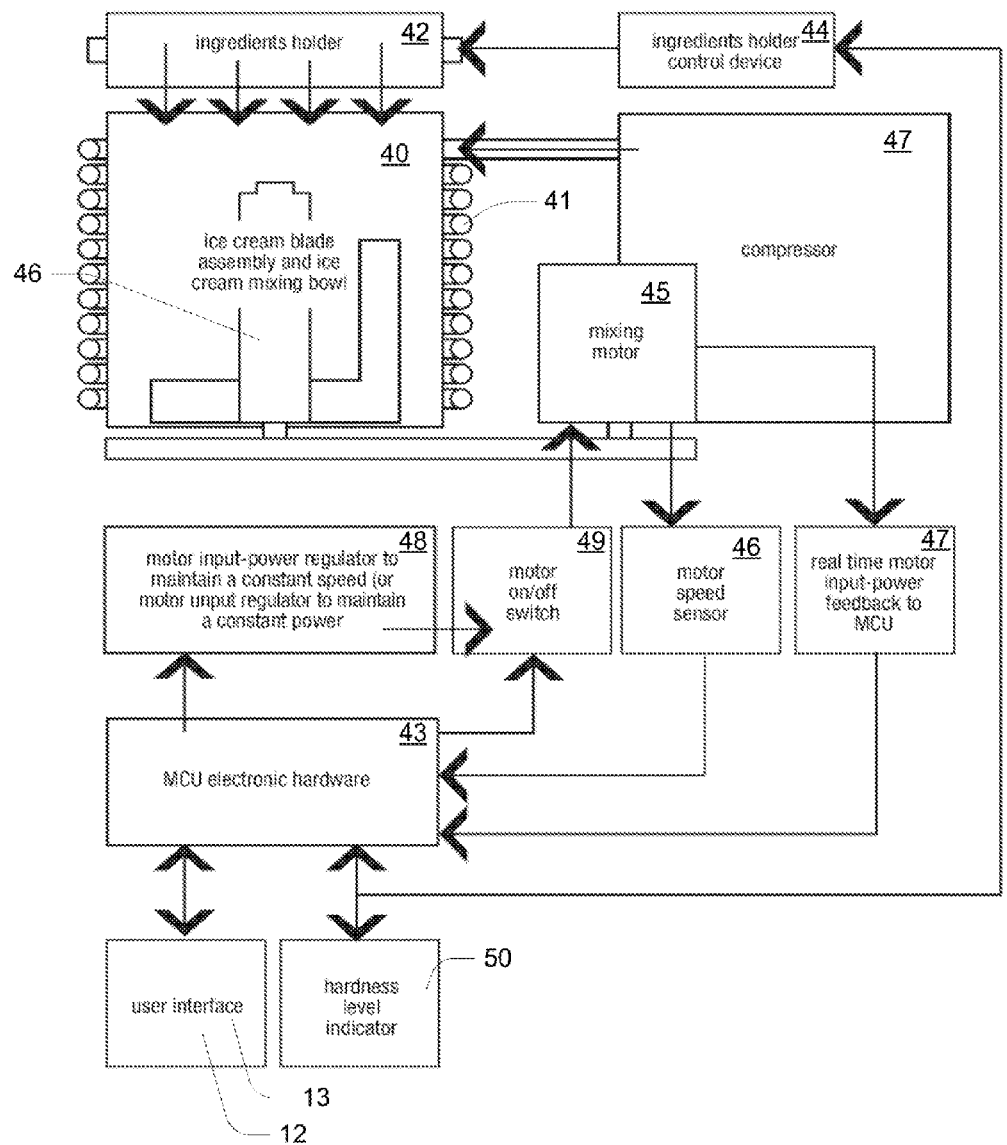
FIG. 4 is schematic diagram of an ice cream maker
Figure 5:
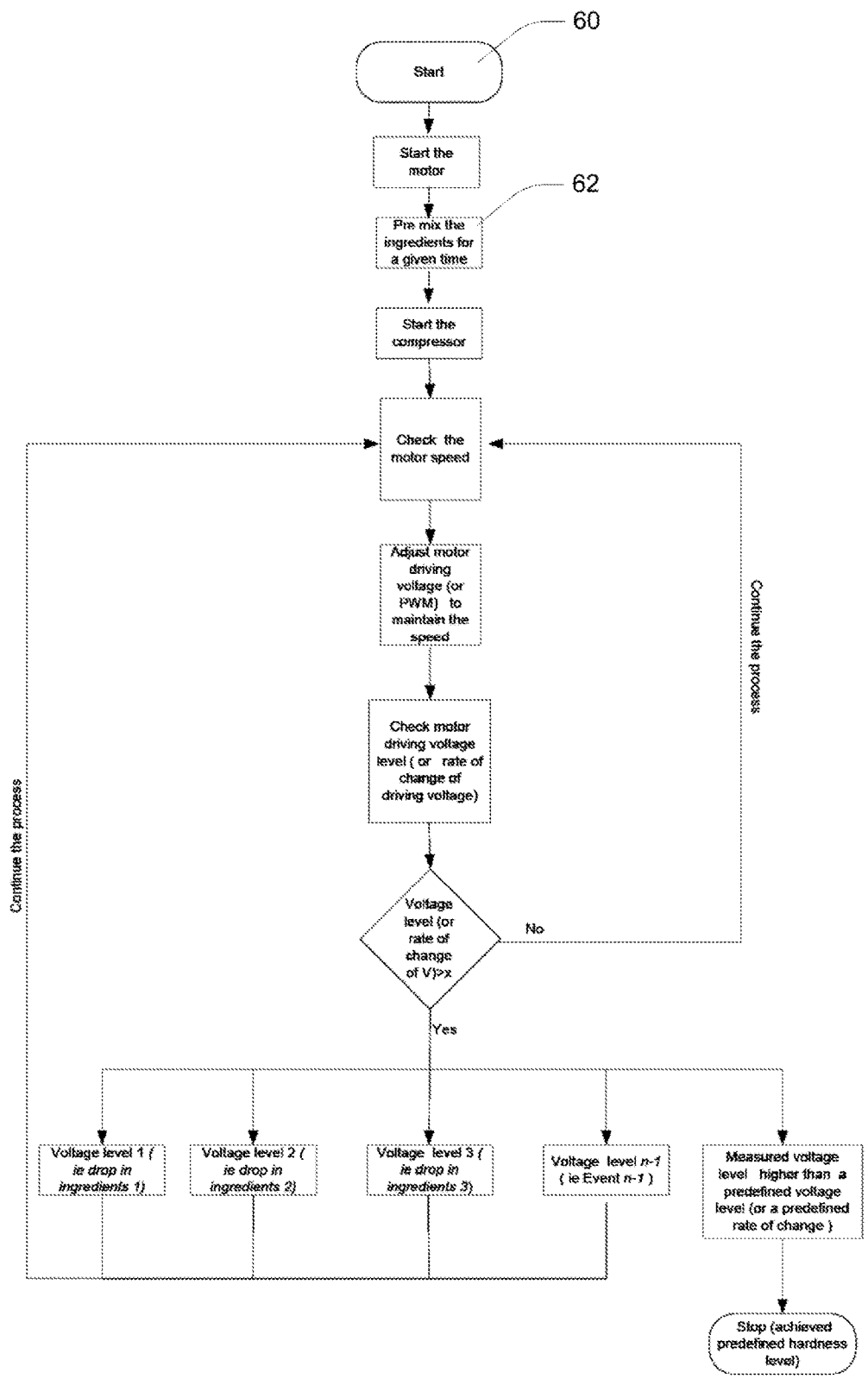
' FIG. 5 is a flow chart illustrating an ice cream making process.

FIG. 4 is a block diagram showing the main components of the system. An ice cream bowl 40 is illustrated as being surrounded by cooling/heating coils 41. As ingredient or mix-ins holder 42 is depicted as periodically emptying its contents into the mixing bowl 40. The operation of the mix-ins holder is determined by the microprocessor apparatus 43 in conjunction with an auxiliary mix-ins holder control device 44. The mixing motor 45 provides rotating power to the blade assembly 46. The compressor 47 works in conjunction with the coils 41 that surround the bowl 40. The speed of the motor 45 is detected by a sensor 46. The sensor may take any one of a number of forms. In some embodiments, the real time input power to the motor is detected or sensed 47 whereupon this input power data is supplied to an used by the MCU 43. The MCU uses the input power data to operate a regulator 48 that works to maintain a constant motor speed or a constant motor power or to operate a switch 49 that turns the motor on and off. To the extent that algorithms or additional processing are required to interpret power of motor speed data, a separate module or processor 50 communicates bi-directionally with the MCU 43. The MCU 43 also cooperates with the user interface so as to provide information signals to the display 12 and to interpret inputs from the user controls 13.

In the beginning of the process, the motor spins at a relatively faster speed for a given time to mix the initial ingredients. Once this cycle is completed, compressor starts to cool the ice cream container while motor spins at a regulated speed. When a DC motor is being used, motor speed can be regulated and keep constant by adjusting the input voltage to the motor.

While the system continues this process, the MCU monitors the real time input voltage of the motor and calculates the voltage difference compared to initial start up voltage. As the premix of ingredients gets harder, the driving voltage of the motor will increase as the motor requires a higher torque to maintain the speed. Thus, the input voltage difference over time indicates the hardness levels of the ice-cream mixture. Predefined hardness levels can be used as cues to add different mix-in ingredients to the premix.

Hardness levels can also be detected by monitoring the rate of change of input voltage or rate of change of the rate of change.

By interpreting this information, the ice cream machine can be programmed to stop when it reaches the desired or selected hardness level. This information can also be used to determine the time in which to add mix-ins to the ice cream. For example, nuts may be incorporated at the beginning of the ice cream mixture to add flavour and texture to the end result. As nuts are quite robust, they can be added early on in the ice cream making process to maximise the release of flavours. Other softer mix-ins such as fruits may be best incorporated into the ice cream later on in the ice cream making process, as the churning action may pulverise the fruit itself where chunks of fruit may be desired in the end result.

A hardness sensor is a preferred solution for predicting the time required, as it is a fairly direct measurement of the end consistency. Thus the aforementioned variables that may affect the time required to produce the ice cream need not be considered.

Another method to determine the length of processing required to produce the desired ice cream consistency or hardness may be with the incorporation of a temperature sensor. A temperature probe may be useful in determining temperature of the premix, and/or determining length of processing time, and/or determining hardness of the premix.

Once method is the detection of the initial temperature of the premix. This information can be used to determine or predict the time required for making ice cream of a given hardness. For example, if the ingredients have been heated up, the detection of elevated temperature in the premix will cause the MCU to alter the timer to increase the mixing time by a fixed amount, say 10 minutes. Conversely, if the temperature of the ingredients suggests the premix has been chilled, then the timer will automatically deduct a time, e.g. 10 minutes from the process duration.

The hardness of the premix may be proportional to the temperature. Usually the harder the premix, the lower the temperature. This can then be used to determine, by inference, when the ice cream has reached a certain consistency.

As the bowl in the present technology is surrounded by a refrigeration tube or refrigeration tubes, an external temperature probe will need to be sufficiently isolated from these tubes.

Figure 6A:
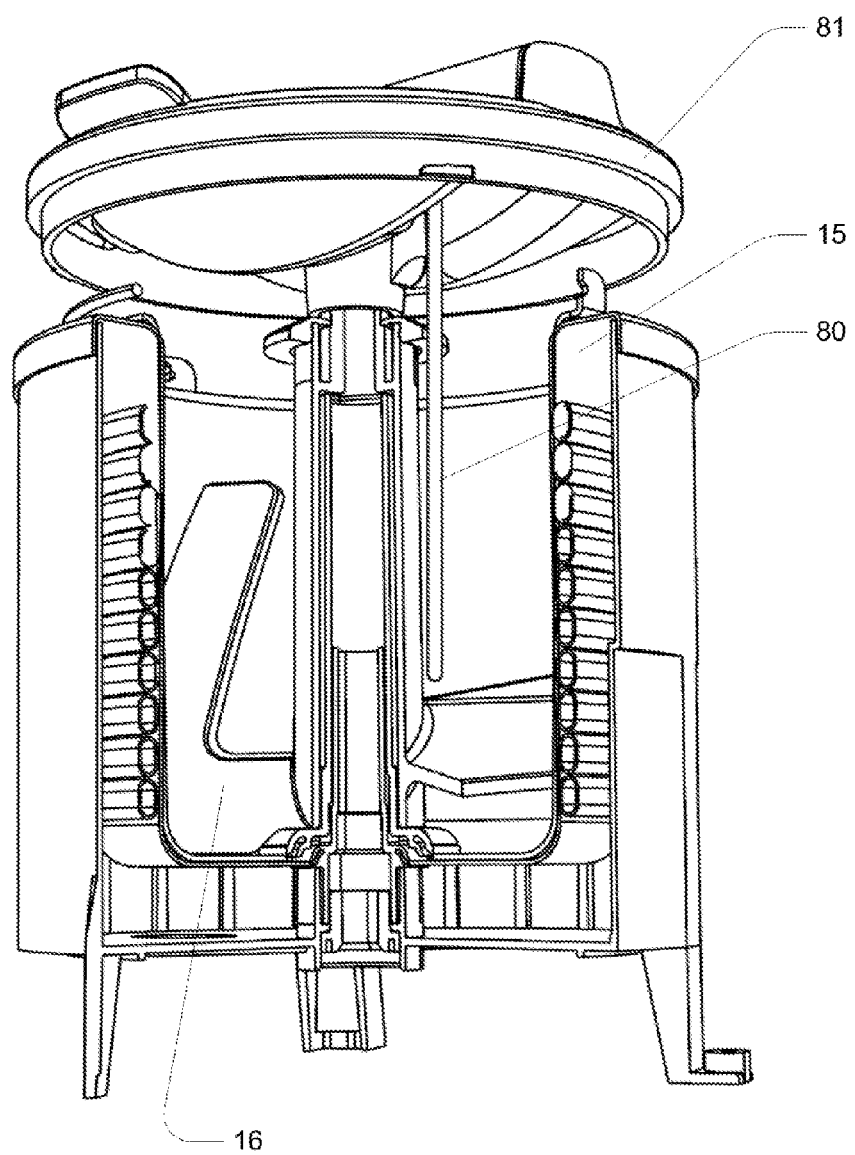
FIG. 6A is a partially broken away view of an ice cream bowl, scraper blade and a receptacle for receiving the ice cream bowl within the device depicted in FIG. 1, showing a embodiment temperature sensor element.

As shown in FIG. 6A, one location for a temperature probe 80 is on a hinged upper lid 81 to be directly immersed into the ice cream mixture.

Figure 6B:
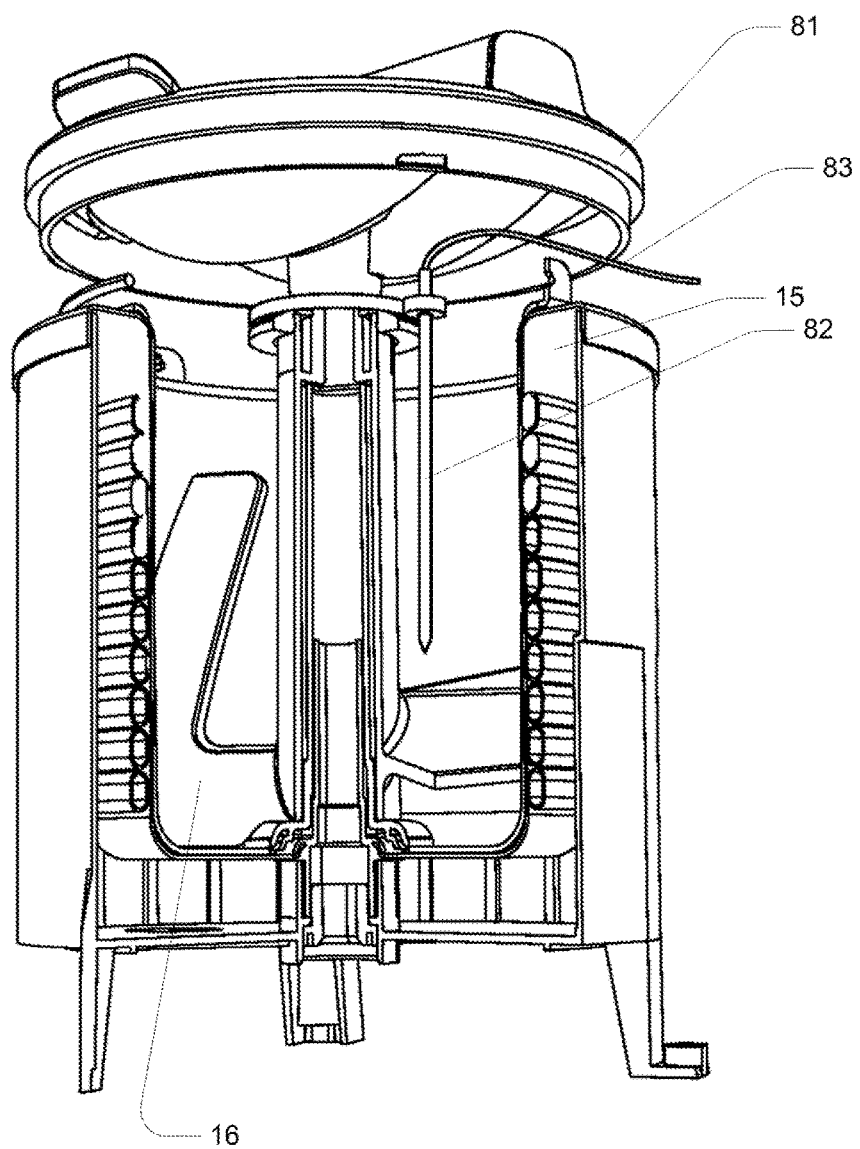
FIG. 6B is a partially broken away view of an ice cream bowl, scraper blade and a receptacle for receiving the ice cream bowl within the device depicted in FIG. 1, showing a embodiment temperature sensor element.

FIG. 6B shows a temperature sensor in the form of a temperature probe 82 which can be coupled to the ice cream maker using a flying lead 83 and jack configuration (not shown). In this embodiment, a clip element 84 removably couples the temperature probe 82 within the ice cream vessel while measuring the temperature of the ingredient mix. It will be appreciated that the flying lead can then be coupled to the apparatus via an electrical jack.

Figure 7A:
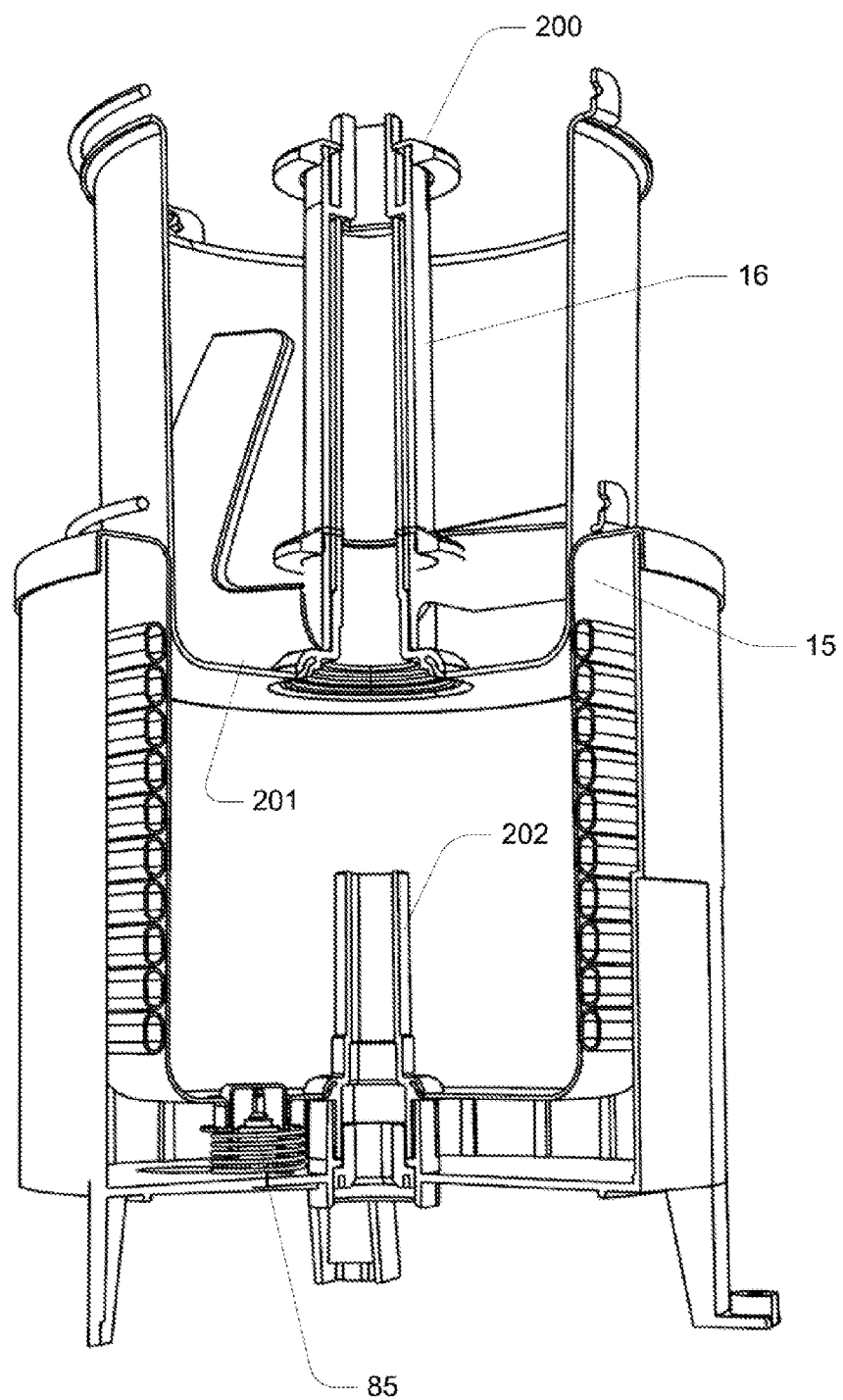
FIG. 7A is a partially broken away view of an ice cream bowl, scraper blade and a receptacle for receiving the ice cream bowl within the device depicted in FIG. 1, showing a embodiment temperature sensor element.

FIG. 7A shows an alternative embodiment ice cream maker that includes a temperature sensor for providing a signal indicative of the temperature of the ingredient mix. In this embodiment the temperature sensor in the form of a spring mounted contact sensor or thermistor 85 located under the bowl 15.

Figure 7B:
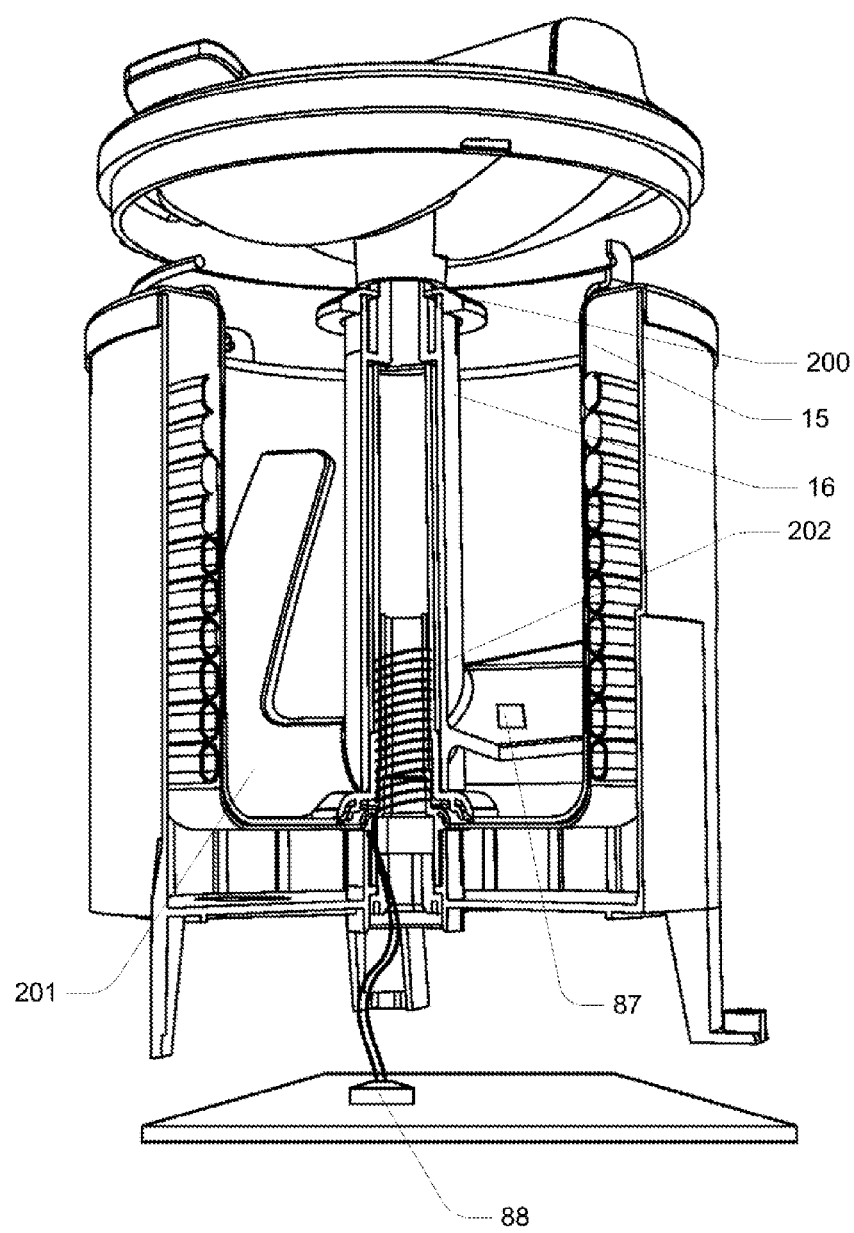
FIG. 7B is a partially broken away view of an ice cream bowl, scraper blade and a receptacle for receiving the ice cream bowl within the device depicted in FIG. 1, showing a embodiment temperature sensor element.
Figure 8:
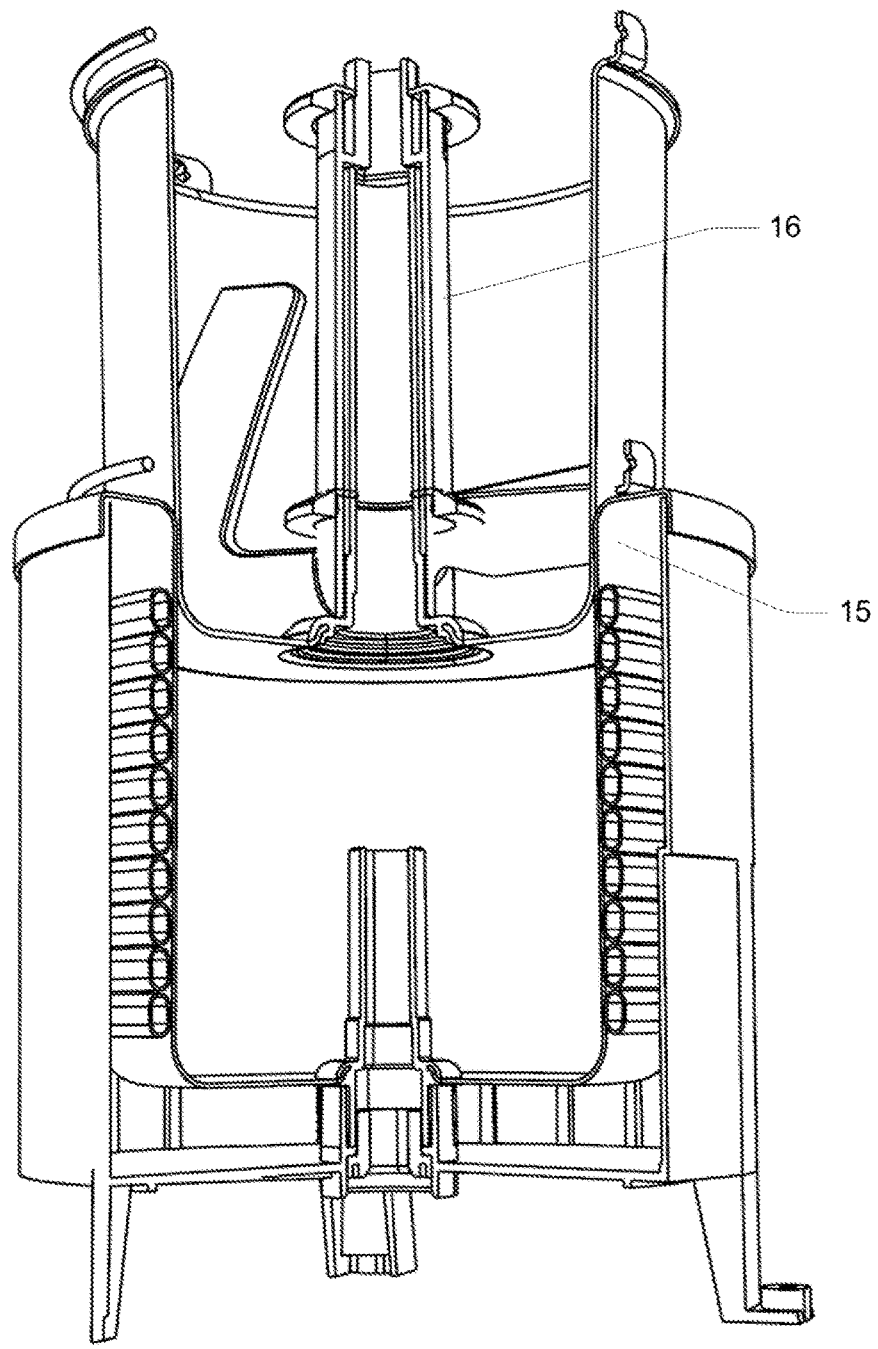
FIG. 8 through FIG. 11 are perspective views, partially broken away, of an ice cream bowl, scraper blade and a receptacle for receiving the ice cream bowl within the device depicted in FIG. 1.
Figure 9:
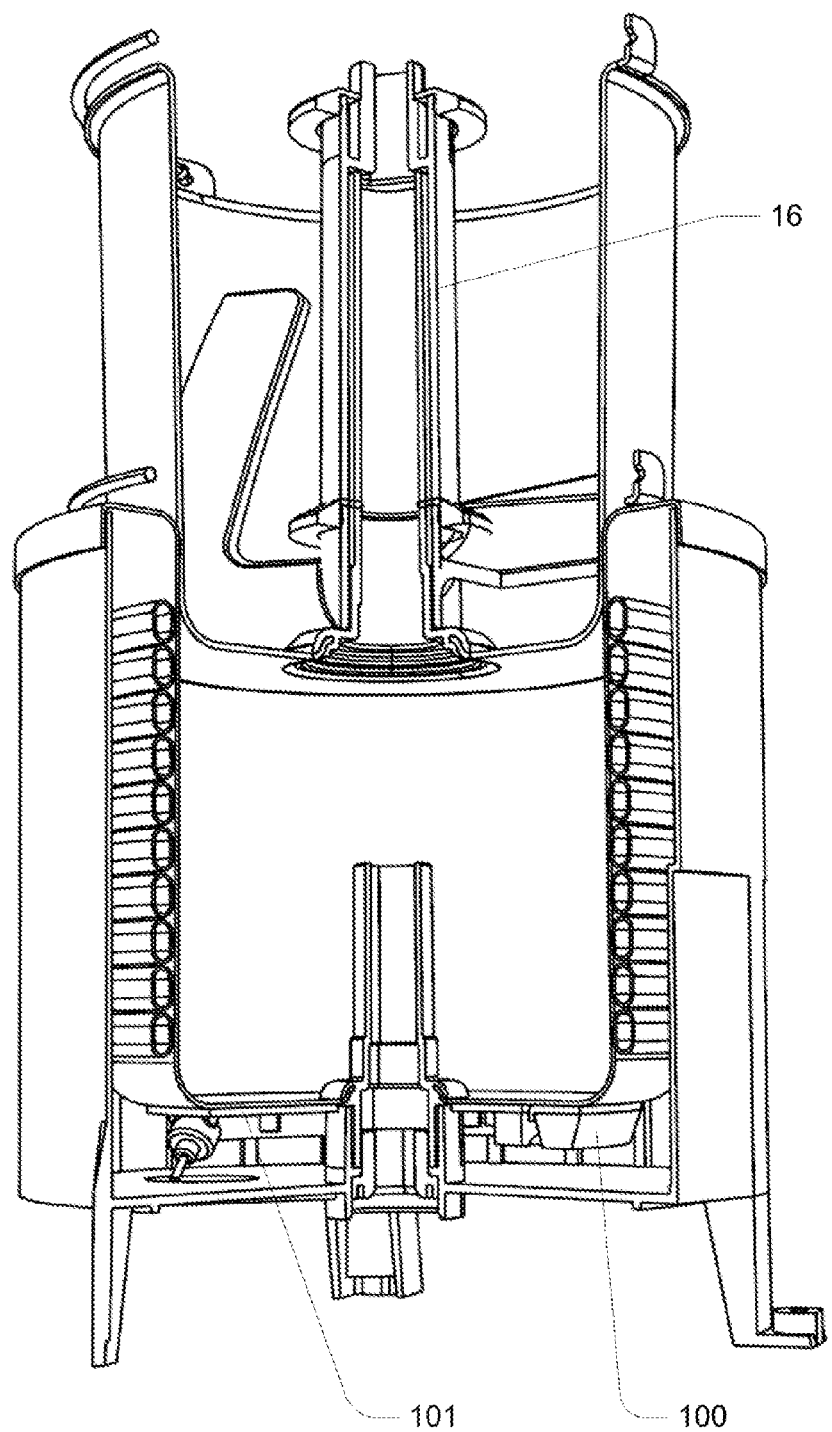
Figure 10:
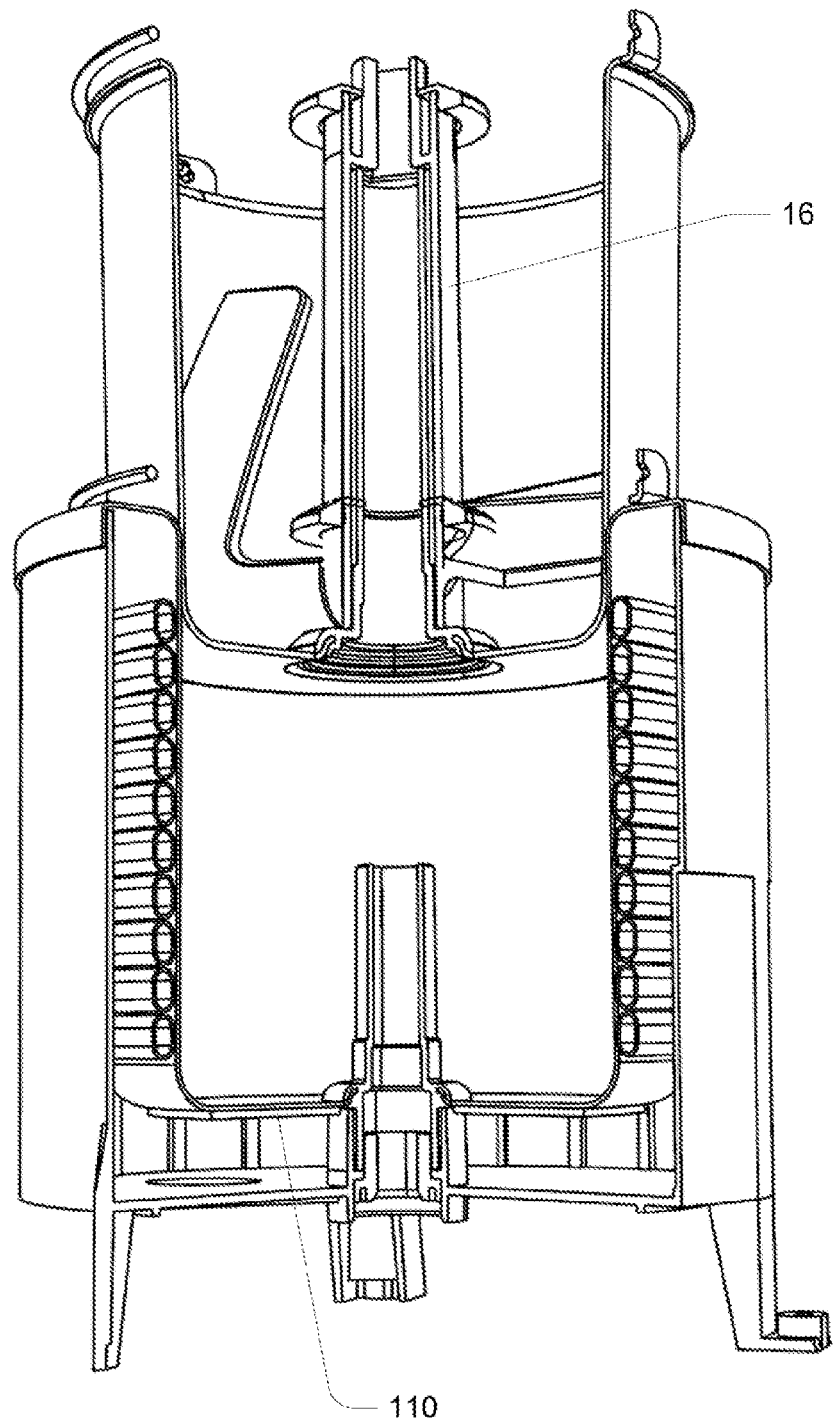
Figure 11:
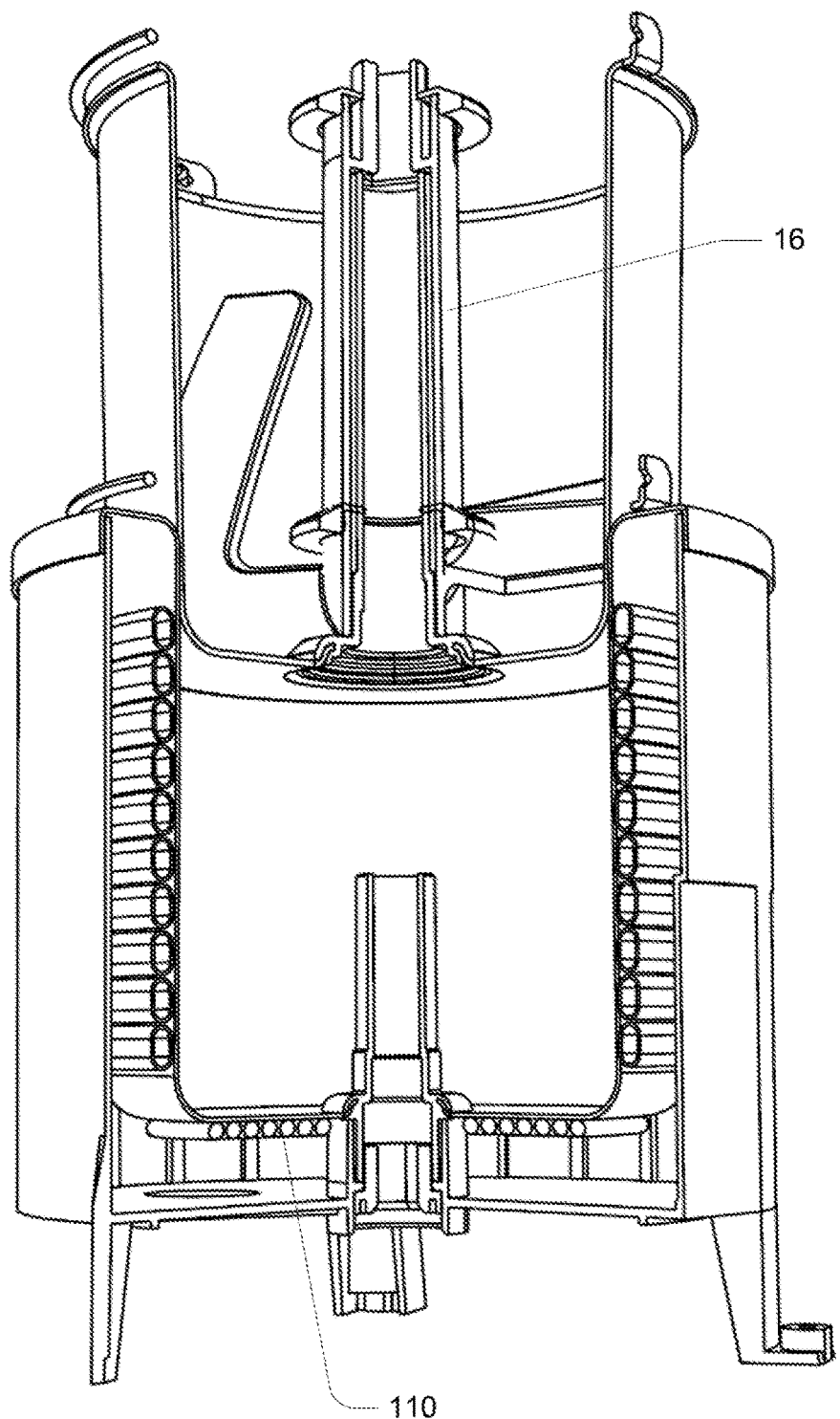

FIG. 7B an alternative embodiment ice cream maker that includes a temperature sensor in the form of an RFID temperature transponder 87. This RFID temperature transponder is typically insert moulded into the ice cream paddle 201. This temperature sensor can measure the temperature of the ingredient mix and relay a temperature signal back to an RFID receiver element 88, typically located within the ice cream maker. It would be appreciated that this method does not require any physical connection between the receiver and transponder. The RFID receiver receives temperature data from the transponder and also acts as a remote power source for the transponder. The RFID receiving is coupled to the processor module.

Figure 24:
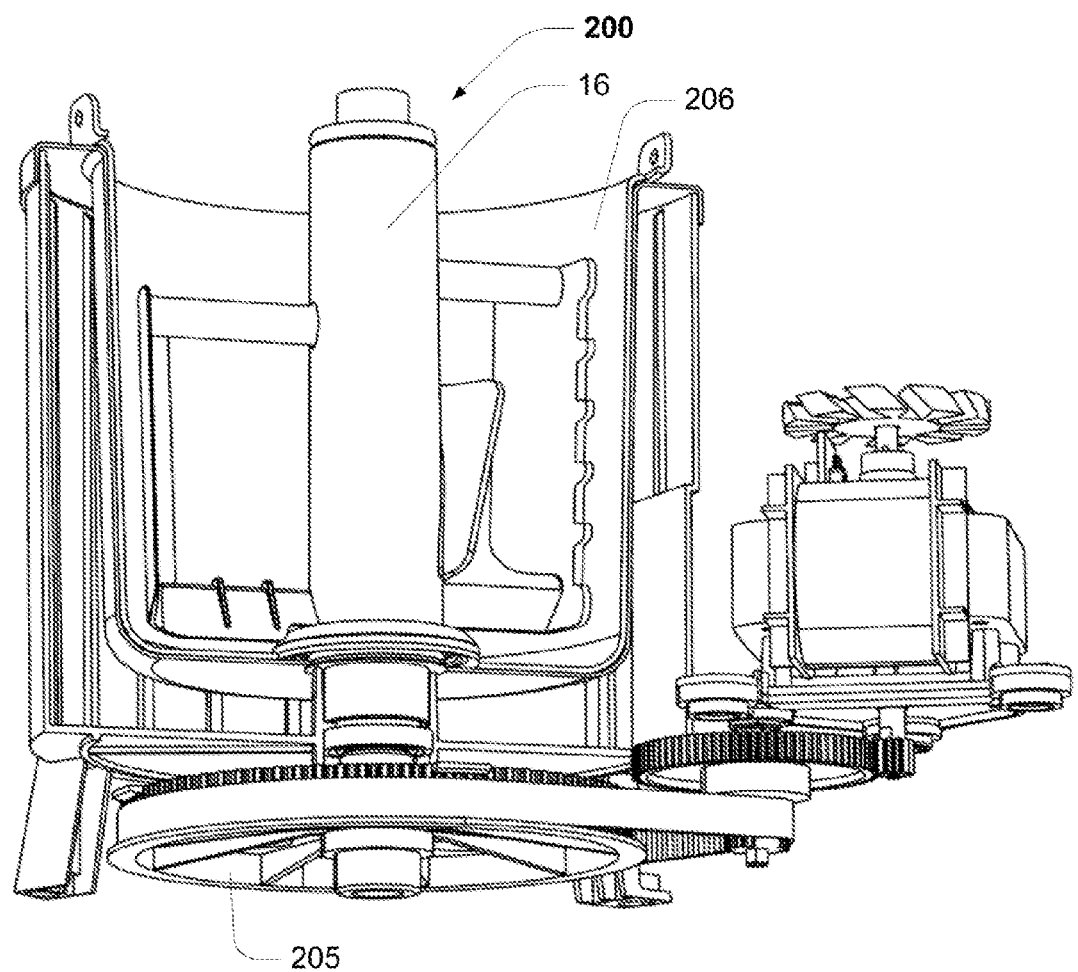
FIG. 24 is a perspective view, partially cross sectioned illustrating an ice cream bowl, scraper blade and its drive train.

FIG. 7A through FIG. 11 and FIG. 24 also illustrate a top driving arrangement for the scraper blade 16. A top drive arrangement refers to one in which the mechanical coupling between the scraper blade and the power train occurs at the top of the scraper blade. With a top drive arrangement, the liquid level within the ice cream bowl must reach the top of the scraper blade 16 before liquid can leak out of the bowl. Where a scraper blade is coupled to the power train through the bottom of the bowl, the opportunity exists for leakage through the drive coupling seal that is provided between the drive coupling and the bottom of the bowl. As shown for example in FIG. 7A, the interior of the ice cream bowl can further comprise a vertical tube 200 through which can pass a drive shaft (not shown) that drives the scraper blade from its upper extent 200 rather than from the bottom 201. As shown in FIG. 24, the last driven gear 205 is actually below the ice cream bowl 206. However, torque is transmitted to the scraper blade 16 by a connection with a power train that passes through the interior of the scraper blade 16 and connects with it at or toward the upper extremity 200.

Figure 25:
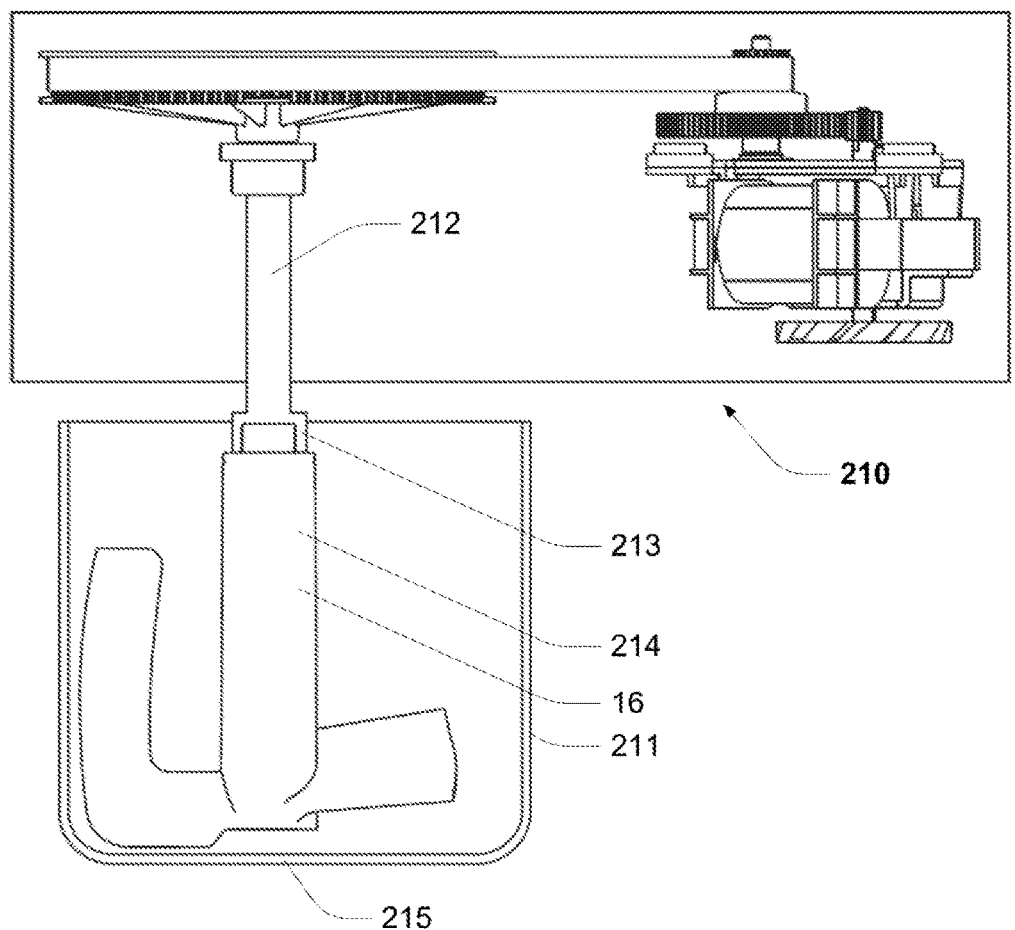
FIG. 25 is schematic side elevation illustrating a top drive arrangement.

Another example of a top drive arrangement is shown in FIG. 25. In this example, the motorized drive train 210 is located wholly or in part above the ice bowl 211. In this example, the final mechanical component of the drive train is a vertical shaft 212 that features a mechanical coupling 213 at its lower extent. The coupling 213 engages an upper extent 214 of the scraper blade 16, thus eliminating a need for a drive coupling, opening or vertical tube of any kind through the bottom 215 of the mixing bowl.

A top drive arrangement has a particular advantage over a bottom drive especially where an epicyclic blade movement is required. With a top drive arrangement, the ice cream bowl can be completely closed from the bottom as the blade enters the bowl cavity. In the example of an epicyclic blade movement the final driving shaft (212, see FIG. 25) can describe a complex motion that would otherwise require an elaborate sealing arrangement or a large diameter turret to protrude into the bowl cavity from the bottom.

The ice cream base is generally part of what makes ice cream creamy and contributes to mouth feel. The basic principle for making an ice cream base is to use cream or milk, egg yolks and sugar. One can create a mix from these ingredients without heating and this mixture is generally referred to as a cream base. However, for some styles, heat is used in the process to create what is known as a custard base.

To create a conventional custard base, egg yolks and sugar are beaten or mixed until thick. The milk is separately and slowly brought up to the boiling point. Egg yolks and sugar are then mixed into the hot milk while continuously stirring, or gentle heat, until the custard thickens. It is important not to bring this mixture to the boil at it may curdle, so accurate temperature control is an important consideration.

There are a number of different ways heating may be incorporated into an ice cream maker to alleviate the need to do the heating step on a separate stove. The advantage of this is that the user will is not required to use (and wash) a separate saucepan. Accordingly, the present technology provides an ice cream machine that mixes and heats the ingredients prior to making the ice cream. Heating of the ice cream bowl can be achieved by one of the following ways:

1. A removable ice cream bowl 15 that can be placed directly on the stove (removing the need for an extra saucepan (see FIG. 8).
2. A die-cast element 100 attached to an aluminium heat distribution plate 101, in turn attached to the inner lining of the ice cream maker (see FIG. 9).
3. A printed element 110 attached to the inner lining of the ice cream maker. Printed elements are compact and can be switched on/off very quickly (see FIG. 10).
4. An induction coil 120 that sits at the base or wraps around the inner lining of the ice cream maker designed to heat the ice cream bowl (see FIG. 11). Induction heating is faster and more than die cast elements; moreover, they allow instant control of heating energy. Induction heating coils do not themselves warm the surrounding air. This results in further energy efficiencies and reduces the impact of the cooling cycle when freezing the ice cream.
5. A reverse cycle system, as shown in FIGS. 12 and 13 where an additional reversing valve is used to direct the heat back into the inner lining of the ice cream maker.

Figure 26:
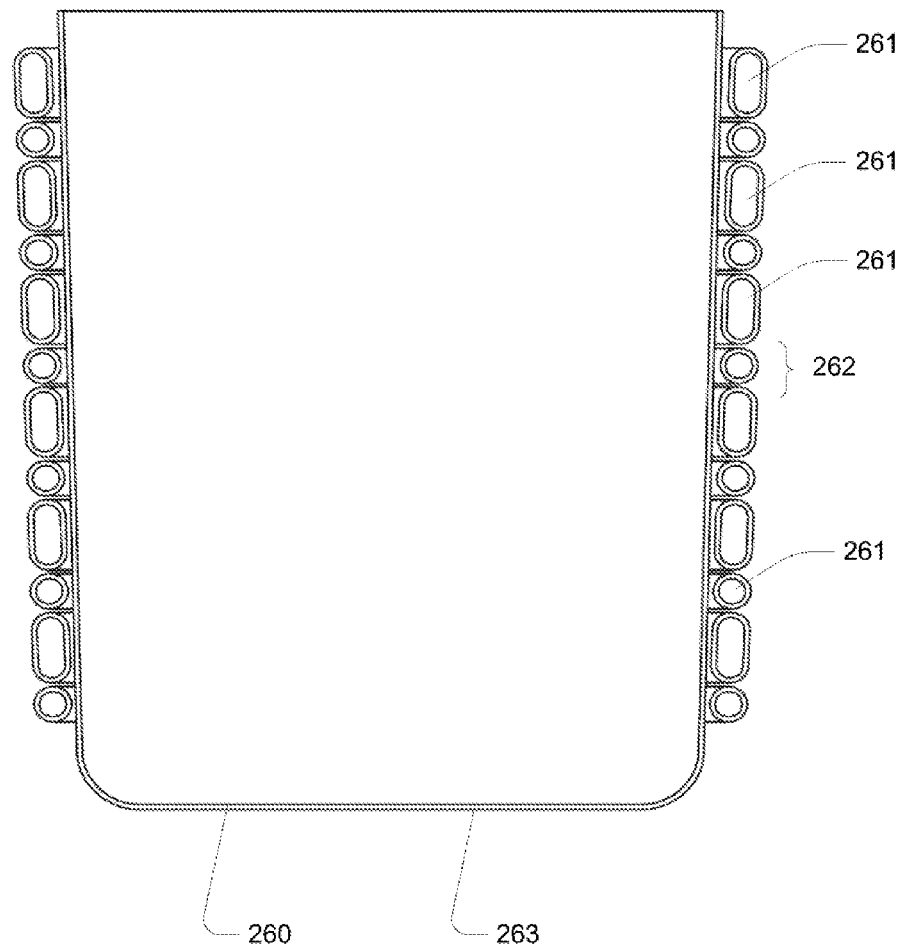
FIG. 26 is a side view, partially sectioned of an ice cream bowl having both cooling coils and induction coils.

FIG. 26 illustrates and example of a refrigerated ice cream bowl having its own induction coil. In this example, the bowl 260 is encircled or wrapped with a cooling coil 261 that extends along the length of the bowl. Gaps 262 between the cooling coils 261 are wide enough to accommodate an induction coil 262 which, in this example, is essentially coextensive with the cooling coils along the length of the bowl 260. Additional induction coils or cooling coils can be provided about the base or floor of the bowl 263.

Figure 27:
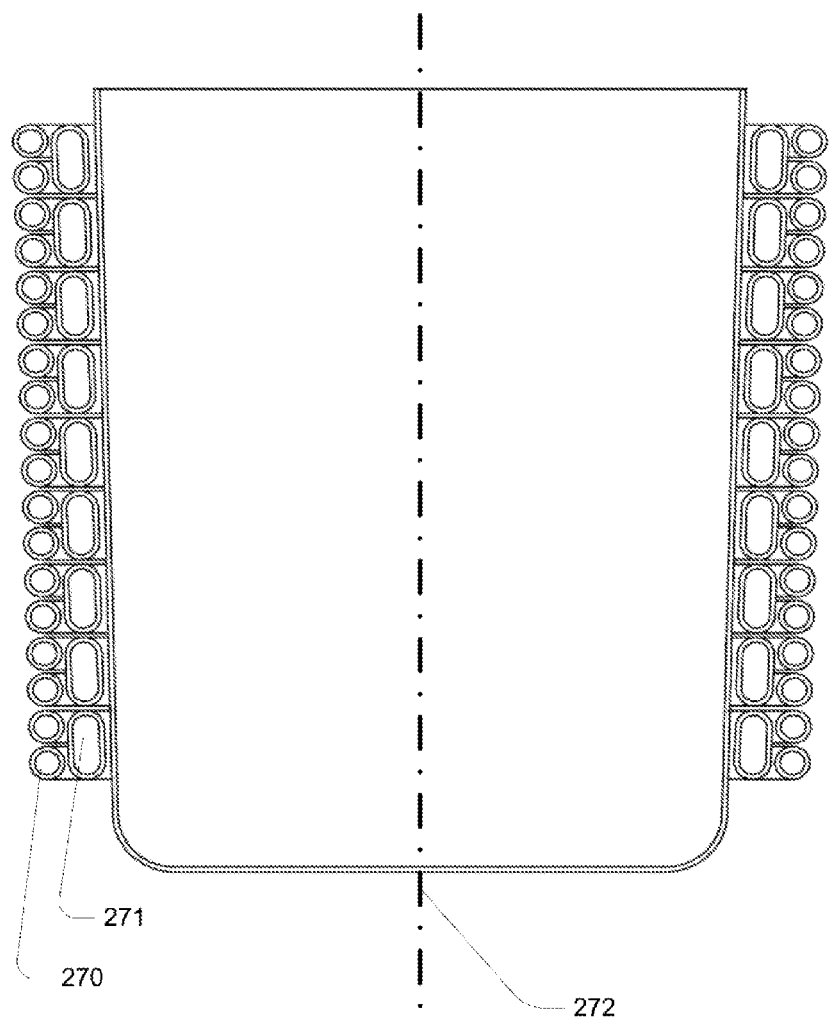
FIG. 27 is a side elevation, partially sectioned, illustrating concentric cooling and induction coils.

In another embodiment shown in FIG. 27, the induction coils 270 and cooling coils 271 are concentric with other another with reference to the longitudinal axis 272 of the ice cream making bowl. In this particular example, the induction coils are radially outward of the cooling coils.

Figure 12:
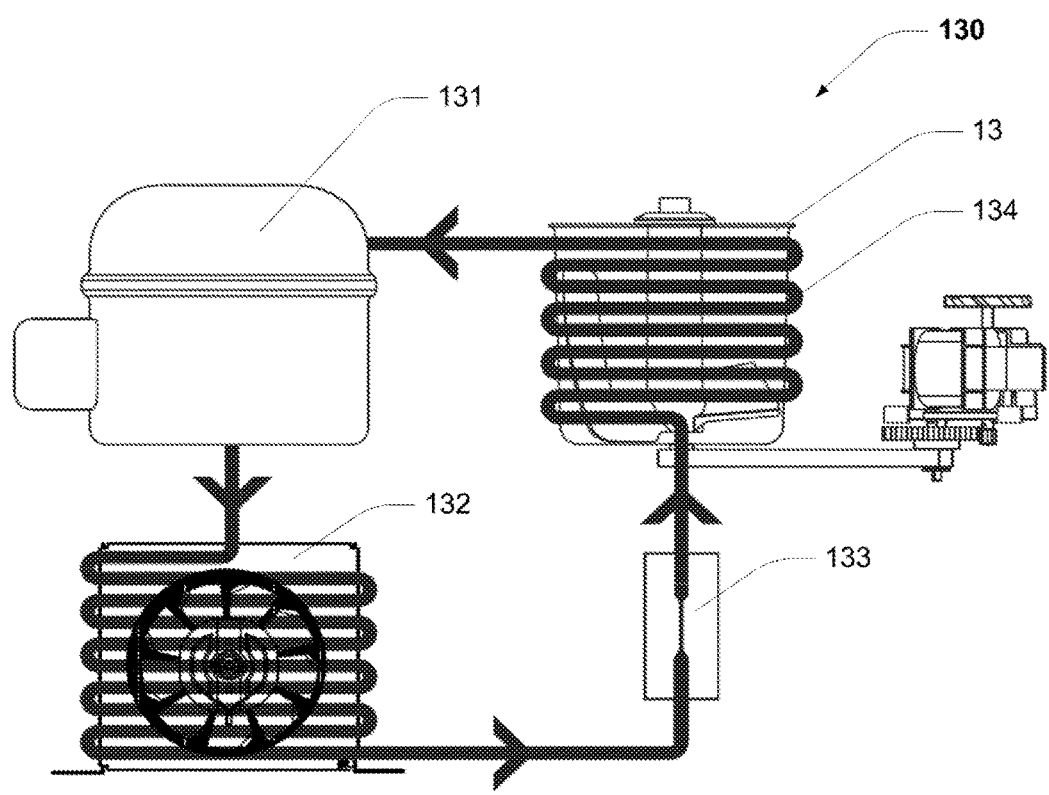
FIG. 12 is a schematic diagram of a cooling cycle.
Figure 13:
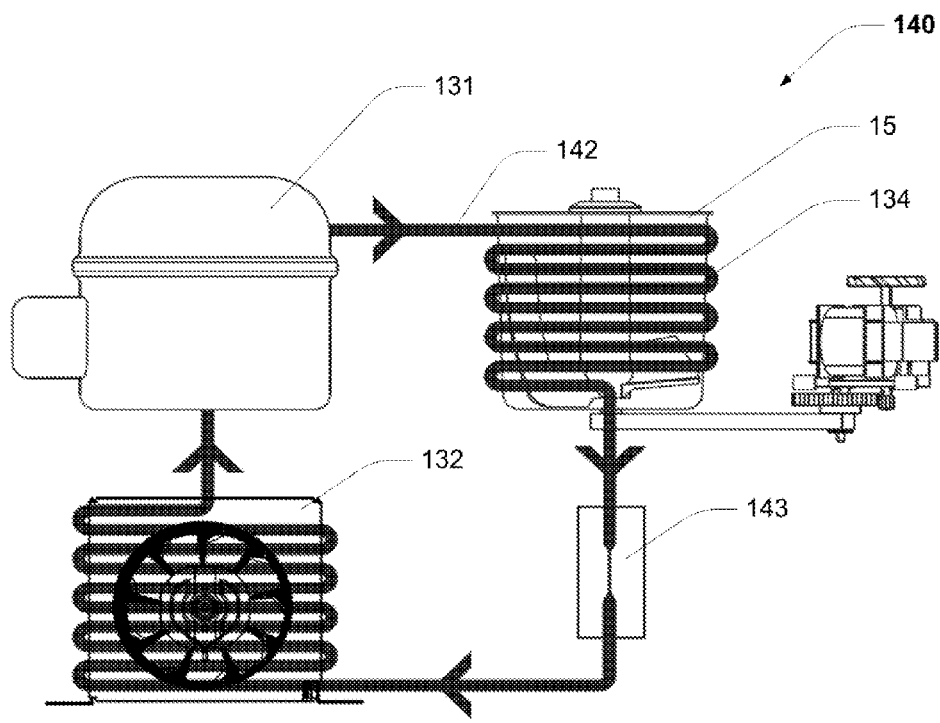
FIG. 13 is a schematic diagram of a heating cycle.

In the cooling system of an existing ice cream makers 130 (as shown in FIG. 12), the compressor 131 compresses cool Freon gas, causing it to become hot, high-pressure Freon gas. This hot gas runs through a set of first coils 132 so it can dissipate its heat, and it condenses into a liquid. The Freon liquid runs through an expansion valve 133, and in the process it evaporates to become cold, low-pressure Freon gas. This cold gas runs through a set of second coils 134 that allow the gas to absorb heat and cool down the air inside the ice cream container or bowl 15.

As shown in FIG. 13, a reverse cycle system 140 uses the compressor 131 to pump the Freon gas in reverse, and as opposed to cooling the ice cream chamber, it heats it instead. The hot pressured gas 142 heats the bowl 15 via the second coils 134, then passes through the expansion valve 143 in reverse before passing through the first coils 132.

Mixing is an integral part of the ice cream making process. Whether it be the mixing of the raw ingredients of the premix into the ice cream base, of the churning of the ice cream in the freezer bowl. Currently, ice cream machines mix ice cream during the freezing process only. Due to the fact that it is the sides of the ice cream bowl that is being cooled, it is necessary to employ a mixing action that exposes the entire contents of the bowl to this freezing surface.

Present ice cream makers have a rotating blade accessory, usually with two blades or paddles, each serving a different purpose. On one side, a paddle deposits a thin layer of the ice cream mix against the side of the freezer bowl. The other paddle scrapes the side of the bowl to remove the thin partially frozen ice cream mix in preparation for a new layer to be deposited. It is this continuous action of layering and scraping away that eventually enables all of the contents of the ice cream bucket to freeze and form ice cream.

Mixing speed is also an important aspect in making ice cream. A blade that is spinning too fast will not be effective, as the ice cream mix may not have sufficient time to cool on the surface of the ice cream bowl. A blade that is spinning too slow will take a long time to produce the ice cream as well as not being able to introduce enough air into the mix to make the ice cream light and fluffy.

Figure 14:
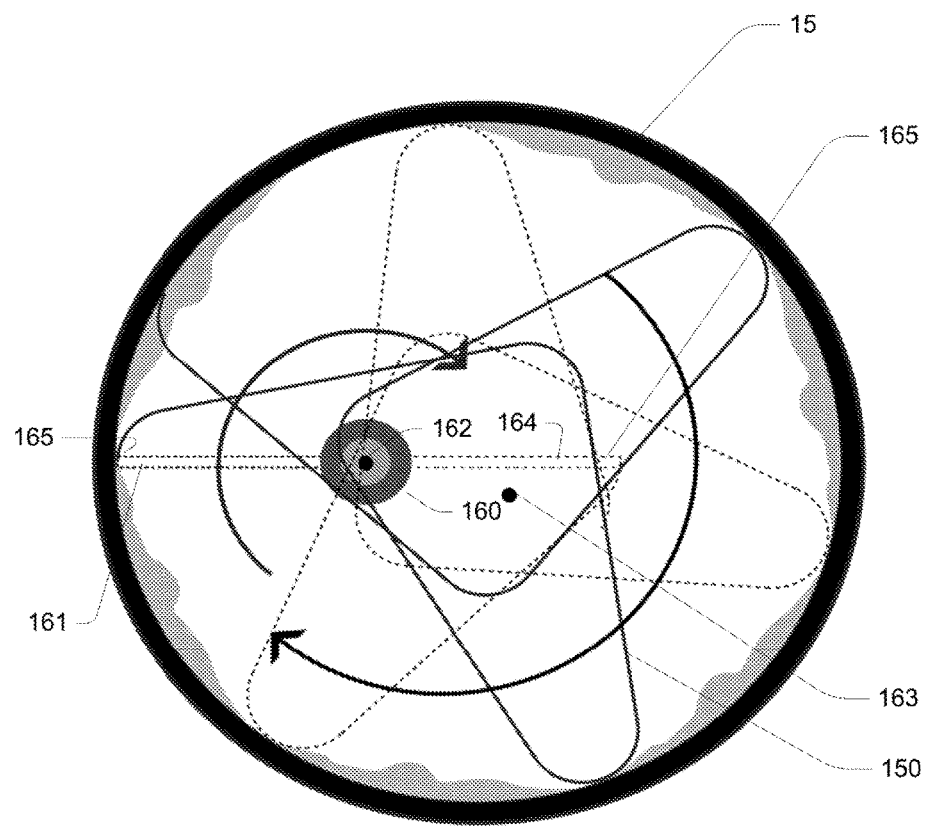
FIG. 14 is a top plan schematic view of an epicyclic blade motion.
Figures 15, 16:
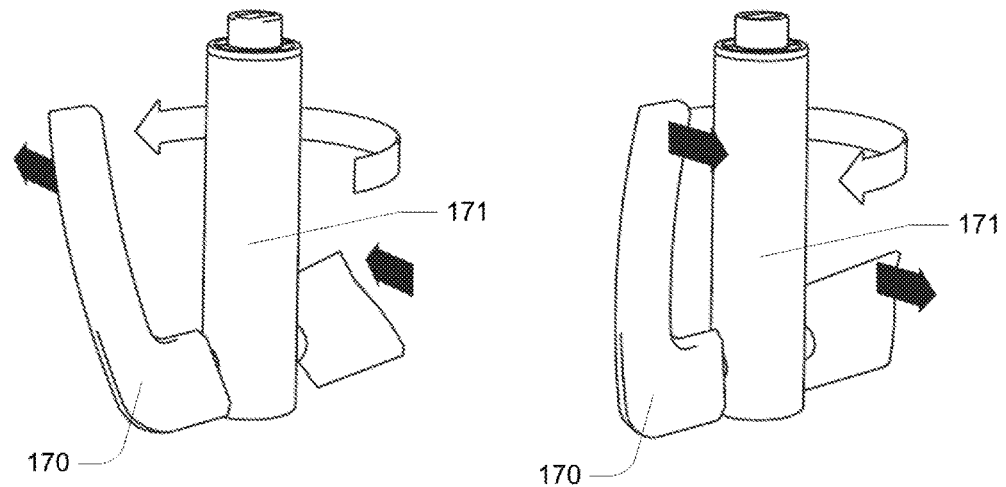
FIG. 15 is a perspective view of an ice cream blade.
FIG. 16 is a perspective view of an ice cream scraper blade.
Figure 17:
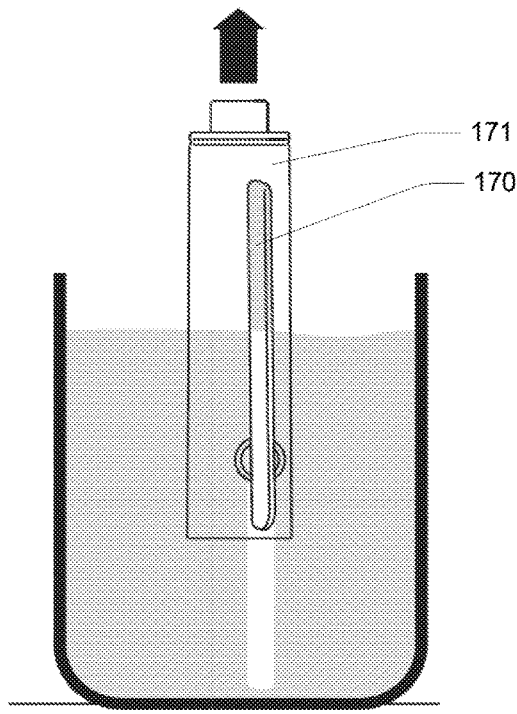
FIG. 17 is a side elevation of a scraper blade in an ice cream bowl.
Figures 18, 19:
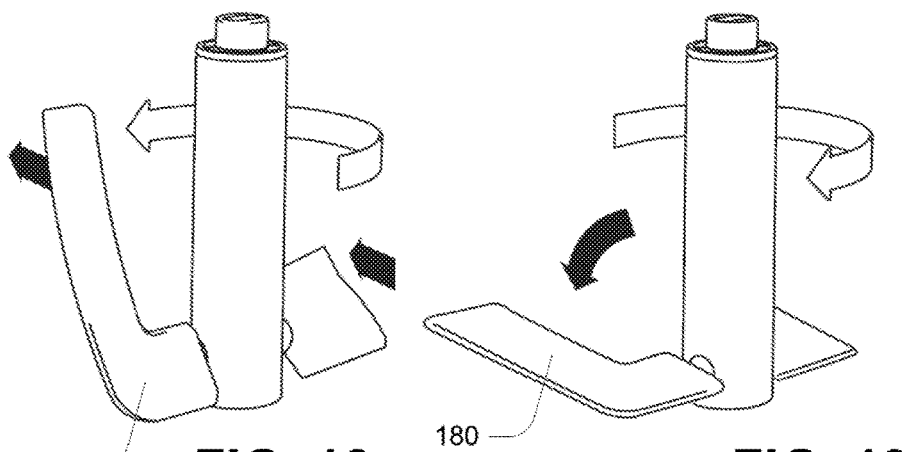
FIG. 18 is a perspective view of a scraper blade.
FIG. 19 is a perspective view of a scraper blade.

As shown in FIG. 14, a epicyclic action 150 is when the paddle or blade accessory moves in a pattern that is akin to the path of a point on a rotating disk that is rotating about the centre of the blade. The bowl 15 is stationary. In this example, the hub 160 that supports the blades 161 rotates about its own centre 162 as the hub orbits the centre of the bowl 163. Accordingly, the blades make only periodic contact with the bowl and the two opposed blades 161, 164 alternate in their contact with the bowl 15.

The benefits of epicyclic action to ice cream making goes further than the traditional application of simply mixing the ingredients well.

Firstly, unlike a normal blade where one side is scraping and the other is layering, epicyclic mixing action uses a scraping blade on both sides 161, 164. In a preferred embodiment, the blade is made of a soft silicone edge 165 where it can compress to ensure effective scraping.

Due to the fact that the ice cream is not scraped off the bowl with every revolution of the shaft, the ice cream is allowed to cool for a longer duration. As a result, the shaft can also rotate faster compared to a standard rotating blade which is useful to introduce more air into the ice cream mixture. The combination of these facts help make the ice cream faster and fluffier compared with a standard rotating blade.

As mentioned earlier, to make ice cream, the blade needs to spin at a specific speed as to ensure that the ice cream is frozen effectively. The speed at which the blade spins is too low for the mixing or whisking required in making the custard base. Therefore, the present technology incorporates variable blade speed functionality where the user can adjust the blade speed depending on how fast they want to mix the ice cream mixture.

Variable blade speed can be achieved either electronically (using e.g. a potentiometer) or mechanically (using e.g. a variable speed motor or gearbox).

Another aspect of ice cream making is the removal of ice cream from the paddle and ice cream bucket upon completion of the cycle. Before removing the ice cream from the bowl, one would normally remove the ice cream paddle first to allow more access to the ice cream.

Both blades on the ice cream paddle are angled for two reasons. One promotes the upward movement of the ice cream (scraping side), whilst the other promotes the opposite downward movement (layering side). This action ensures well mixed ice cream as it allows vertical movement of the mixture in addition to the rotational action of the blade.

Due to the consistency of the ice cream and the shape of the paddle, it is common for the ice cream to adhere to the paddle upon ejection. The problem for the user is scraping the ice cream from both the paddle and the bowl to remove all the ice cream from the container.

As shown in FIG. 15 through FIG. 18, the blades or paddles 170 can be pivoted into a vertical position relative to the hub 171. This way, there is less horizontal surface area for the ice cream to adhere to during paddle ejection. The paddles 170 will automatically orientate themselves between angled (FIG. 15) and vertical (FIG. 16) through the rotational or pivoting movement of the paddle itself. The resistance provided from ice cream mixture acting on the pivoting paddle will force the blades into an angled or inclined position (FIG. 15) when the blade is turning anti-clockwise (viewed from the top), and return to a vertical position (FIG. 16 and FIG. 17) when turning clockwise.

Figure 20:
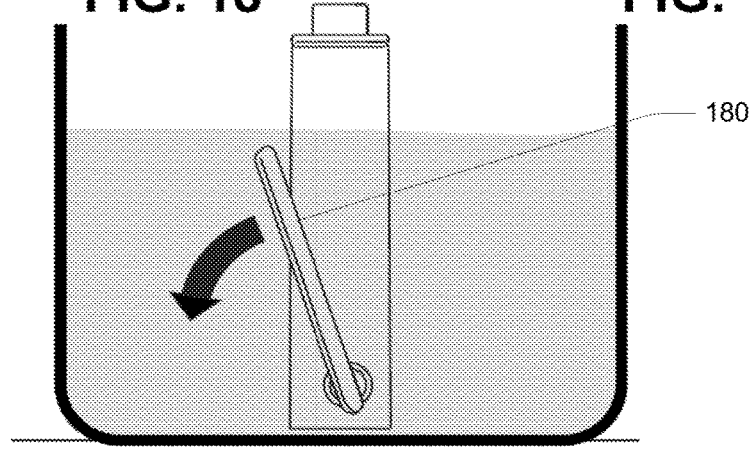
FIG. 20 is a side elevation of an ice cream scraper blade in a vessel.
Figure 21:
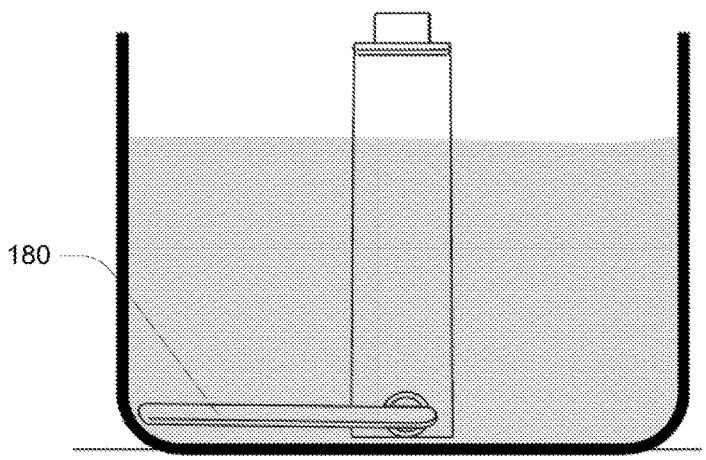
FIG. 21 is a side elevation of an ice cream scraper blade in a vessel.

In another example and to improve access to the ice cream when its ready, (see FIG. 19 through FIG. 21), the blade remains in a mixing position (FIG. 18 and FIG. 20) and is instead articulated or rotated into a horizontal flat position (FIG. 19 and FIG. 21) when the motorised rotation of the blade is reversed.

The flat horizontal blades 180 will allow for more room to insert a ice cream scoop to extract the ice cream from the bowl without the blades getting in the way.

The resistance provided from ice cream mixture will force the blades into an angled position when the blade is turning anti-clockwise, and return to a horizontal position when turning clockwise.

Figure 22:
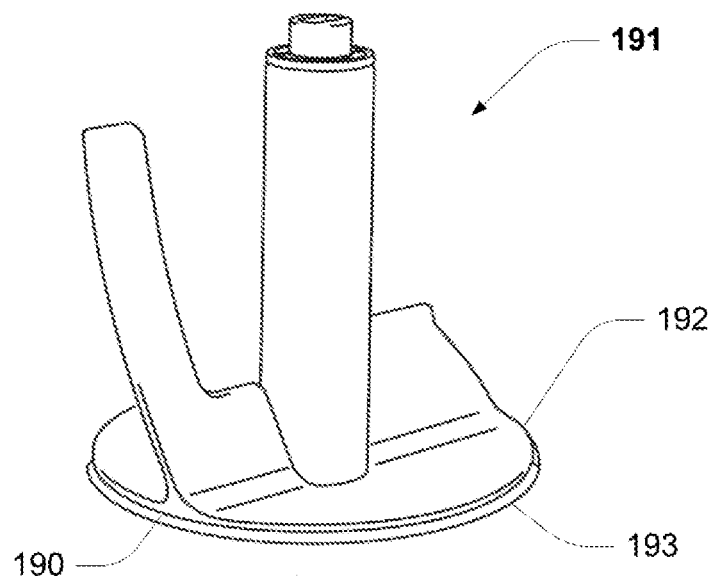
FIG. 22 is a perspective view of an ice cream scraper blade.
Figure 23:
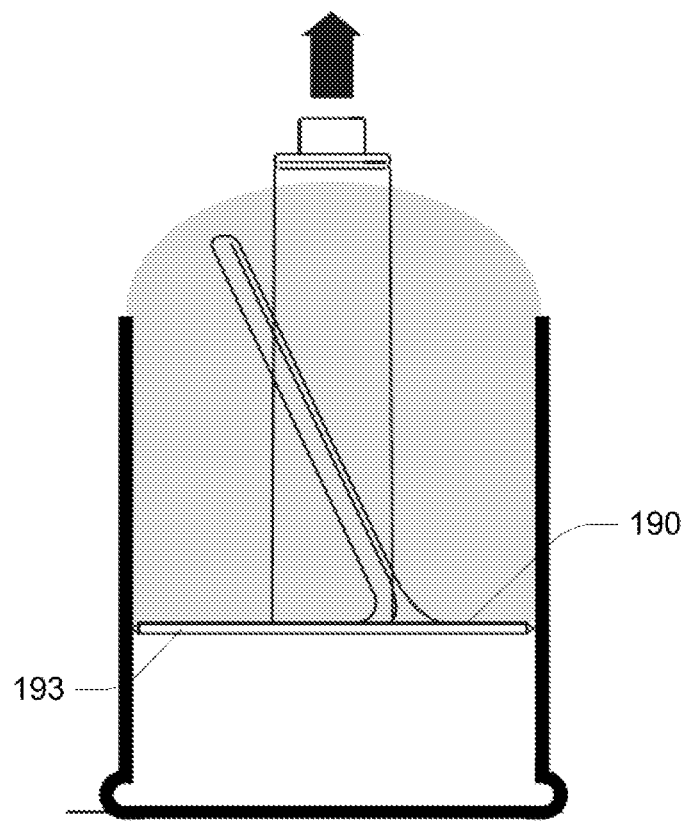
FIG. 23 is a side elevation of an ice cream scraper blade being removed from an ice cream bowl.

In another variation with or without folding blades and shown in FIG. 22 and FIG. 23, the ice cream is ejected along with the ice cream paddle. This removes the need to scrape ice cream from the bucket as this is done through the removal of the ice cream paddle.

To achieve this, a base 190 is formed as part of the blade assembly 191. On the circumference 192 of this base is a silicone ring 193 which effectively scrapes the side of the bowl as it is removed from the bowl 15 to ensure as much of the ice cream is collected as possible during the ejection of the paddle. Soft silicone is used so not to damage the side walls of the ice cream bucket through constant use.

Figure 28:
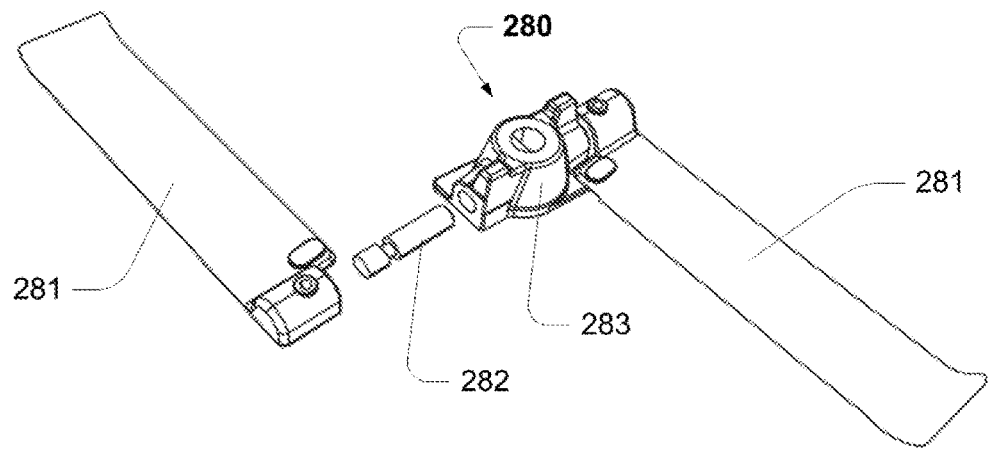
FIG. 28 are partially exploded perspective views of an ice cream scraper blade comprising articulated blades and a hub.
Figure 29:
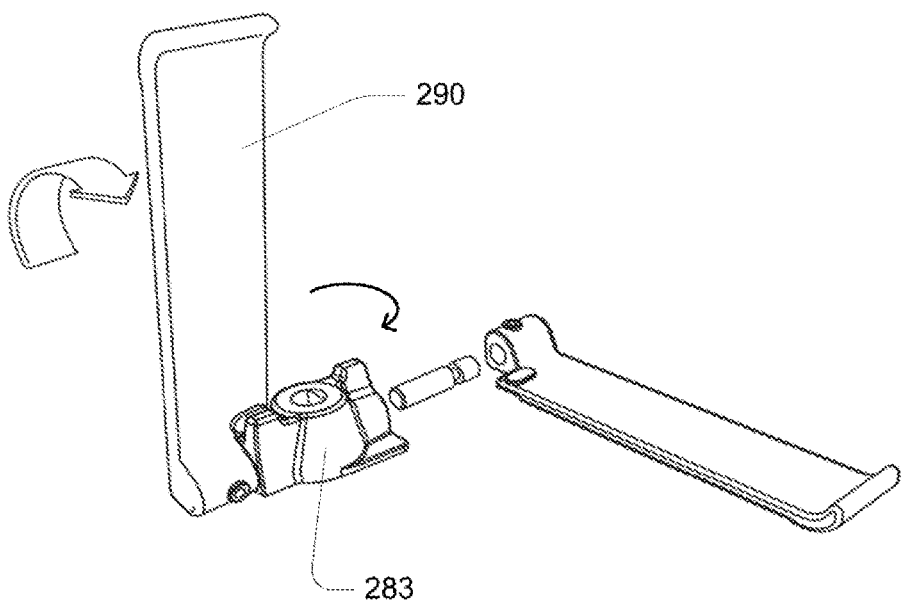
FIG. 29 are partially exploded perspective views of an ice cream scraper blade comprising articulated blades and a hub.

FIG. 28 illustrates an example of an articulated blade assembly. In the ice cream eject mode, the motor will drive the blade in and anti-clockwise direction 280. Due to the shape of the blades 281 they will be forced to fold flat as close to the bottom of the bowl as possible. A horizontal stub shaft 282 connects each blade 281 with a hub 283. FIG. 29 illustrates one blade 290 being vertically oriented owing to a clockwise rotation of the hub 283. The pressure of the ice cream mixture against the blade raises the blade into the vertical or churning orientation.

Figure 30:
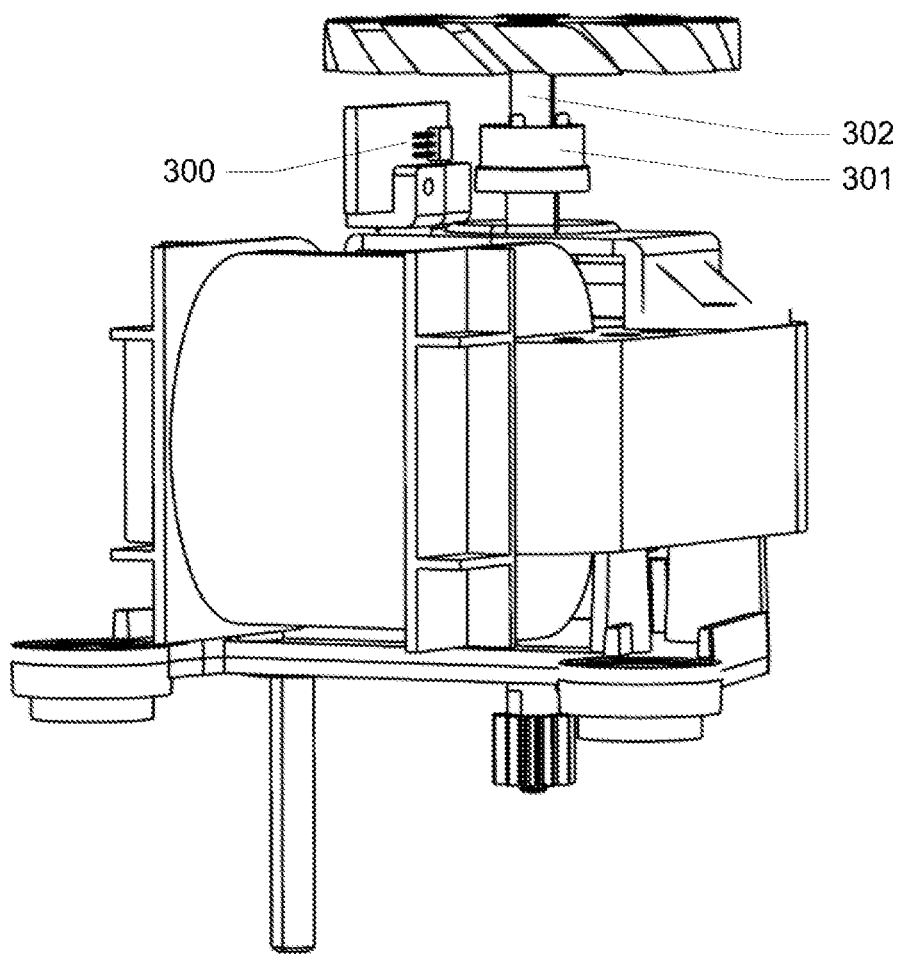
FIG. 30 is a perspective view of a motor with hall sensors.
Figure 31:
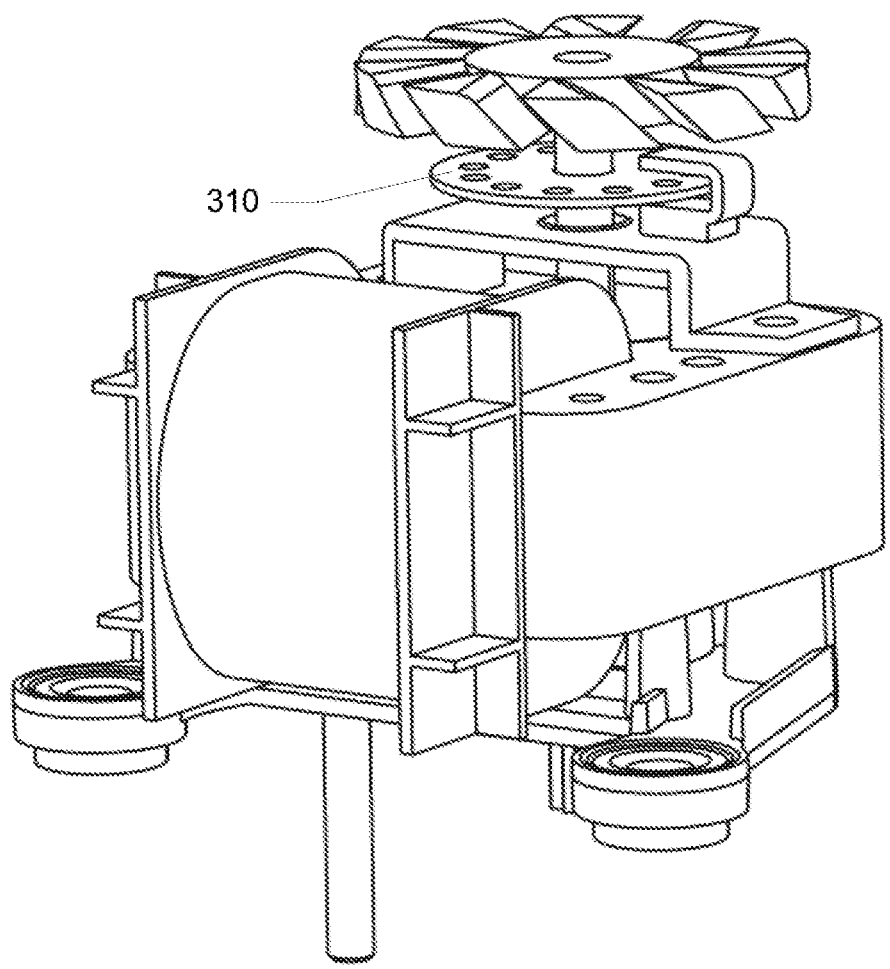
FIG. 31 is a perspective view of a motor with counter disk.

While the present invention has been disclosed with reference to particular details of construction, these should be understood as having been provided by way of example and not as limitations to the scope or spirit of the invention. To the extent that the ice cream maker of the present invention requires variable speed motor operation or any form of motor speed or motor position monitoring, this can be achieved by way of (e.g. as shown in FIG. 30) a hall sensor 300 working in conjunction with a hall transducer 301 located on a motor output shaft 302 (or other portion of the power train). Another method of monitoring motor output shaft speed or position (e.g. as shown in FIG. 31) is the use of a counter disk 310, as is well known in the art.

Figure 32:
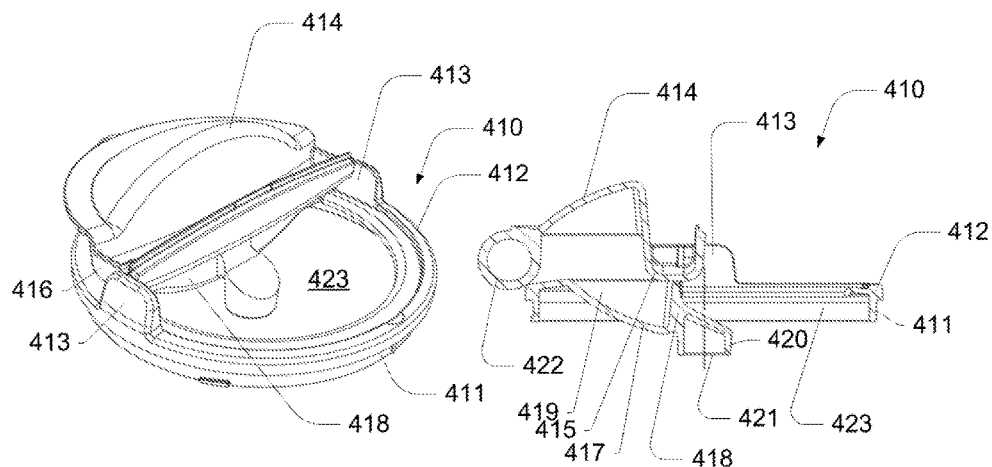
FIG. 32 is a perspective view and a cross section of a lid for an ice cream making machine in the open position.
Figure 34:
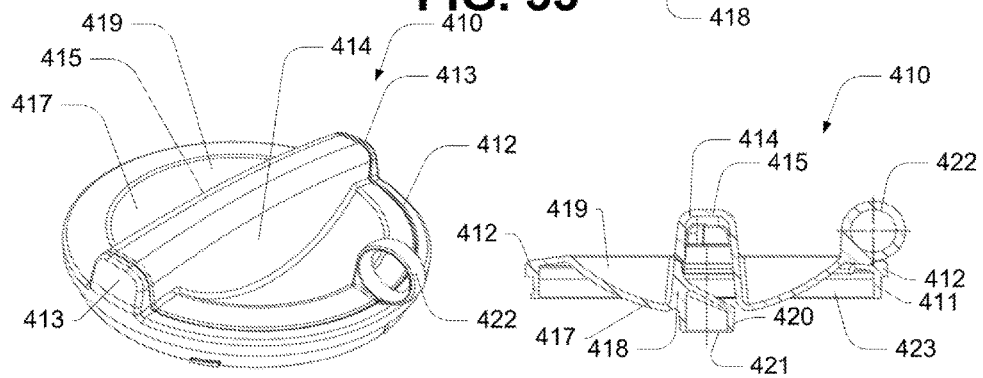
FIG. 34 is a perspective view and a cross section of a lid for an ice cream making machine in the fully closed position.

As shown in FIG. 32, a lid 410 for an ice cream making machine is intended to cover the removable container in which the ice cream is made. The lid has a bayonet mounting portion surrounding a lower rim. The lid 410 has a circular perimeter 412. The perimeter 412 has a pair of opposed and upright ears 413. The ears 413 pivotally support a pivoting lid portion 414. The lid portion 14 has an inverted "U" shaped channel 415, preferably with end walls 416, the "U" shaped channel forming a handle and conforming in shape with the ears 413 when the lid portion is closed (see FIG. 34).

In preferred embodiments, the lid 410 is approximately half obstructed by a generally semi-circular, recessed lid portion 417 that is integral with the periphery 412. The lid portion 417 includes a transverse upright web 418 that extends below the periphery 412. The web 418 forms a wall of an arcuate depression or recess 419 in the lid 410 that improves the grip. Together, the lid portion 417 and the wall 418 support an integral journal 420 having a downward facing opening 421. The opening is adapted to receive the upper extent of a rotating shaft that carries the ice cream making paddles, or alternately, a portion of the paddle assembly. The purpose of the journal 420 is to stabilise the rotating motion of the ice cream making paddles.

Figure 33:
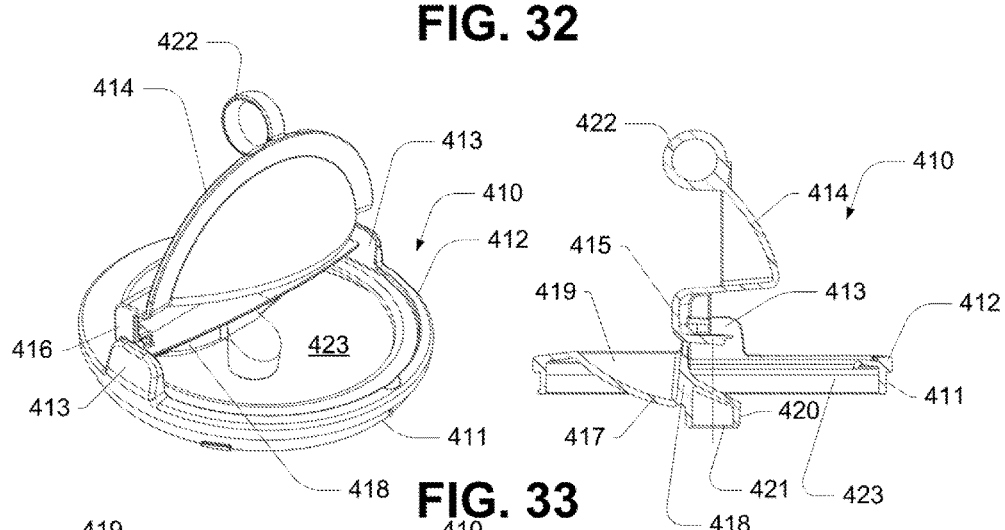
FIG. 33 is a perspective view and a cross section of a lid for an ice cream making machine in the partially open position.

The rotating part of the lid 414 has a ring shaped or "O" shaped sub-handle 422. Using the handle, a user can rotate (open and close) the lid segment 414 about an axis of rotation that is central to the primary "U" shaped handle portion or channel 415. As shown in FIG. 32, this arrangement provides for both a robust transverse handle 415 for disengaging the lid 410 as well as providing for a large lid opening 423 (see FIG. 33) through which mix-in ingredients may be added to the ice cream mixture.

Figure 35:
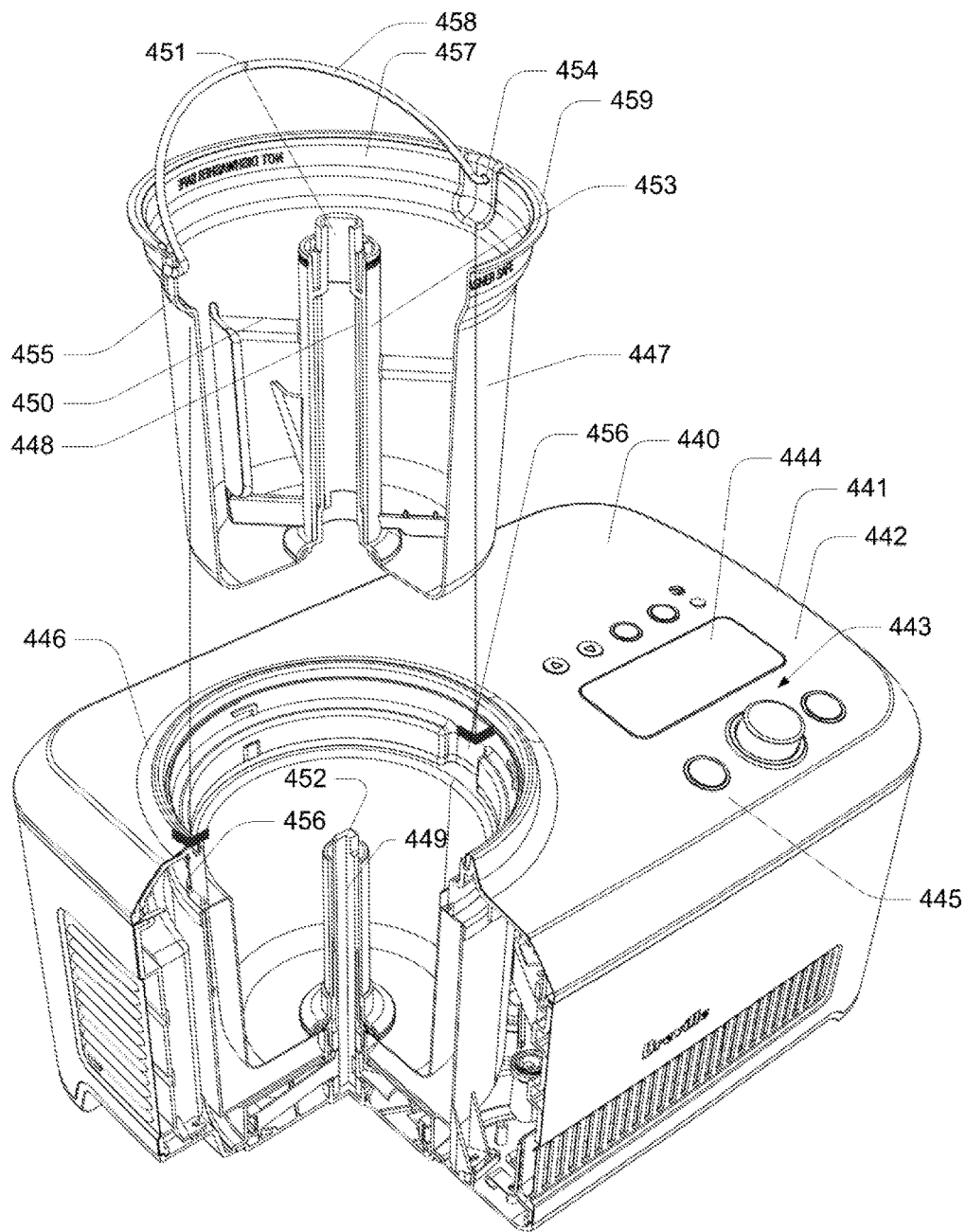
FIG. 35 is a perspective view of an ice cream making machine and removable interlocking container.

As shown in FIG. 35, an ice cream making machine 440 has an external case 441 and an upper surface 442 featuring a user interface 443. The user interface has a central graphic display panel 444 and various controls 445 that allow a user to operate the machine and express preferences for the ice cream making process. The upper surface 442 also has a main opening 446 for receiving a removable ice cream making container. The container is preferably thermally conductive such as aluminium or steel and has an integral upright central tubular portion 448 for accommodating the rotating motor shaft 449 that extends from the base of the main opening 446. The container 447 accommodates mixing blades 450 having a coupling 451 at an upper extent that receives the upper end 452 of the rotating shaft 449. The mixing blades 450 are fixed to a cylindrical core 453 that extends the length of the tubular portion 448 and is stabilised, in rotation, by it. Accordingly, the blades 450 can be removed from the container 447 and the container 447 can be removed from the main opening 446. When in operation the main shaft 449 rotates the blades 450, a torque force is exerted onto the container 447. So that the container does not rotate when the blades rotate, the upper extent of the container is provided with a pair of opposing protrusions that engage with cooperating recesses 456 formed in the open mouth or upper area of the central opening 446. In preferred embodiments, the protrusions 454, 455 are pressed into the rim are 457 of the container 447 and are adapted to receive the ends of a pivoting wire handle 458 or bail that is received within the mouth opening 459 of the container 447.

Figure 36:
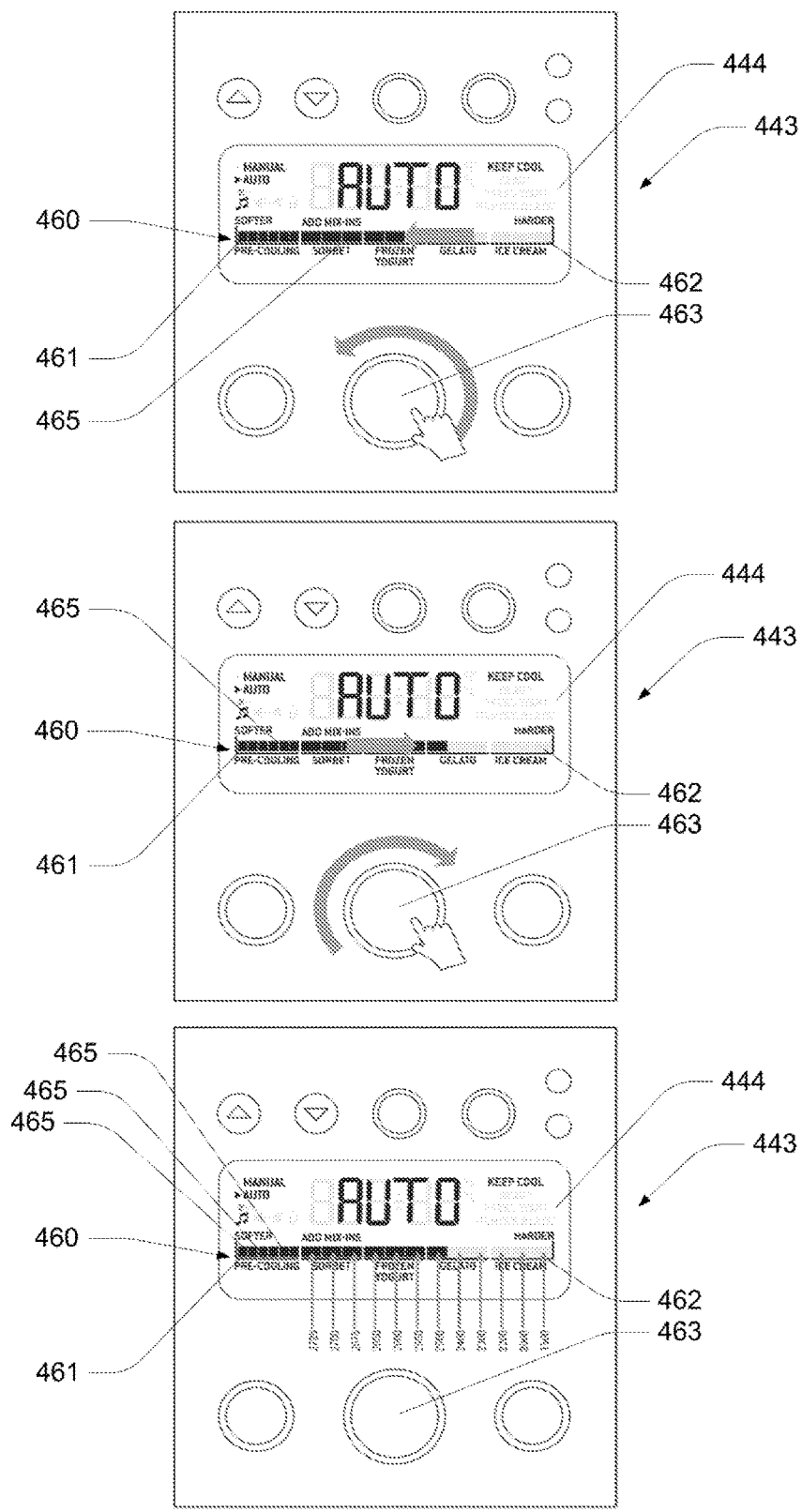
FIG. 36 illustrates a user interface and control for adjusting ice cream hardness.

As shown in FIG. 36, a user interface 443 comprises a central graphic display 444. The display includes a segmented graphic indicator 460. The indicator may be any shape. In this example, it is linear. The indicator 460 comprises a plurality of segments that are activated in sequence to represent ice cream hardness. One end of the indicator 461 represents ice creams or frozen desserts that are the softest. The other end 462 indicates ice cream and frozen desserts that are the hardest. The softness or the hardness of the particular ice cream or frozen dessert being made is selected, in this example, by a user operable rotating knob 463. The knob provides a signal to the device's micro processor. The micro processor will also receive information about the speed of the motor or drive train that indicates the rotational speed. The motor or drive train will slow, in rotation, when under load. A harder ice cream will result in a greater motor load and therefore a slower rotational speed. Accordingly, each segment 465 of the indicator portion 460 represents a distinct and pre-established motor or drive train rotational rate. When the motor or drive train slows to the selected rate, according to the output or a rate sensor as detected by the micro processor, the ice cream making process will stop. This will entail a stopping of the primary motor and the refrigerant compressor. The device is adapted to maintain the ice cream at the pre-selected hardness by periodically rotating the blades and measuring the resultant motor or drive train rotational rate. Where the actual rotational rate is below the user pre-selected rate or hardness, the motor and compressor will be turned on until the rotational rate sensor indicates that the pre-selected hardness has been achieved once more. As suggested by FIG. 36, the range of ice cream hardness is displayed to the user covers a spectrum including soft ice cream, then sorbet, then frozen yoghurt, then gelato, then ice cream. In this example, the activation of each segment 465 represents an increase in hardness in the right hand direction.

Figure 37:
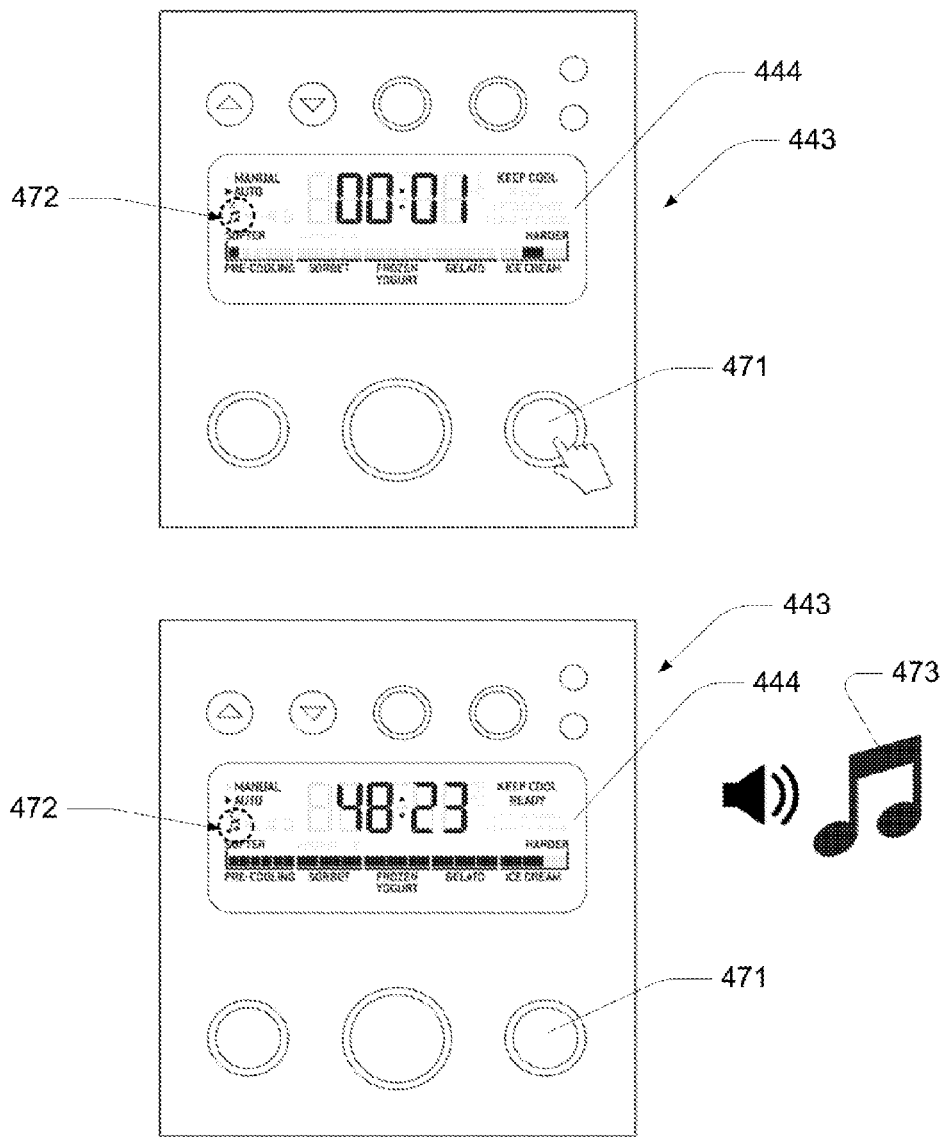
FIG. 37 illustrates an interface of an ice cream making machine illustrating a musical alarm.

As shown in FIG. 37, the user interface includes an optional, audible alarm. The audible alarm features is turned on and turned off with a user operable button 471 that forms a part of the interface 443. When the audible alarm function is selected using the button 471 a portion 472 of the graphic display 444 displays a symbol that indicates to the user that an audible alarm has been selected. When the ice cream making process is completed, the audible alarm sounds. The sound of the audible alarm may be either a tone, or words, or music 473. The music 473 may be a tune or a part of a tune that is associated, in the user's mind, with ice cream. The selector button 471 can be used to select from a number of different musical tunes or tune portions 473.

Figure 38:
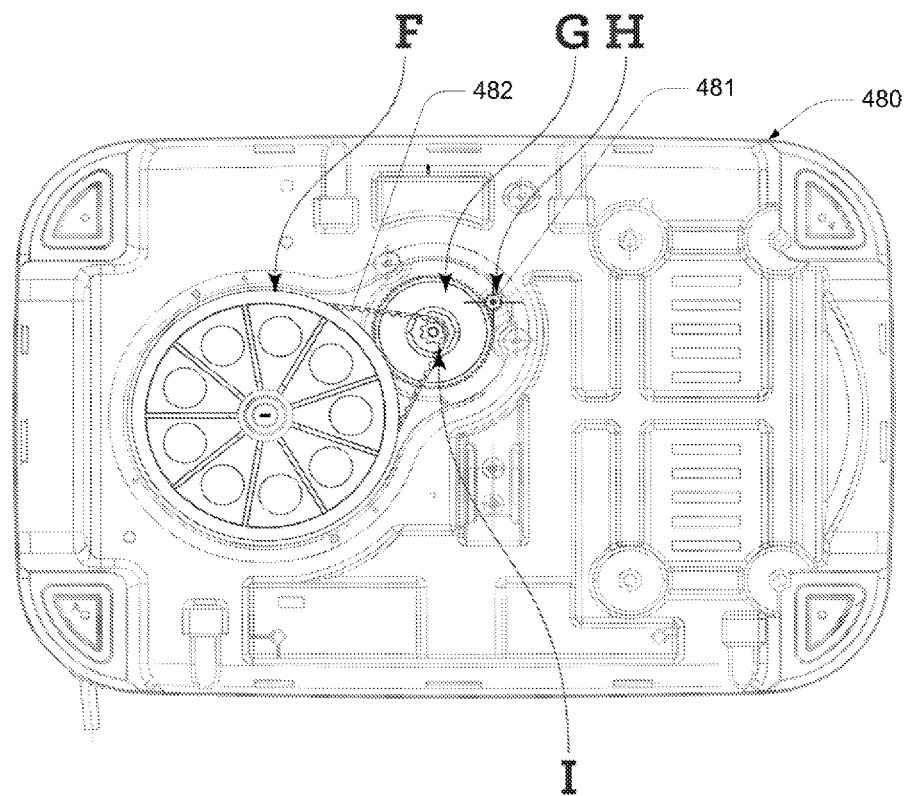
FIG. 38 is a cross sectional view of an ice cream machine illustrating the motor and drive train.

As shown in FIG. 38, an ice cream making machine has a rigid chassis 480. The chassis supports a motor mount (not shown in this view) that locates the vertical shaft of an electric motor 481. The motor's output shaft has a pinion gear H. The motor's pinion gear H rotates a first intermediate drive gear G. The first intermediate drive gear G has a peripheral set of gear teeth that engage with the pinion gear H. The intermediate drive gear G also has a secondary and smaller circular gear set I with fewer teeth than the peripheral gear set that engages with the pinion H. The second gear set I drives a transmission belt 482, preferably a toothed belt, that transmits torque to a speed reducing gear F. The speed reducing gear F is used to drive the shaft that rotates the ice cream making blades. A device of this kind may be sold in countries having different power requirements. Accordingly, the ice cream making chassis 480 may be fitted with either a 120V or 220-240V electric motor, wherein both motor types have the same mounting type. Because motor torque is used to monitor ice cream hardness, it is important the effective torque of the motor be constant regardless of the motor that is used.

Figure 39:
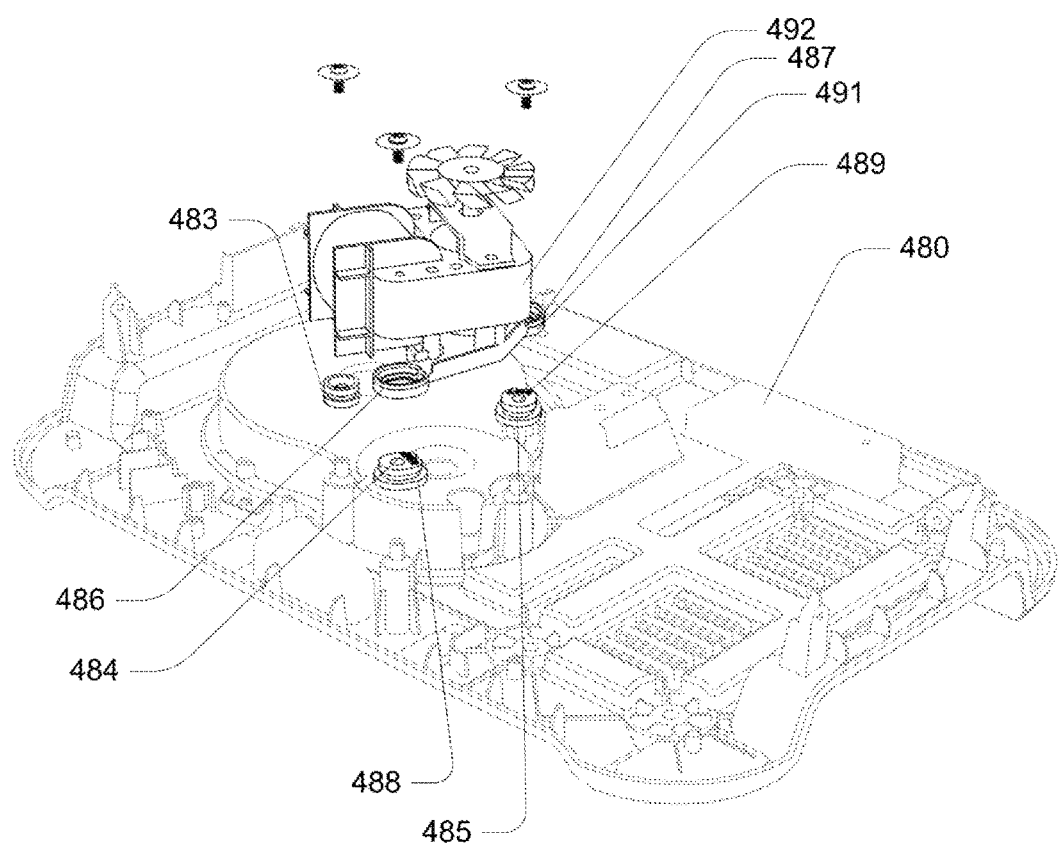
FIG. 39 is an exploded perspective illustrating an ice cream machine chassis, motor and variable motor mount.

Accordingly, and as shown in FIG. 39, a pivoting mounting 491 is used to support the electric motor 492 onto the chassis 480. In this example, the mounting bracket 491 has a location for supporting three motor mounting bushings 483, 484, 485. The elastomeric bushings 483, 484, 485 are retained in position and against rotation by bushing holding yokes or receptacles that are integral with the motor mount 491. One of the receptacles is generally round (not shown) and retains a round bushing 483 with a central opening. The other two receptacles 486, 487 are generally oblong and thereby adapted to receive an oblong bushing 484, 485. Because the bushing shape is oblong (484, 485) two different styles of bushing may be inserted into the oblong receptacles 486, 487. A first set of oblong bushings 484, 485 has mounting fastener openings 488, 489 in a first location. Together with the circular bushing 483, the first set of oblong bushings 484, 485 and the circular one 483 provide a first mounting orientation for a first motor. By changing the oblong bushings 484, 485 to a second set of oblong bushings (not shown) having a second and differently located set of mounting fastener openings (not shown) the effective location of the motor mount 483 can be rotated about the fastener that is retained in the circular bushing 483.

Figure 40:
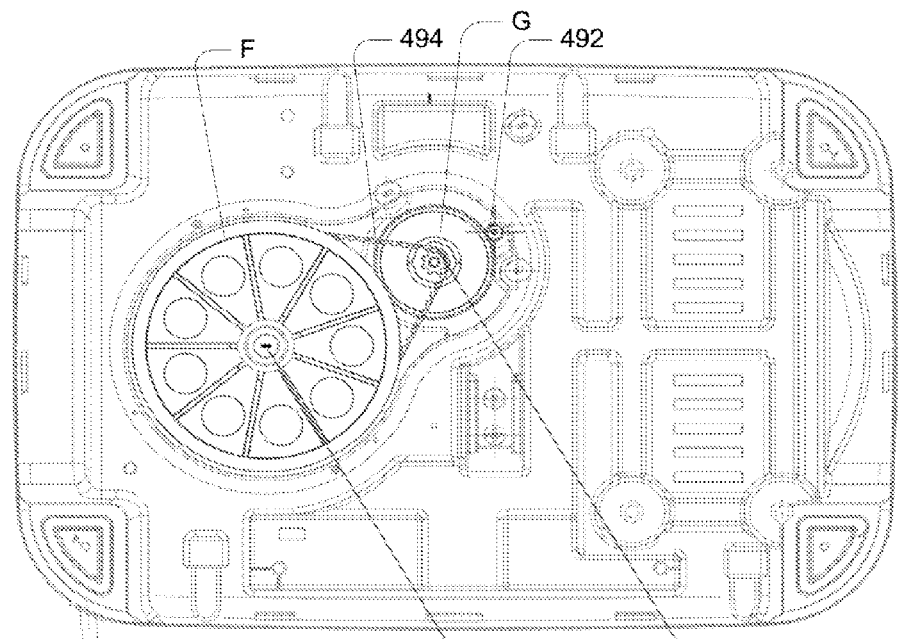
FIG. 40 is a cross sectional view of an ice cream machine illustrating the mounting of a first motor.
Figure 41:
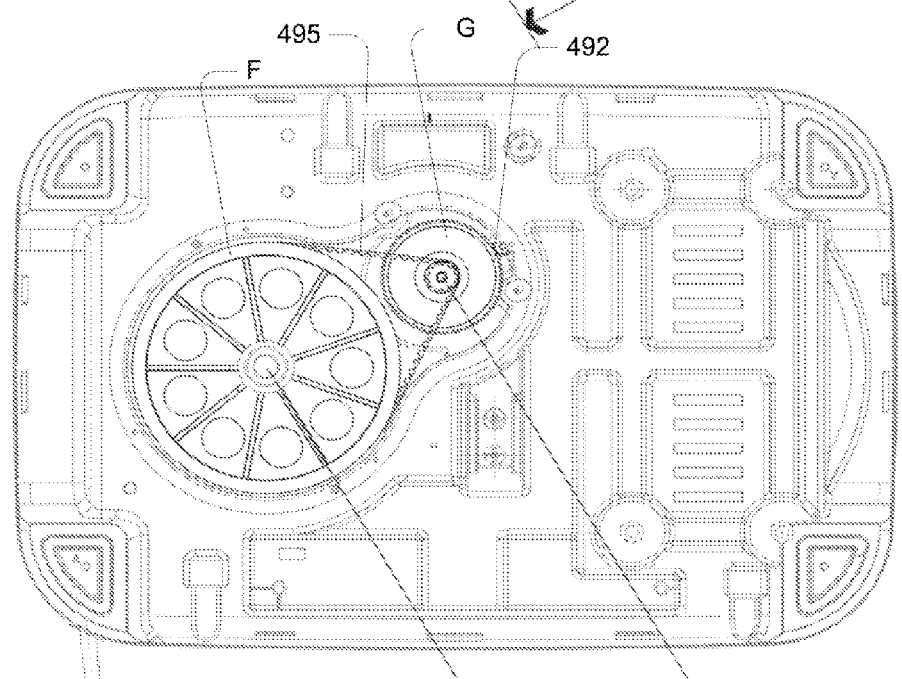
FIG. 41 is a cross sectional view of an ice cream machine illustrating the mounting of a second motor.

As shown in FIG. 40 and FIG. 41 the subtle pivoting about the fastener that passes through the circular bushing 483 allows the electric motor 492 to be retained by the chassis in two distinct positions. In both of these positions, the same intermediate drive gear G and reduction gear F may be utilised. However, because the location of the motor is different for each orientation of the motor mount, the effective distance between the centre lines of the intermediate gear G and reduction gear F can be changed. FIG. 40 illustrates a centre line distance between the intermediate gear G and the reduction gear F of A. FIG. 41 illustrates a centre line distance between the intermediate gear G and reduction gear F of B.

Although an elastic drive belt may be provided, it is preferred that two different length drive belts 494, 495 be used for the two different motor mounting options depicted in FIG. 40 and FIG. 41.

In an alternative embodiment, Gear 'I' (as best shown in FIG. 38) can modified to comprise a different number of teeth to achieve the desired torque. This would alter the diameter of the Gear 'I' (for example as depicted in FIG. 40 and FIG. 41), whereby different motor positions enable using the same belt lengths for each motor type (or power).

As shown in FIG. 42 and FIG. 43, the interchangeable bushings and motor mount disclosed with reference to FIG. 38 through FIG. 41 provide for an adjustable motor mount 501 that can be used in conjunction with two different electric motors. As shown in FIG. 42 and FIG. 43, the motor mount 501 rotates about one of three elastomeric motor mounts 502. The other motor mounting grommet locations 503, 504 are adapted to receive interchangeable elastomeric grommets 505. Accordingly, for one motor, a first grommet is marked "240V" 506 and a second grommet 505A is marked "120V" 507. The two grommets 505, 505A have their fastener receiving openings 508, 509 in different locations. With reference to a fixed portion of the side wall of the bushing receptacle, the first elastomeric motor mounting grommet 505 has a reference spacing of "D" and the other elastomeric motor mounting grommet 505A provides a reference spacing of E. This arrangement allows the motor mounting to assume two different positions as shown in FIG.

42 and FIG. 43. In one orientation, the motor mounting provides an effective centre line separation between the motor shaft and the paddle driving shaft of A whereas in a second orientation, the spacing between the centre line of the motor and the paddle driving shaft is B.

Figure 44:
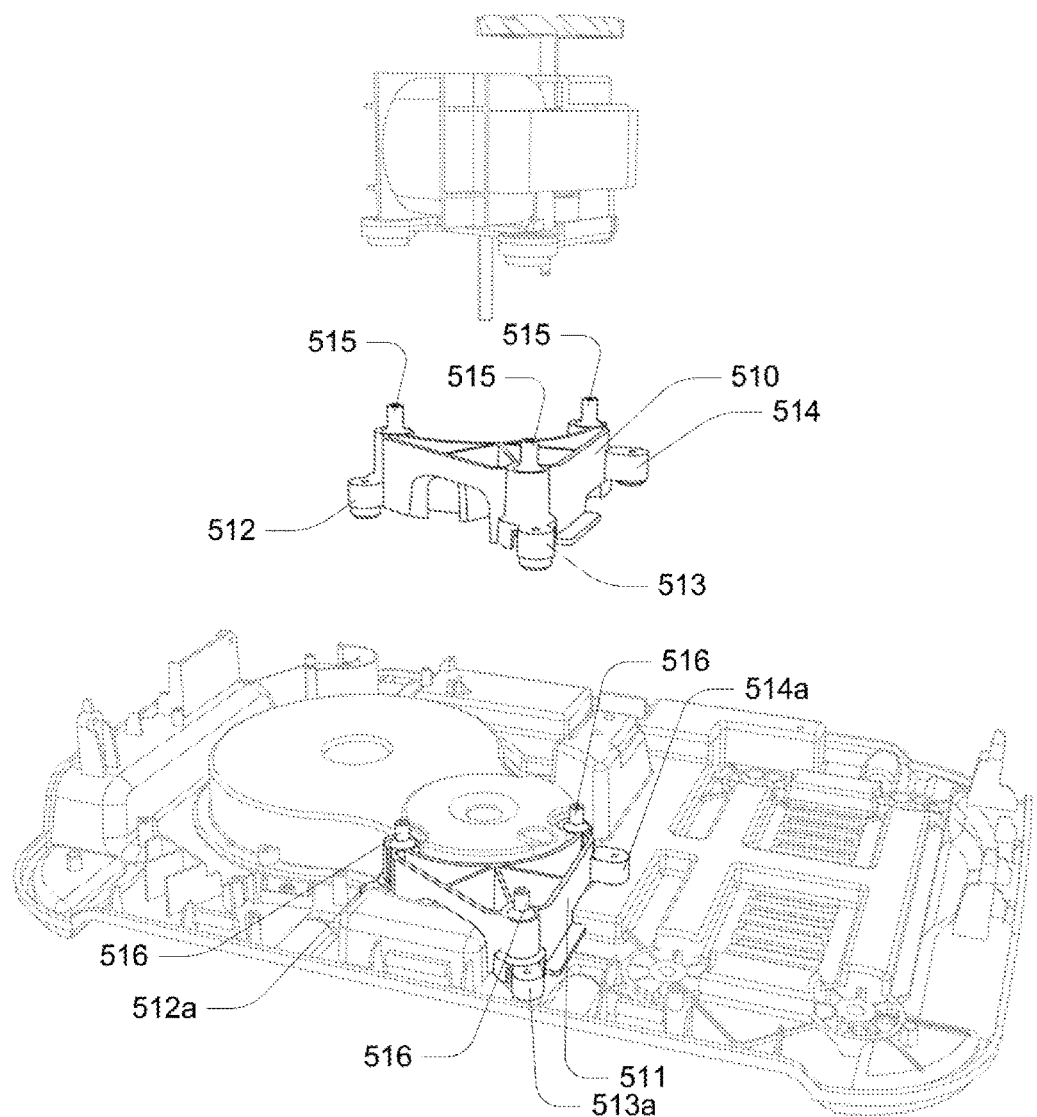
FIG. 44 is a perspective view of an ice cream machine chassis and two different motor mounts.

As shown in FIG. 44, the aforementioned problem of utilising different motors of the same size, with different torques in the same chassis can be solved by providing two separate but fixed motor mounts 510, 511 as shown in FIG. 44. In this example, the motor mounts have comparable chassis mounting locations 512, 513, 514 and 512a, 513a and 514a. However, each motor mount 510, 511 has different receptacles for receiving the fasteners that hold the motor in place to the motor mount. A first set of motor mounting locations 515 is provided on the first motor mount and a second set of motor mounting locations 516 is provided on the second motor mount 511.

Figure 45A:
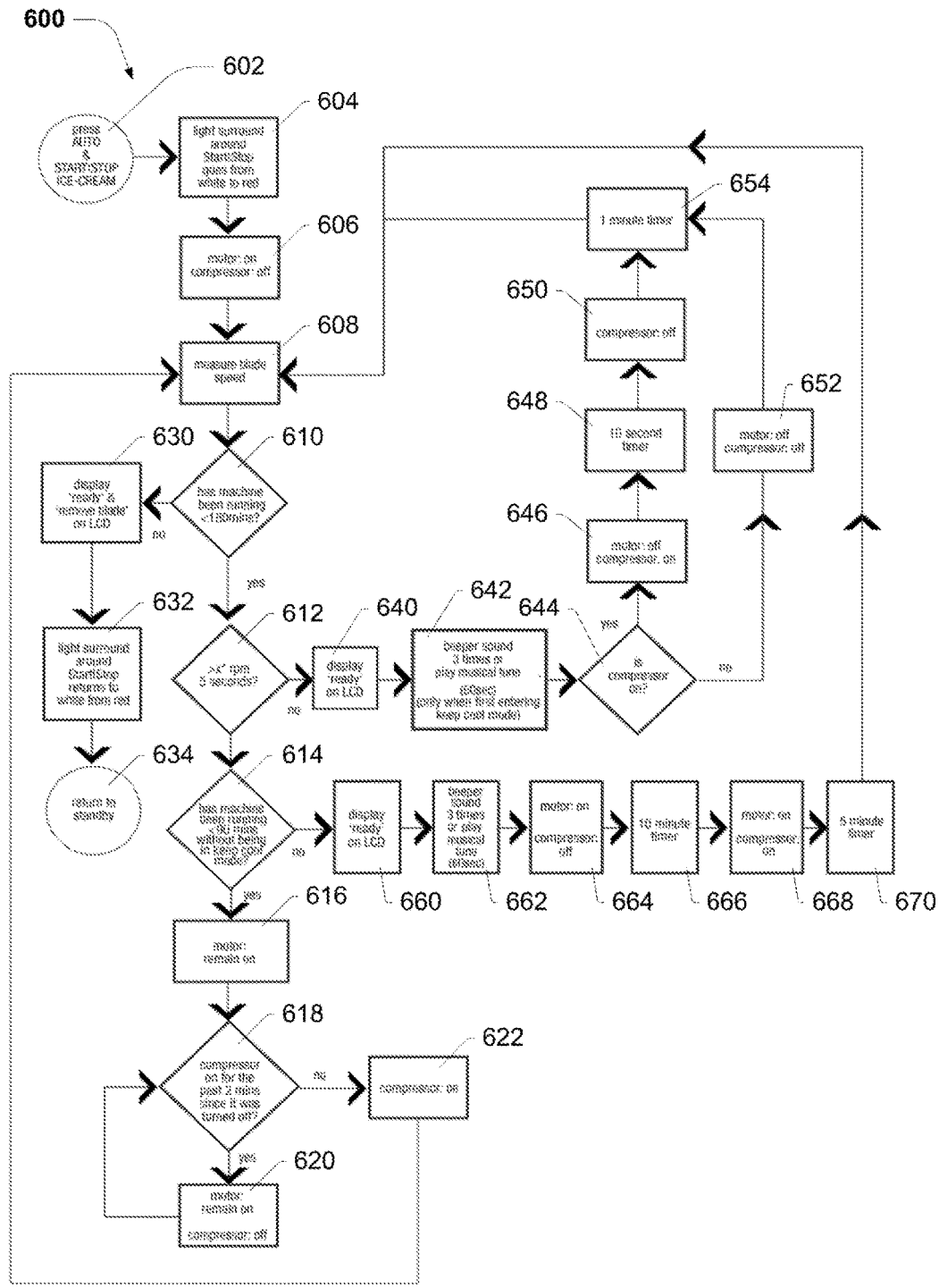
FIG. 45A is a flow chart illustrating the functionality and method for making a dessert.

FIG. 45A shows a flowchart 600 for method for keeping ice cream at a pre-selected hardness. The method can comprise the steps of:

STEP 602: Commence ice-cream making, typically by selecting a start button. Upon commencement, the method proceeds to STEP 604.

STEP 604: Indicate operation, for example illuminating a light surround a Start/Stop button from white to red. The method proceeds to STEP 606.

STEP 606: Controlling the ice-cream maker, with the motor ON and compressor OFF. The method proceeds to STEP 608.

STEP 608: Measuring the blade speed. The method proceeds to STEP 610.

STEP 610: If the ice-cream maker has been running less then a predetermined time period (for example 180 minutes), the method proceeds to STEP 612. Alternatively, the method proceeds to STEP 630.

STEP 612: If a predetermined blade speed has been reached, the method proceeds to STEP 614. Alternatively, the method proceeds to STEP 640.

STEP 614: If the ice-cream maker has been running less then a second predetermined time period (for example 90 minutes) without being in a 'keep cool' mode, the method proceeds to STEP 616. Alternatively, the method proceeds to STEP 660.

STEP 616: Controlling the ice-cream maker, with the motor ON. The method proceeds to STEP 618.

STEP 618: If the compressor has been ON for the past predetermined time period (for example 2 minutes since turning on), the method proceeds to STEP 620. Alternatively, the method proceeds to STEP 622.

STEP 620: Controlling the ice-cream maker, with the motor ON and compressor OFF. The method proceeds to STEP 618.

STEP 622: Controlling the ice-cream maker, with the motor ON and compressor ON. The method proceeds to STEP 608.

STEP 630: From STEP 610, advise to the user that ice-cream is ready, for example by displaying 'ready' & 'remove blade' on an LCD. The method proceeds to STEP 632.

STEP 632: Indicate operation complete, for example illuminating a light surround a Start/Stop button from red to white. The method proceeds to STEP 634.

STEP 634: Enter and maintain "Standby Mode".

STEP 640: From STEP 612, advise to the user that ice-cream maker is 'ready', for example by displaying 'ready' on an LCD. The method proceeds to STEP 642 to enter a "keep cool mode".

STEP 642: Optionally alert the user, for example through issuance of a sound or 'beeps' or playing a musical tune (60 seconds)—typically only when first entering the "keep cool mode". The method proceeds to STEP 644.

STEP 644: If the compressor has been ON, the method proceeds to STEP 646. Alternatively, the method proceeds to STEP 652.

STEP 646: Controlling the ice-cream maker, with the motor OFF and compressor ON. The method proceeds to STEP 648.

STEP 648: Delay timer, for example 10 seconds. The method proceeds to STEP 650.

STEP 650: Controlling the ice-cream maker, with the motor OFF and compressor OFF. The method proceeds to STEP 654.

STEP 652: Controlling the ice-cream maker, with the motor OFF and compressor OFF. The method proceeds to STEP 654.

STEP 654: Delay timer, for example 1 minute. The method proceeds to STEP 608.

STEP 660: From STEP 614, advise to the user that ice-cream maker is 'ready', for example by displaying 'ready' on an LCD. The method proceeds to STEP 662 to enter a "timeout mode".

STEP 662: Optionally alert the user, for example through issuance of a sound or 'beeps' or playing a musical tune (60 seconds)—typically only when first entering the "timeout mode". The method proceeds to STEP 664.

STEP 664: Controlling the ice-cream maker, with the motor ON and compressor OFF. The method proceeds to STEP 666.

STEP 666: Delay timer, for example 10 minutes. The method proceeds to STEP 668.

STEP 668: Controlling the ice-cream maker, with the motor ON and compressor ON. The method proceeds to STEP 670.

STEP 670: Delay timer, for example 5 minutes. The method proceeds to STEP 608.

Referring to STEP 612, the ice-cream maker can enter a "keep cool mode" via STEP 640. If the desired RPM has been reached, electronics can re-activate the motor at certain intervals to check/maintain ice cream consistency.

Referring to STEP 614, the ice-cream maker can enter a "timeout mode" via STEP 660. It will be appreciated that there may be conditions where the ice cream may not freeze (e.g. introduction of alcohol). Accordingly, if electronics module of the ice-cream maker does not detect that the ice cream has reached the correct consistency within a set time period (for example 90 minutes), the ice-cream maker can advise the user may be ready.

Referring to STEP 618, the ice-cream maker can control the compressor. It with be appreciated that is not advisable to frequently switching the compressor ON and OFF. This timer (for example 2 minutes) can provide a minimum time period break period between switching the compressor ON and OFF.

Referring to STEP 634, the ice-cream maker may turn off.

It will be appreciated that when the ice cream is churning in an ice-cream machine, as the mix becomes harder there is a chance (depending on ingredients) that the entire mix will attach itself to the blade and rotate independent to the bucket. If this occurs, it will not be possible to use speed or tongue sensing feature to determine the state of the ice-cream, particularly due to there being minimal friction or resistance provided by the sidewalls of the bucket.

It will be appreciated that 'American Ice Cream' typically differs from 'Italian Gelato' in both texture and consistency. Ice Cream is typically made from cream, sometimes eggs and has a lot of butterfat; whereas Gelato traditionally consists of less butterfat and a higher concentration of milk. Gelato is dense in flavour, which is primarily due to less air being whipped into it when compared with American Ice Cream. American Ice Cream typically has more air whipped into it and makes for a lighter texture.

To make a traditional gelato, less air must be introduced into the dessert whilst getting it to the desired hardness. Slowing down the ice cream paddle does not provide the desired effect, as this affects the texture and consistency of the frozen dessert. To achieve a traditional gelato, commercial units typically employ a much larger and more effective cooling system to freeze the dessert faster, thereby enabling the dessert to reach the desired hardness without substantially manipulating the paddle speed. For example, by cooling the dessert faster, the dessert can reach the desired consistency in less time and with less churning, which can assist in providing a desirable gelato texture and consistency.

FIG. 45A shows a flow chart for a method of preparing a dessert. This method can be further adapted for embodiments not requiring any additional ingredient temperature sensor (FIG. 45B) or embodiments having an ingredient temperature sensor (FIG. 45C).

It will be appreciated that gelato is typically denser and richer than ice cream. The more intense flavour can be attributed to less churning of the mixture, thereby introducing less air into the mixture. Incorporation of air can also introduce water molecules into the mix, which when frozen produces ice crystals that can reduce smoothness of the end result.

In any embodiment, when creating gelato, a relatively larger compressor and cooling system is typically required (usually in commercial units) to freeze the mixture more quickly (thereby reducing the churning time required). However, large cooling systems are typically not practical in a domestic appliance due to size and cost constraints. Therefore, it is difficult to produce quality gelato in a domestic ice cream maker.

In an embodiment, the apparatus can manipulate the amount of churning to reduce the amount of air being introduced during the preparation process. In making ice cream in a domestic ice cream maker, the outer side wall of the ice cream bucket is cooled and the ice cream paddle rotates continuously to scrap off the cool layer formed and mix it through the rest of the ingredients. It is this action that provides the consistent texture, but introduces unwanted air molecules which can detract from a final gelato result. A typical domestic ice cream maker would churn the ingredient mix continuously for the duration of the freezing process, ensuring that the mixture never "sets" on the outside wall while maintaining a fluid inner mixture.

A "pre-cool feature" can be provided, by way of example only, to first pre chill the ingredient mix.

Using a "hardness detection" method, the state of the ingredient mix can be determined. While the ingredients mix remains liquid, churning is not required. The ice cream can be rotated incrementally to redistribute the ingredient mix. The hardness detection, combined with incremental rotation of the paddle, can require less churning.

Figure 45B:
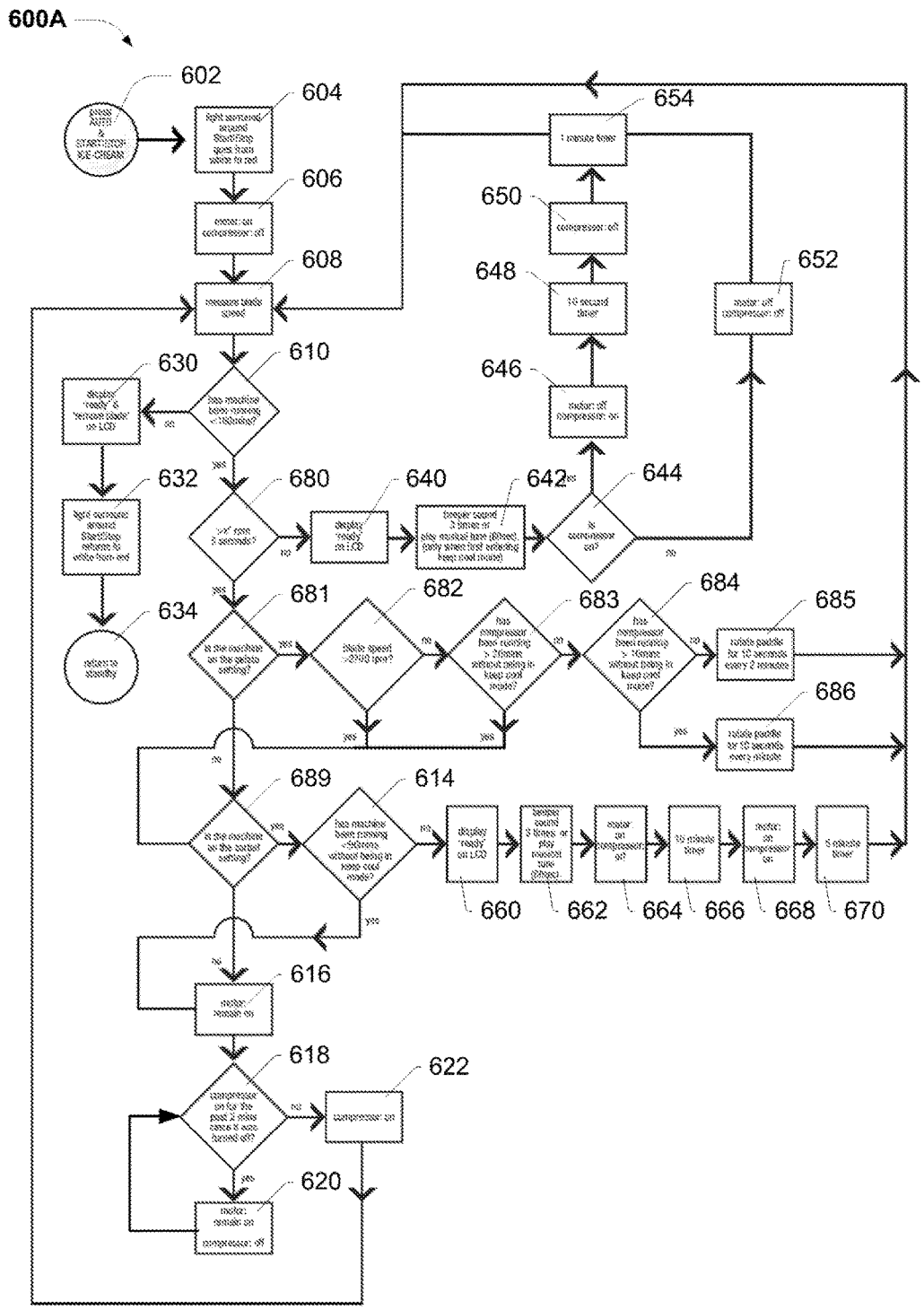
FIG. 45B is a flow chart illustrating the functionality and method for making a dessert.
Figure 45C:
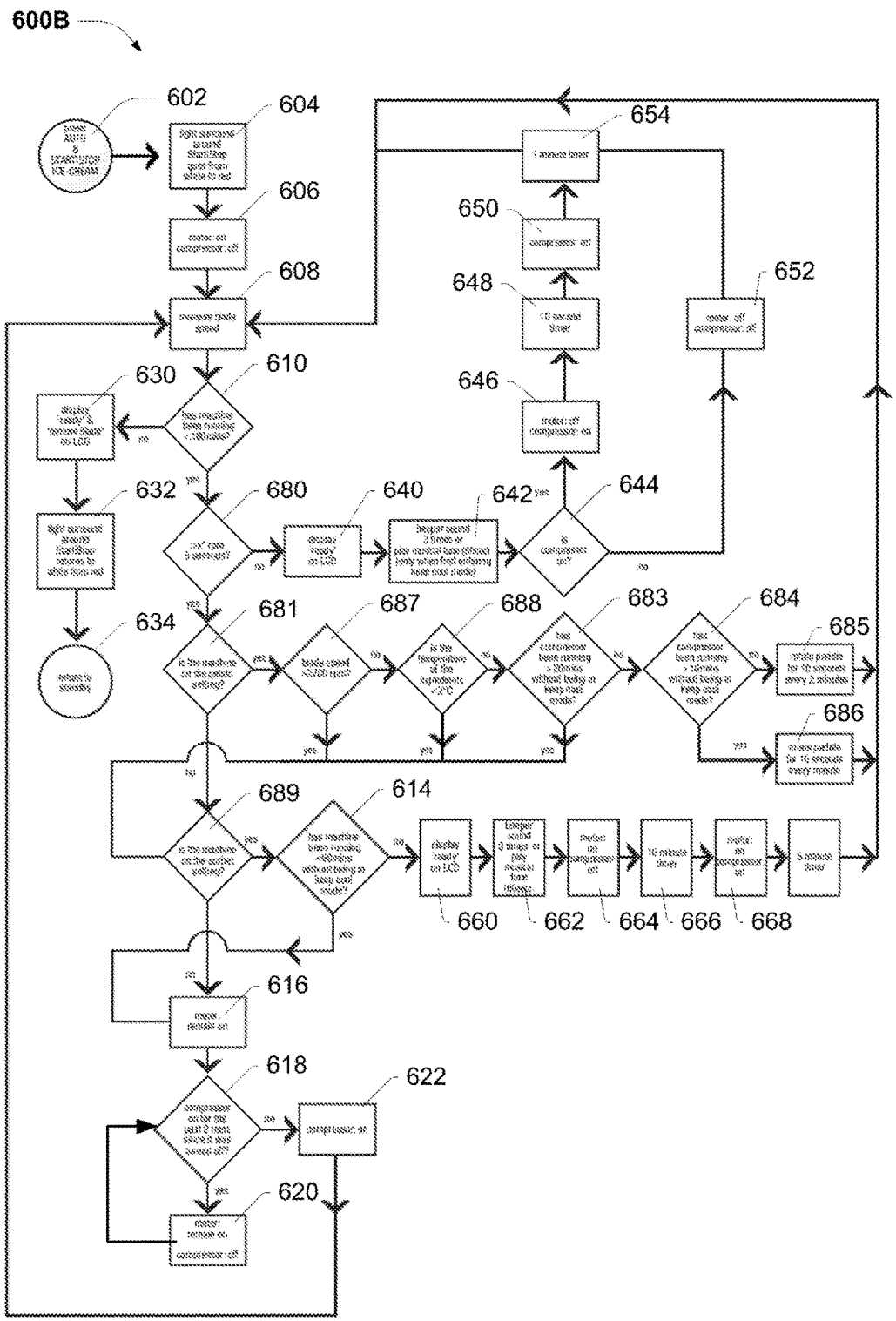
FIG. 45C is a flow chart illustrating the functionality and method for making a dessert.

FIG. 45B shows a flow chart 600A (referring to flow chart 600) for a method incorporating a gelato setting. The gelato setting method can comprise the steps of:

STEP 680: (amended STEP 612) If a predetermined blade speed has been reached, the method proceeds to STEP 680. Alternatively, the method proceeds to STEP 640.

STEP 681: if the ice cream maker has configured to the gelato setting, the method proceeds to STEP 682. Alternatively, the method proceeds to STEP 689.

STEP 682: if the blade speed is greater than a predefined maximum, the method proceeds to STEP 689. Alternatively, the method step proceeds to STEP 683.

STEP 683: if the compressor has been running greater than a predefined maximum without being in "keep cool" mode, the method proceeds to STEP 689. Alternatively, the method proceeds to STEP 684.

STEP 684: if the compressor has been running for greater than a predefined maximum without being in a "keep cool" mode the method proceeds to STEP 686. Alternatively, the method proceeds to STEP 685.

STEP 685: the paddle is rotated for a predetermined time at predefined intervals. The method proceeds to STEP 608.

STEP 686: the paddle is rotated for a predetermined time at predefined intervals. The method proceeds to STEP 608.

STEP 689: if the machine is in a sorbet setting, the method proceeds to STEP 614. Alternatively, the method proceeds to STEP 616.

FIG. 45C shows a flow chart 600B (referring to methods 600 and 600A) for a method of producing gelato. The method can further comprise the steps of:

STEP 687: (amended STEP 682) if the blade speed is greater than a predefined maximum, the method proceeds to STEP 689. Alternatively, the method step proceeds to STEP 688.

STEP 688: if the temperature of the ingredients is less than a predefined minimum temperature, the method proceeds to STEP 689. Alternatively, the method proceeds to STEP 683.

Adding to the accuracy of the gelato function, and ingredient temperature sensor is employed to determine the rate at which the ingredients are being chilled. By not churning until necessary, typically just above freezing temperature, the "non churning period" can be prolonged to thereby reduce the amount of air introduced to a gelato mixture.

It is difficult to make a consumer/domestic system that achieves the cooling performance of a commercial unit, primarily due to the cost and size of the relevant commercial technologies. A 'Pre-Cool' feature can be incorporated into a consumer/domestic system.

In an embodiment, a 'Pre-Cool' feature can initiate a cooling system in an ice cream maker before introducing a base gelato mixture. This can cooling the internal elements of the machine as well as the ice cream chamber, so that it will be operating at reduced/chilled (or optimal operating) temperature when the base gelato mixture is introduced into the machine chamber. This can effectively reduce the time taken for the gelato to reach a desired consistency and therefore reduce the amount of churning applied to the mixture.

In an embodiment, a 'Pre-Cool' feature can be enabled while the base Gelato mixture is being prepared (typically taking several minutes), such that the machine has sufficient time to pre-cool—preferably to an optimal operating temperature. A 'READY' indicator display on the LCD interface can advise a user when the machine has reached a suitable operating temperature, suitable for the base gelato mixture to be introduced. The machine can then start the churning process.

By way of example, during the 'Pre-Cooling' phase of the functionality, the ice cream paddle can remain stationary. Paddle operation is generally unnecessary as it only creates addition noise and wear and tear on the internal components. If a dessert base mixture is introduced to the ice-cream chamber (inside the removable ice cream bucket) during the 'Pre-Cooling' phase, for example as a result of a user not understanding the instructions completely, then the contents of the chamber will be exposed to the cooling but not the mixing provided by the rotating paddle. Over time the mixture closest to the cold wall of the chamber can start to freeze, whist the mix closer to the centre of the chamber remains liquid. When making the ice cream after the pre-cooling has elapsed, there is the probability that the paddle will not be able to operate due to the frozen ice cream around the circumference of the removable bucket, hindering its operation.

Figure 46A:
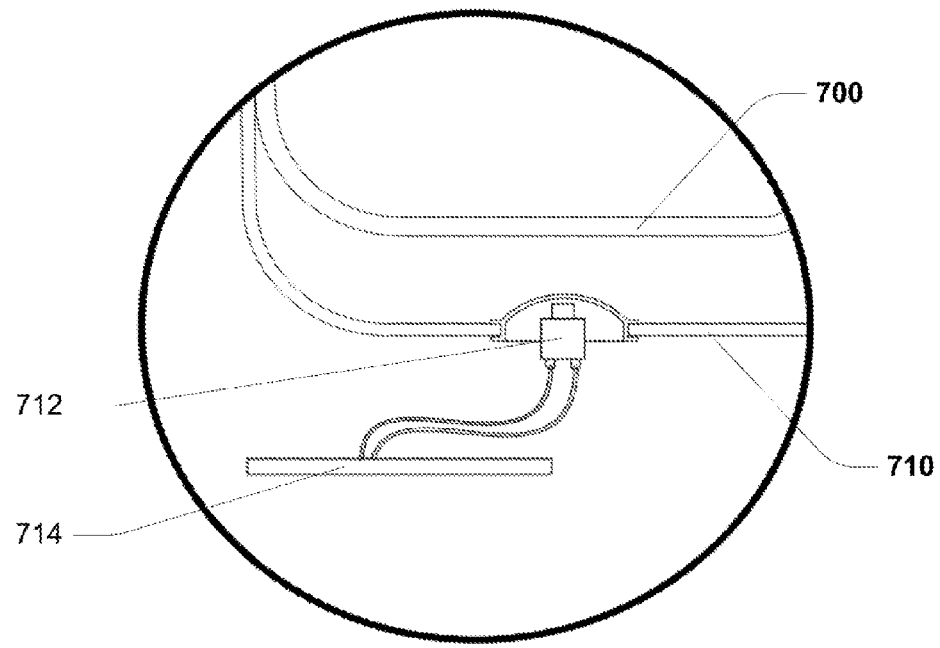
FIG. 46A shows an embodiment engagement between a removable bucket and ice-cream chamber.
Figure 46B:
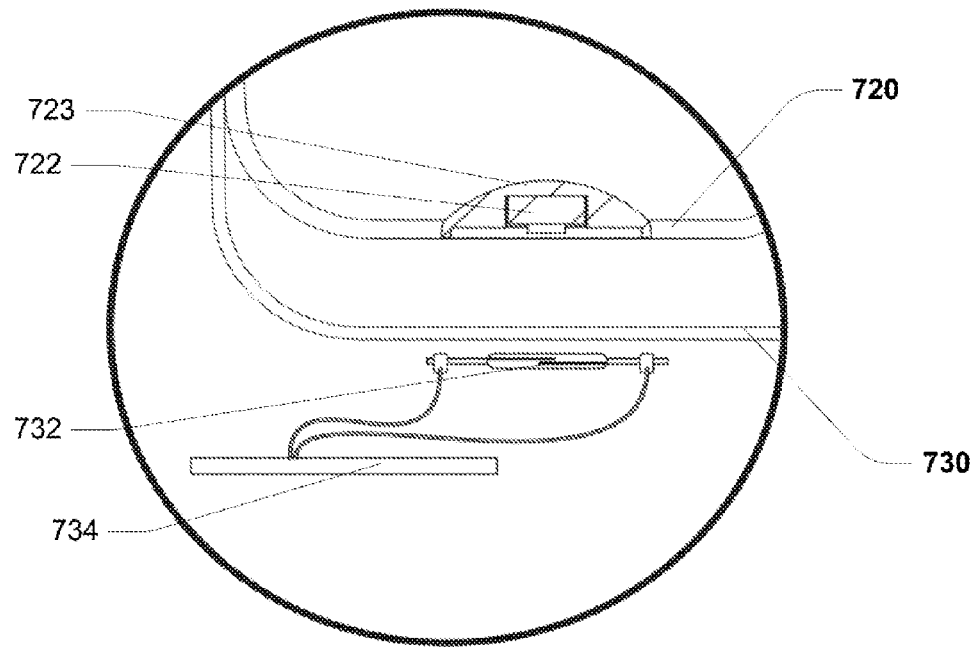
FIG. 46B shows an embodiment engagement between a removable bucket and ice-cream chamber.

There may be several solutions to overcome this issue of a user prematurely introducing a dessert base mixture into the chamber during a 'Pre-Cooling' phase. Referring to FIG. 46A and FIG. 46B, in an embodiment, the ice cream maker can automatically detect when the removable bucket has been inserted, either through a mechanical switch at the bottom of the cooling chamber or a reed switch and magnet arrangement located inside the machine and in the removable bucket respectively. When insertion of the removable bucket is detected, operation of the mixing paddle can be automatically initiated to stir the mixture to limit premature freeze around the circumference of the chamber/bucket.

FIG. 46A shows an embodiment engagement between a removable bucket 700 and ice-cream chamber 710. A mechanical switch element 712 is located at the bottom of the cooling chamber. As the bucket 700 is lowered into the chamber, the bucket makes abutting contact with the mechanical switch element, sending a signal for instructing the processor element/software 714 to initiate operation of the ice cream paddle during a pre cooling phase.

FIG. 46B shows an embodiment engagement between a removable bucket 720 and ice-cream chamber 730. A small magnetic switch element 722 can be located inside the removable ice cream bucket—typically having a watertight seal 723. A magnetic reed switch element 732 can detect the presence of the magnetic switch element 722 as the bucket is lowered into the chamber. The magnetic reed switch element 732 can send a signal for instructing the processor element/software 734 to initiate operation of the ice cream paddle during a pre cooling phase.

In another example embodiment, a time component can be incorporated into the paddle operation. For example, if freezing around the circumference of the removable ice cream bowl will not initiate for a first predetermined period (such as the first 10 minutes), a timer can initiate operation of the paddle after this period during the 'Pre-Cooling' phase. Even if a dessert base mixture is inserted into the cooling chamber during the 'Pre-Cool' phase, automatic operation of the paddle can stir the mixture to limit premature freeze around the circumference of the chamber/bucket.

Figure 47:
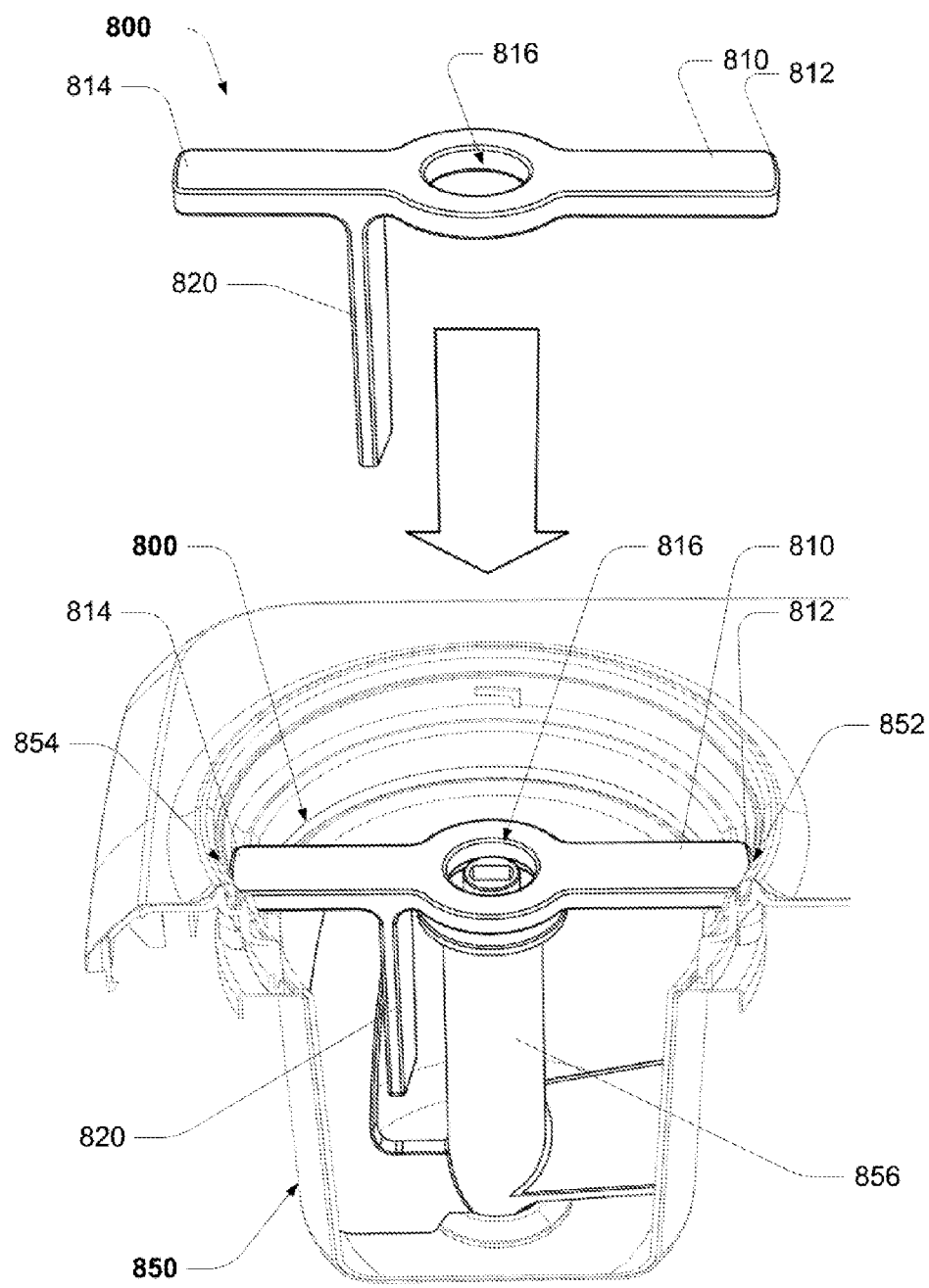
FIG. 47 is an embodiment removable blade (or paddle) for use with an ice-cream maker.
Figure 48A:
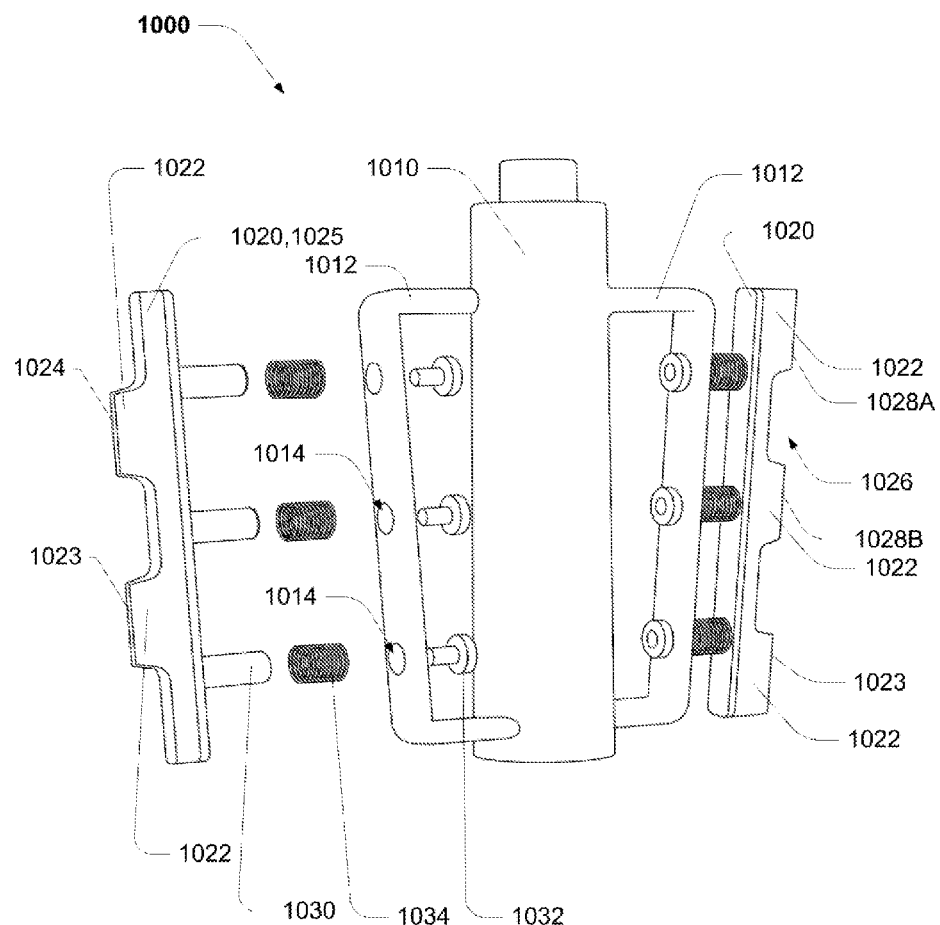
Figure 48B:
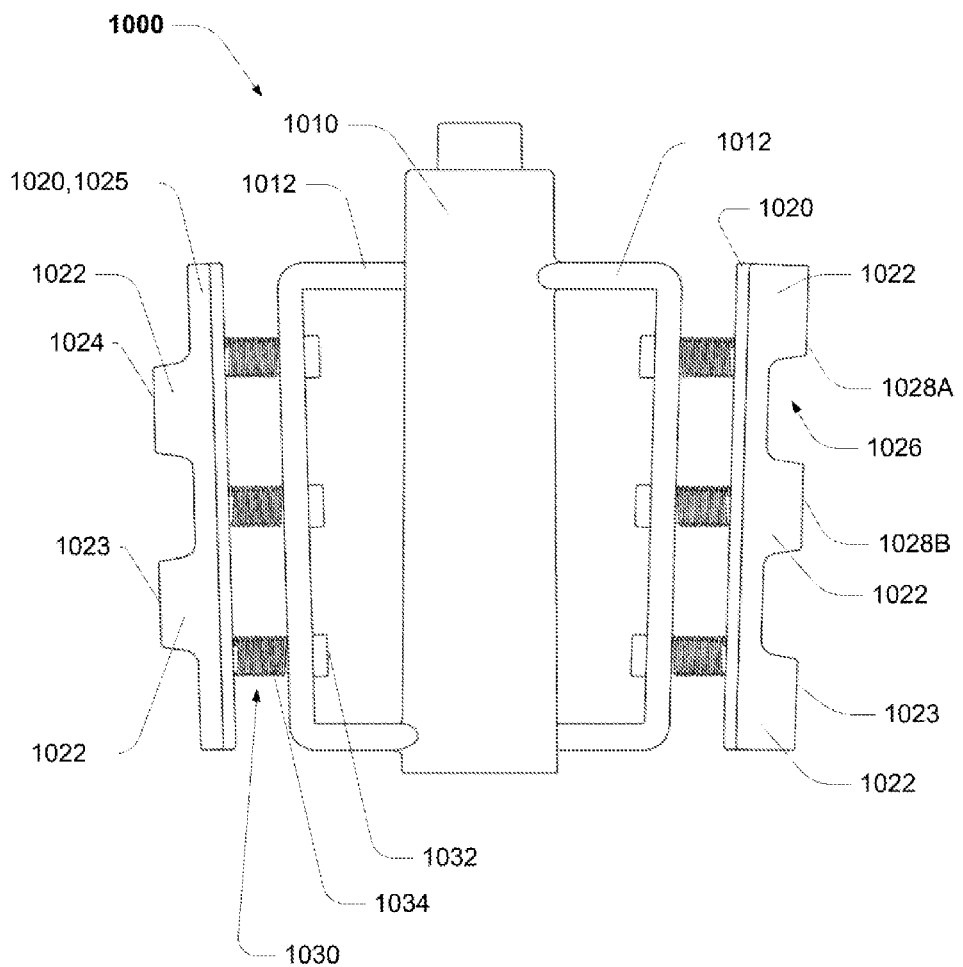

FIG. 47 shows an embodiment removable blade assembly 800 for use with an ice-cream maker. A blade can extend down from the stationary portion of the machine (or lid), to provide resistance for restricting the mixture from rotating around the bucket (or container) with the paddle assembly. The blade assembly 800 comprises a support member 810 that can be fixed relative to the ice-dream bucket 850.

In this example embodiment, support member ends 812, 814 are each keyed into recesses provided by the ice cream maker housing 852, 854 respectively and to restrict relative rotation there between. It will be appreciated that the recesses provided by the ice cream maker housing 852, 854 can also receive a pair of opposing protrusions at an upper extent of the bucket (or container), whereby the bucket in turn defines outwardly directed recess for receiving the support member ends 812, 814.

A support member aperture 816 can further receive the hub of the paddle 856.

A protruding blade 820 can provide increased (or additional) resistance for restricting rotation the ice-cream mixture within the bucket (or container) 850.

It will be appreciated that, in a compressor ice cream making apparatus, a refrigerant cools the walls of the vessel (or bucket) in order to extract heat from the fluid mixture therein. By not scraping the side of the bucket, a film of frozen ice cream can form which adversely affects (reduces) the heat extraction process.

A scraping paddle can be used to wipe/scrape the sides of the bucket for removing any frozen ice cream that forms on the surface. However, ice cream buckets are usually produced from (or formed by) a stamped aluminium process by being stretched over a dye under high pressure. This production method is not precise, allowing the diameter to vary (for example +/−1 mm). This variation in diameter can adversely affect a paddle's ability to scrape the sides of the ice cream vessel.

FIG. 48A through FIG. 57 show alternative embodiment scraper paddles (1000, 1100, 1200, 1300, 1400) that can be used with an embodiment ice cream maker apparatus disclosed herein.

Figure 49:
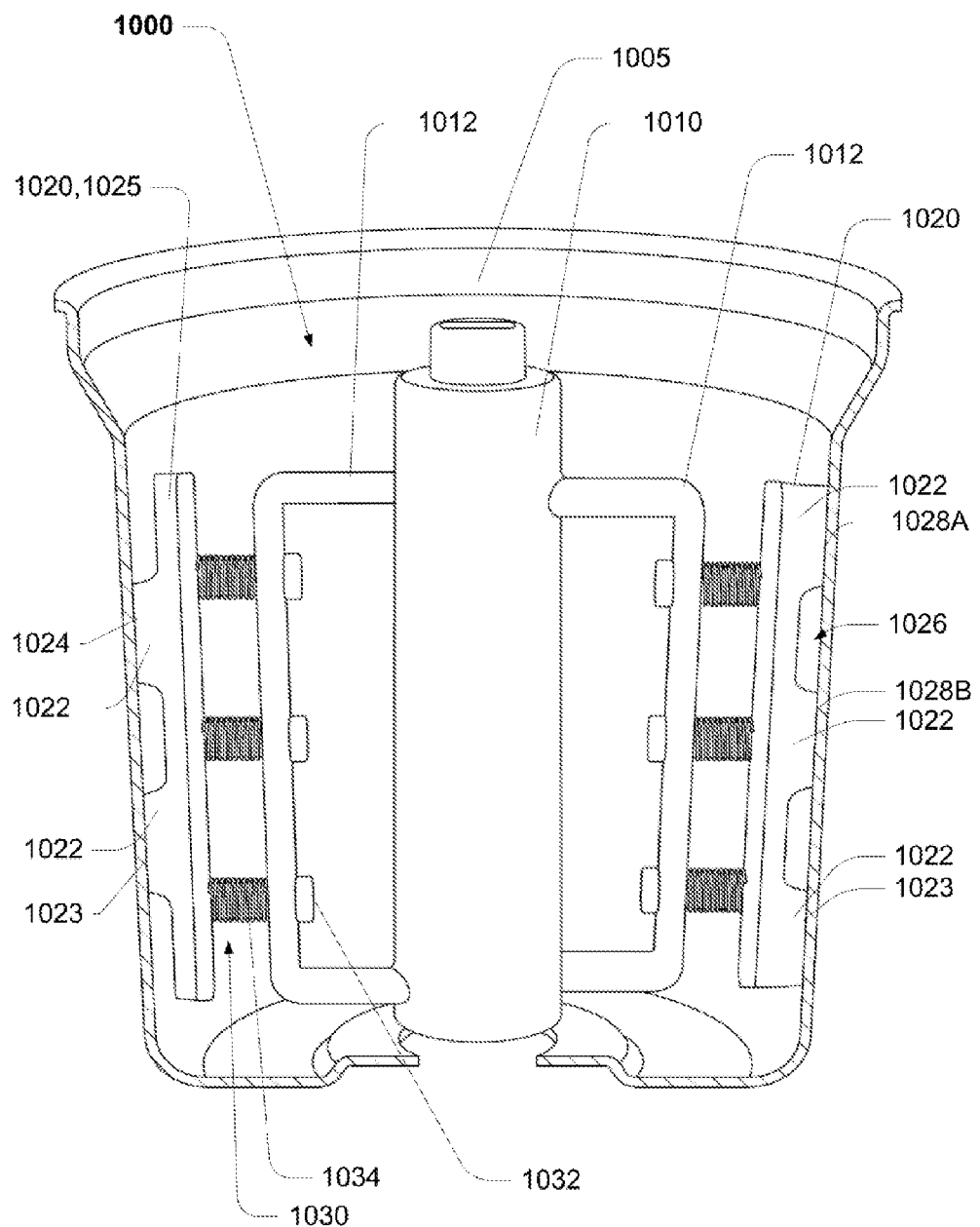
FIG. 49 shows the embodiment scraping paddle of FIG. 48A, when used in a mixing vessel.
Figure 50A:
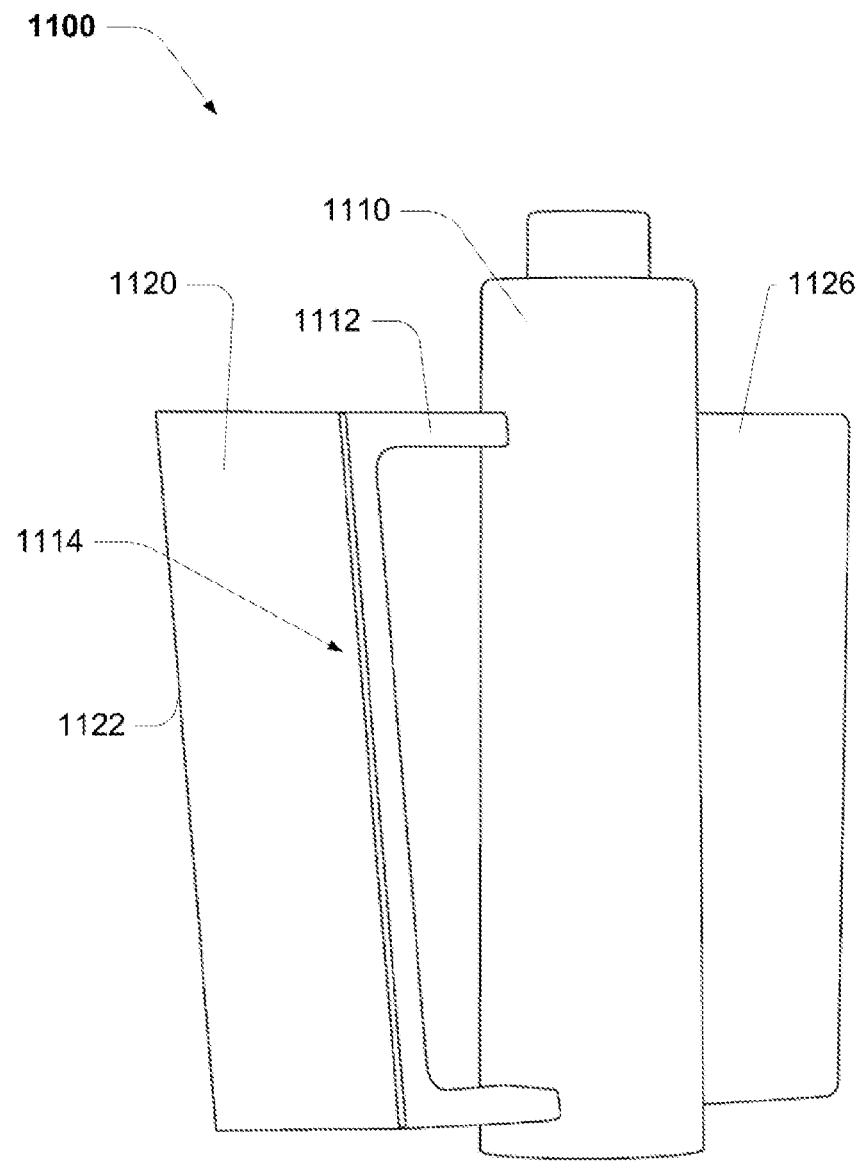
Figure 50B:
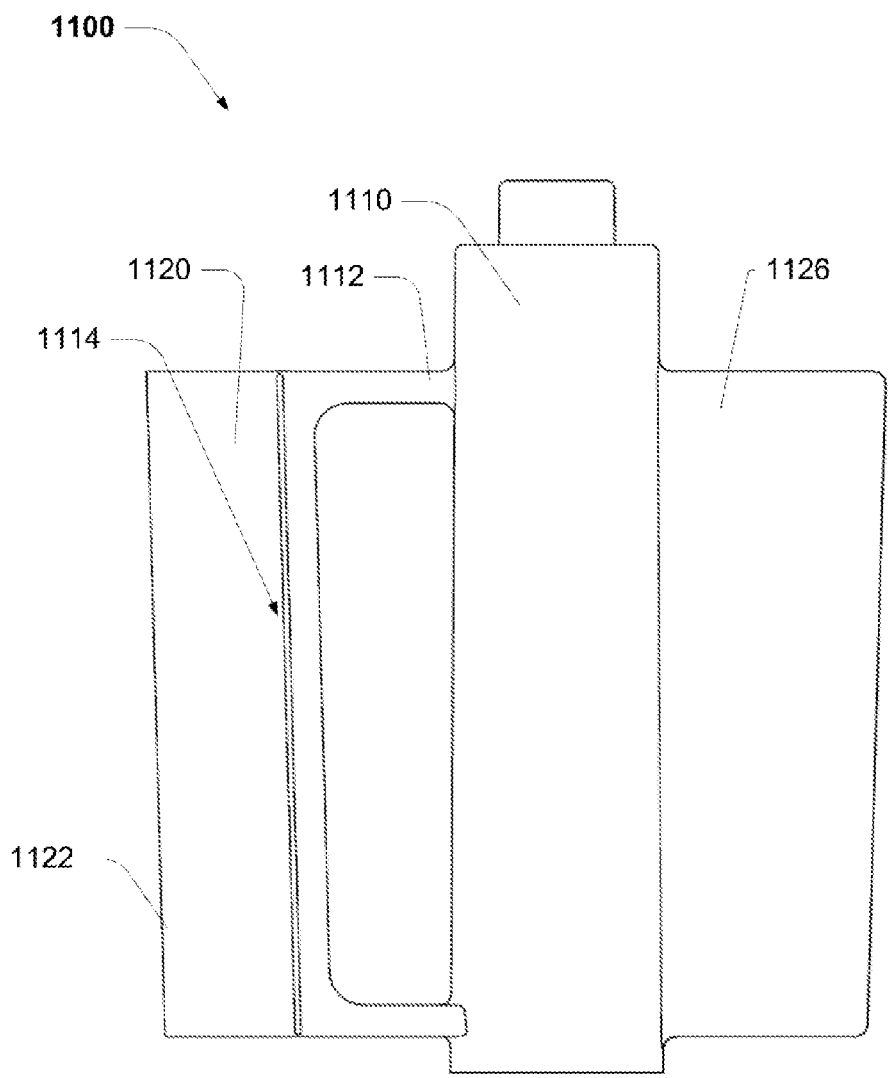
Figure 51:
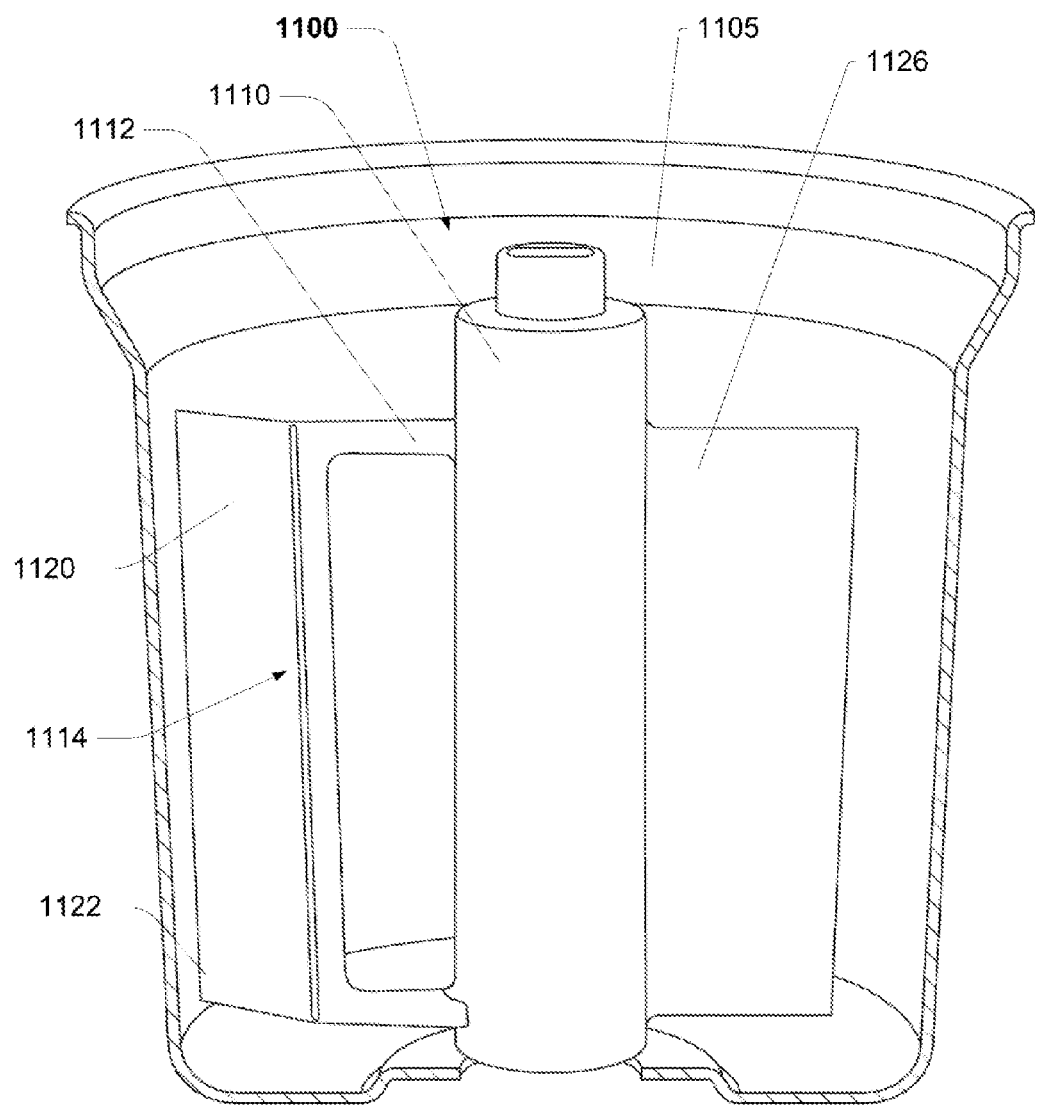
FIG. 51 shows the embodiment scraping paddle of FIG. 50A, when used in a mixing vessel.
Figure 52A:
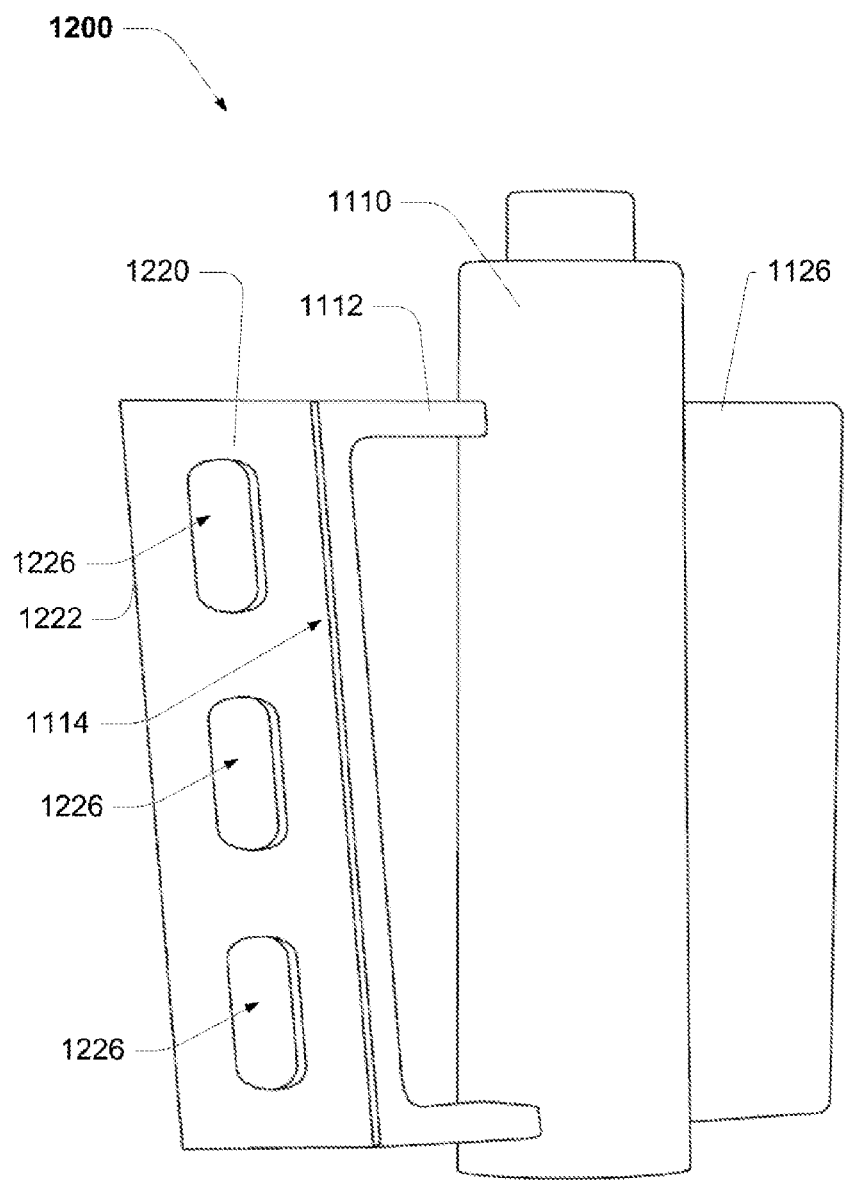
Figure 52B:
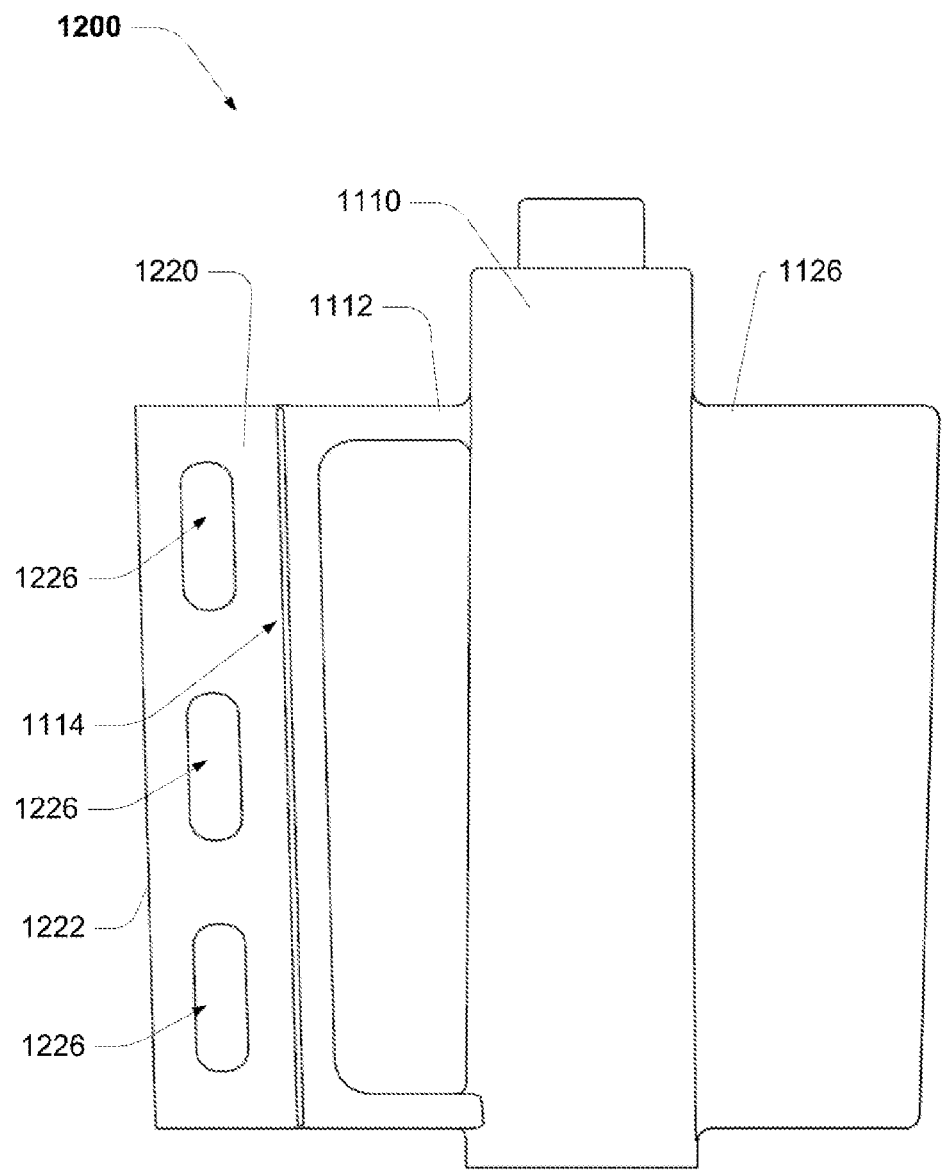
Figure 53:
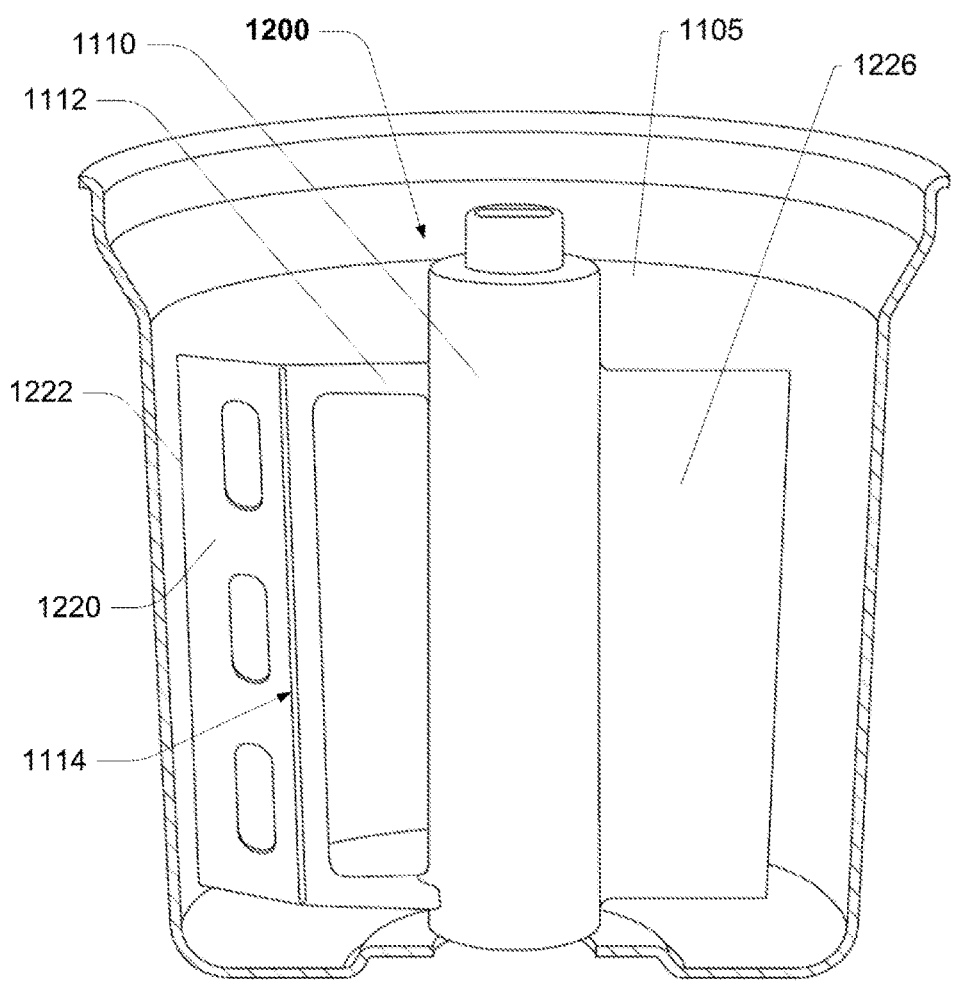
FIG. 53 shows the embodiment scraping paddle of FIG. 52A, when used in a mixing vessel.
Figure 54A:
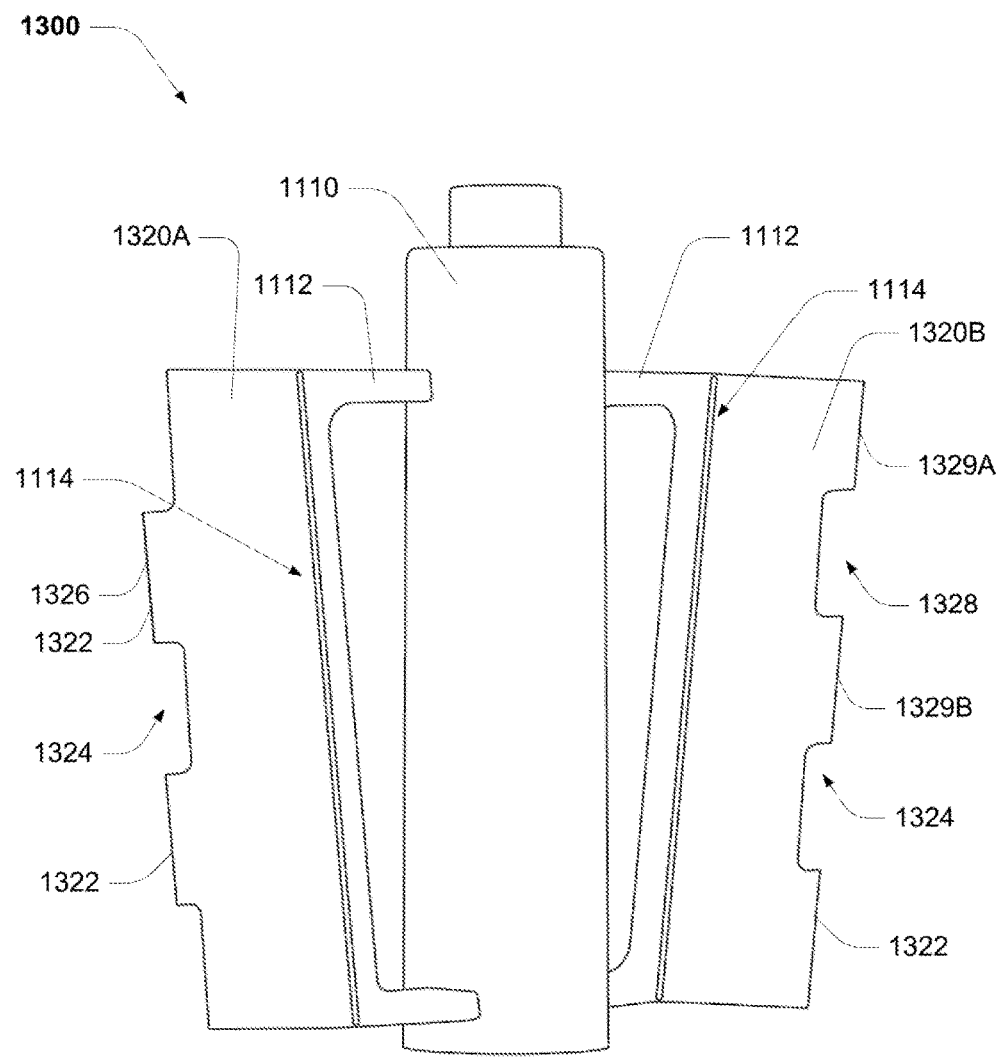
Figure 54B:
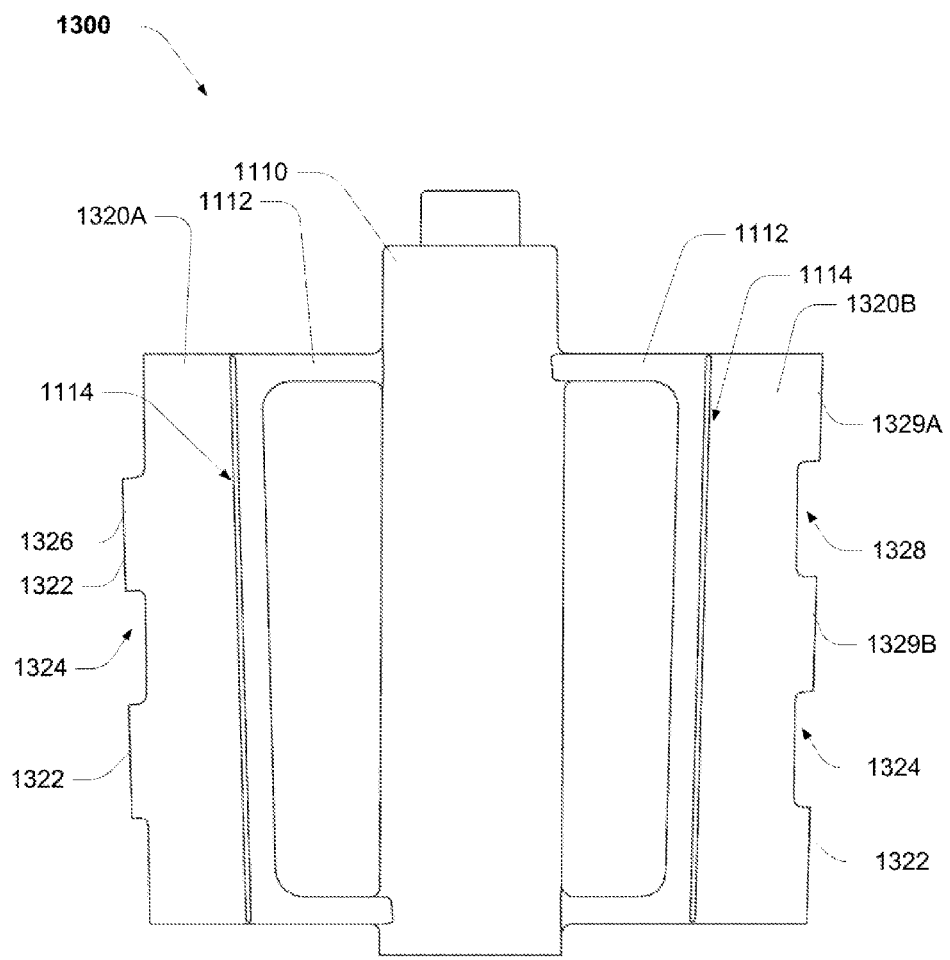

FIG. 48A through FIG. 48E, shows an example embodiment scraping paddle 1000 for an ice cream making apparatus. The scraping paddle 1000 includes a rotatable body 1010 having a pair of mounting arms 1012 located on opposite sides of the body. Each of the mounting arms 1012 is coupled to a respective scraper element 1020 that is radially outward biased for providing abutting engagement with a vessel (or bowl) 1005 as shown in FIG. 49.

In this embodiment, by way of example only, the scraper element 1020 has a plurality of scraping portions 1022, each having a scraping edge 1023. The scraping edges are spaced along the scraper element to respectfully define a plurality of scraping regions about the circumference of the vessel. In this embodiment, the scraping portions of a first scraping element (for example 1024) is located along the respective scraping element 1025 to scrape a portion of the circumference of the bowl left unscraped by the void 1026 defined between adjacent scraper portions 1028A, 1028B.

In an embodiment, by way of example only, all scraper portions are spaced along their respective scraper elements such that the scraper portions of one scraper element can scrape portions of the bowl left unscraped by the other scraper element. It will be appreciated that this enables the mixture in the bowl to remain exposed to the outer cooling surface of the bowl for a longer period, while ensuring the mixture is scraped off or at the outer cooling surface once every revolution of the paddle.

The scraper elements 1020 are radially outwardly biased into abutting configuration with the vessel. By way of example, each scraper element 1020 can include a plurality of guide stems 1030 that are each slideably fixed by a fastener 1032 through apertures 1014 in a respective arm 1012. In this embodiment, the scraper element is radially outwardly biased by a compression spring 1034 located about the stem and operating between the scraper element and the arm.

In an embodiment, the detachable scraper elements can be made of a 'self lubricating' polymer such as ACETAL or Nylon. Alternatively, the detachable scraper elements can be made of soft metals such as brass. It will be appreciated that the scraper elements should be made of a material that is softer than that used in the bucket to avoid premature erosion of the bucket surface.

Referring to FIGS. 48D and 48E, the arm 1012 or scraper element 1020 can be cambered off axis such that, upon rotation 1040, each scraper portion has a leading edge 1042 and trailing edge 1044.

In this embodiment, the leading edge of the scraper portions in use is the top, and the trailing edge is at the bottom, such that the ice cream scraped from the inner surface of the vessel is directed downward. This directs the ice cream towards the bottom of the vessel, which usually has an increased concentration of cooling/refrigeration coils, and therefore provides improved heat extraction.

It will be appreciated that the scraping paddle 1000 can be driven from a coupling located at either the top and/or the bottom of the body 1010.

FIG. 50A through FIG. 50E, shows an example embodiment scraping paddle 1100 for an ice cream making apparatus. The scraping paddle 1100 includes a rotatable body 1110 having an arm 1112 that is coupled to a respective scraper element 1120 by a living (or live) hinge 1114. The scraper element has a scraping edge 1122 that is radially outward biased by (or using) the living hinge for providing abutting engagement with a vessel (or bowl) 1105 as shown in FIG. 49. A stirring panel 1126 is located on the opposite side of the rotatable body 1110 with respect to arm 1112. It will be appreciated that stirring panel 1126 can direct mixture toward the surface of the vessel and can assist in balancing the paddle and to provide stirring of the mixture. A scraping edge scrapes the edge of the vessel only once per rotation.

Referring to FIGS. 50D and 50E, the arm 1112 or scraper element 1120 can be cambered off axis such that, upon rotation 1140, each scraper portion has a leading edge portion 1142 and trailing edge 1144. In this embodiment, the leading edge of the scraper portions in use is the top, and the trailing edge is at the bottom, such that the ice cream scraped from the inner surface of the vessel is directed downwardly.

It will be appreciated that the off-axis camber of the scraper edge and direction of rotation of the paddle can cause ice cream scraped from the inner surface of the vessel to be selectively directed downwardly or upwardly.

It will be appreciated that the scraper element 1120 and scraping edge 1122 can apply or generate outward pressure during rotation of the paddle by resistance generated during rotation through the viscous mixture within the vessel.

FIG. 52A through FIG. 57 show alternative embodiment scraping paddles (1200, 1300, 1400) that can be considered variants of the scraping paddle 1100. Each of these alternative embodiment scraping paddles operate in a similar manner.

FIG. 52A through FIG. 52E, shows an example embodiment scraping paddle 1100 for an ice cream making apparatus. A scraper element 1220 is coupled to an arm 1112 by a living hinge 1114. The scraper element has an scraping edge 1122 that is radially outward biased by or using the living hinge for providing abutting engagement with a vessel (or bowl) 1105 as shown in FIG. 54.

In this embodiment, by way of example only, a plurality of through apertures 1226 are defined by the scraper element 1120 to provide additional flexibility and allow passage of mixture/fluid there through.

It will be appreciated that the holes can located on the scraping side of the paddle to adjust the pressure or the force applied to the scraping action during rotation. The ice cream maker thereby uses the speed of the rotating blades to determine the hardness of its contents. Larger holes enable more ice cream to pass through to thereby reduce the pressure on the blades. The size, location and design of these holes is tuned to provide a balance of scraping pressure and resistance, while not to inhibit operation of any hardness sensing software.

Figure 55:
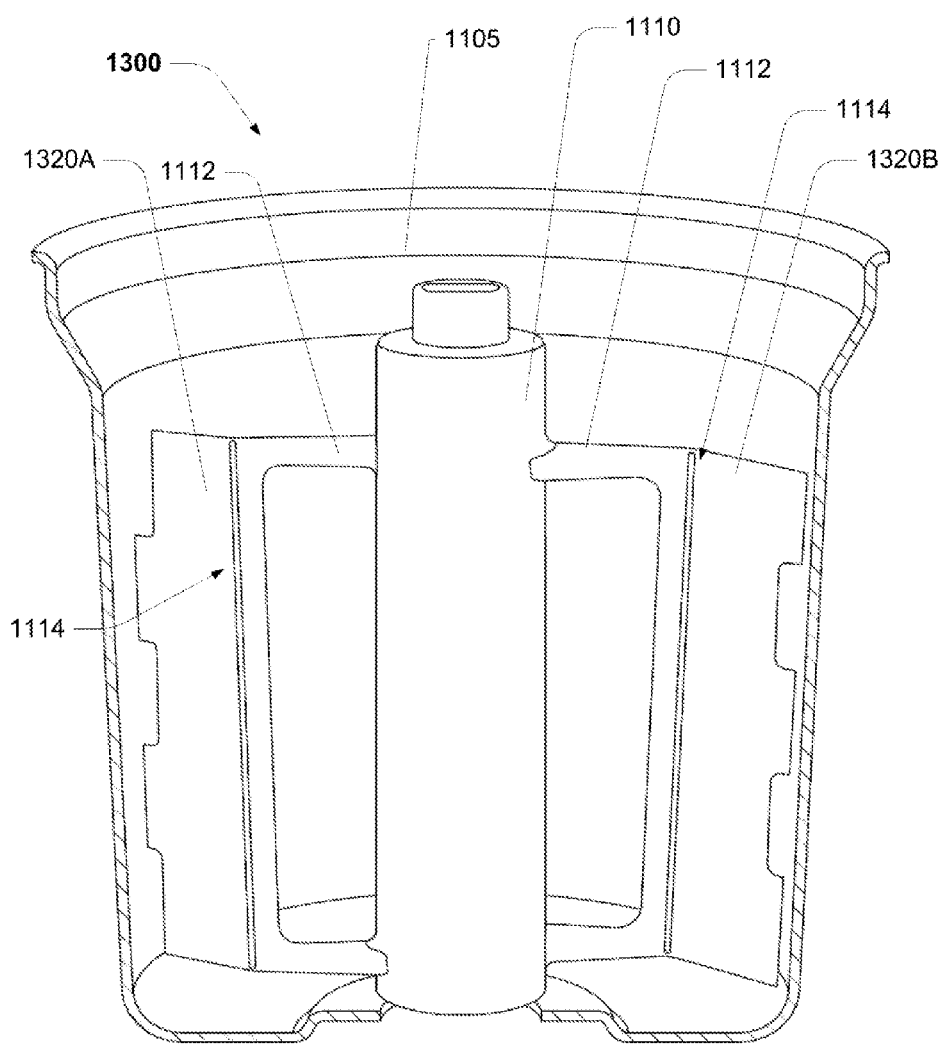
FIG. 55 shows the embodiment scraping paddle of FIG. 54A, when used in a mixing vessel.
Figure 56A:
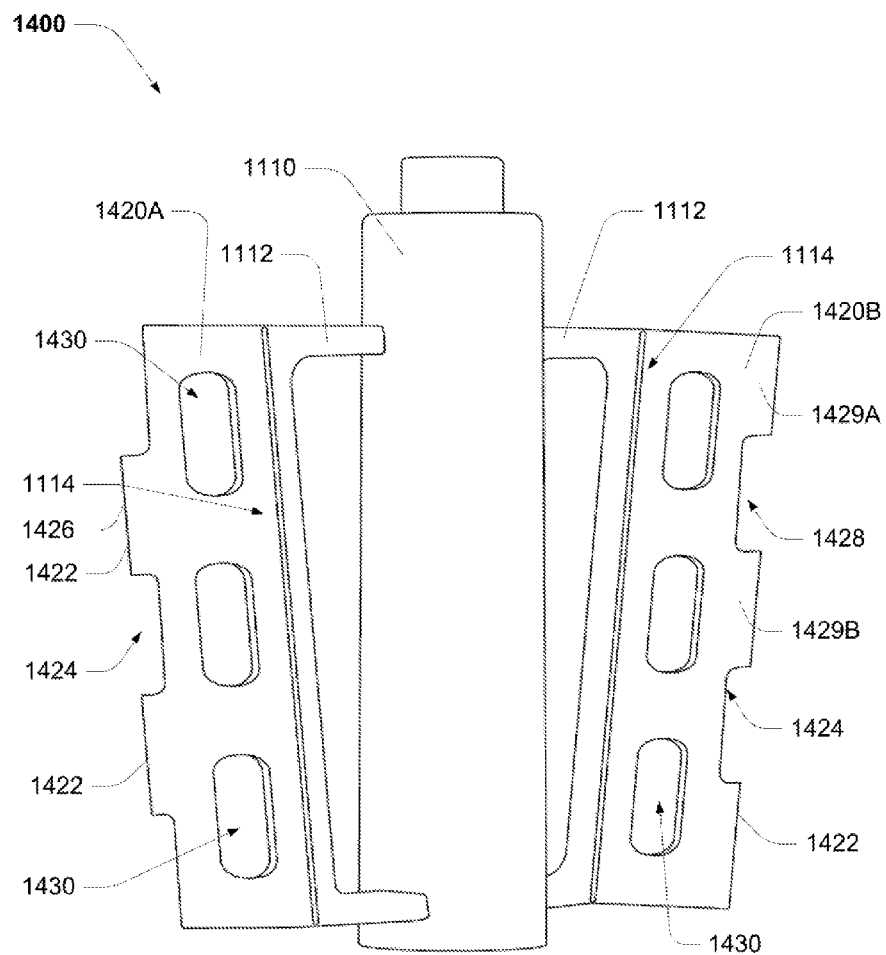
Figure 56B:
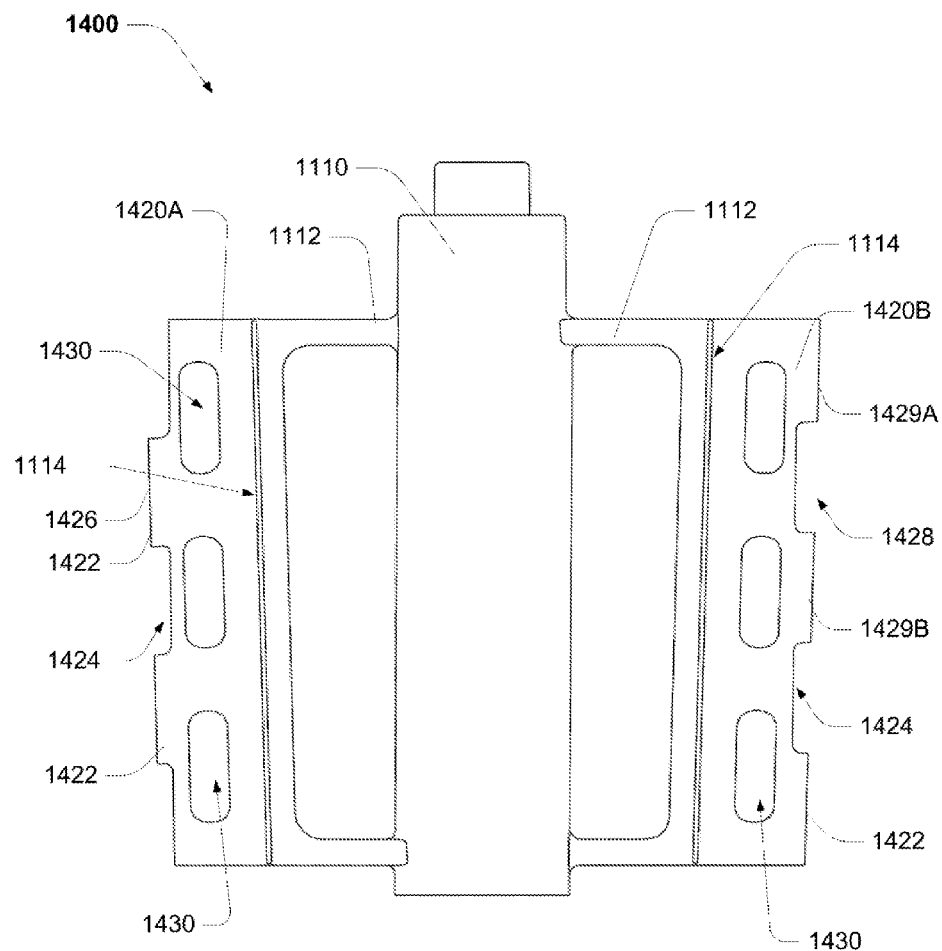
Figure 57:
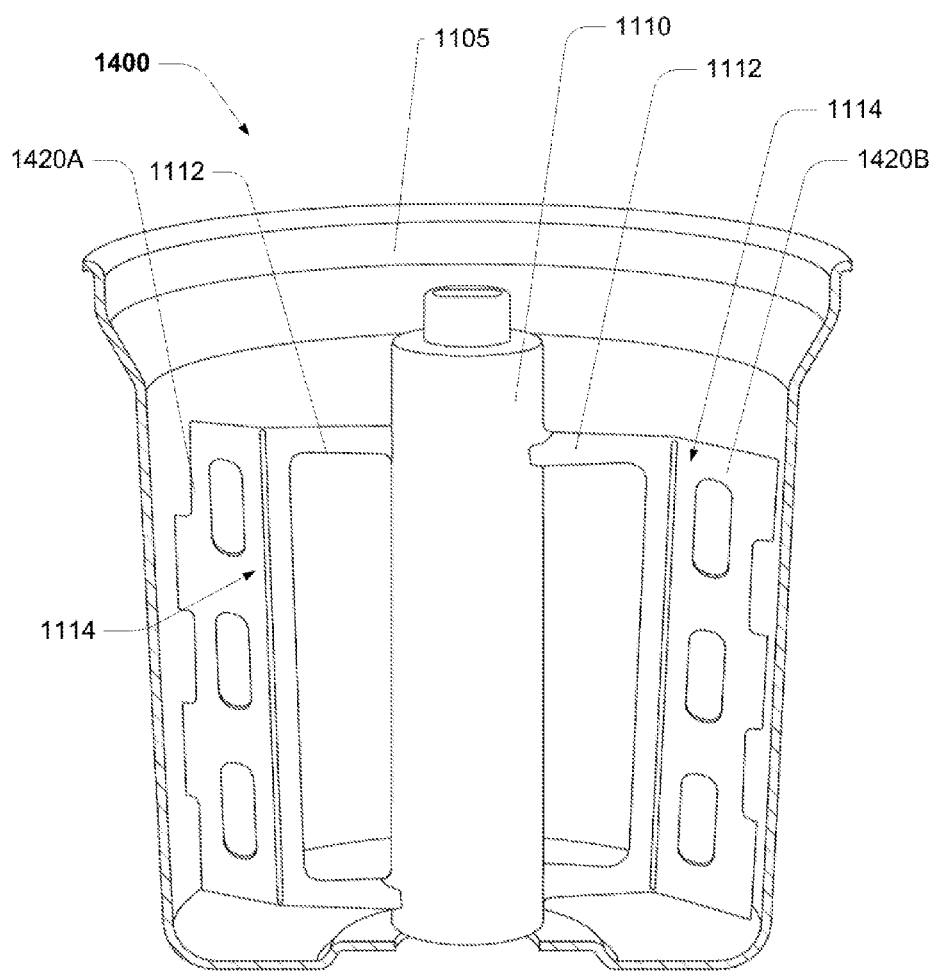
FIG. 57 shows the embodiment scraping paddle of FIG. 56A, when used in a mixing vessel.

FIG. 54A through FIG. 54E, shows an example embodiment scraping paddle 1300 for an ice cream making apparatus. In this embodiment, a pair of oppositely directed scraper element 1320A, 1320B are each coupled to a respective arm 1112 by a living hinge 1114. Each scraper element defines one or more (or a plurality) scraping edges 1322 with intermediate voids 1324. The scraping edges 1322 are radially outwardly biased by or using the living hinge for providing abutting engagement with a vessel (or bowl) 1105 as shown in FIG. 55.

In this embodiment, the scraping edges (or portions) 1322 are spaced along the scraper element to respectfully define a plurality of scraping regions about the circumference of the vessel. The scraping edges or portions (for example 1326) of a first scraping element is located along the respective scraping element 1320A to scrape a portion of the circumference of the bowl left unscraped by the void 1328 defined between adjacent scraper portions 1329A, 1329B.

FIG. 58A through FIG. 58E, shows an example embodiment scraping paddle 1400 for an ice cream making apparatus. In this embodiment, a pair of oppositely directed scraper elements 1420A, 1420B are each coupled to a respective arm 1112 by a living hinge 1114. Each scraper element defines one or more (or a plurality) scraping edges 1422 with intermediate voids 1424. The scraping edges 1422 are radially outwardly biased by or using the living hinge for providing abutting engagement with a vessel (or bowl) 1105 as shown in FIG. 58.

In this embodiment, the scraping edges (or portions) 1422 are spaced along the scraper element to respectfully define a plurality of scraping regions about the circumference of the vessel. The scraping edges or portions (for example 1426) of a first scraping element is located along the respective scraping element 1420A to scrape a portion of the circumference of the bowl left unscraped by the void 1428 defined between adjacent scraper portions 1429A, 1429B.

In this embodiment, by way of example only, a plurality of through apertures 1430 are defined by the scraper element 1420A and/or 1420B for provide additional flexibility and allow passage of mixture/fluid there through.

Front Loading Ice-Cream Maker

Figure 58:
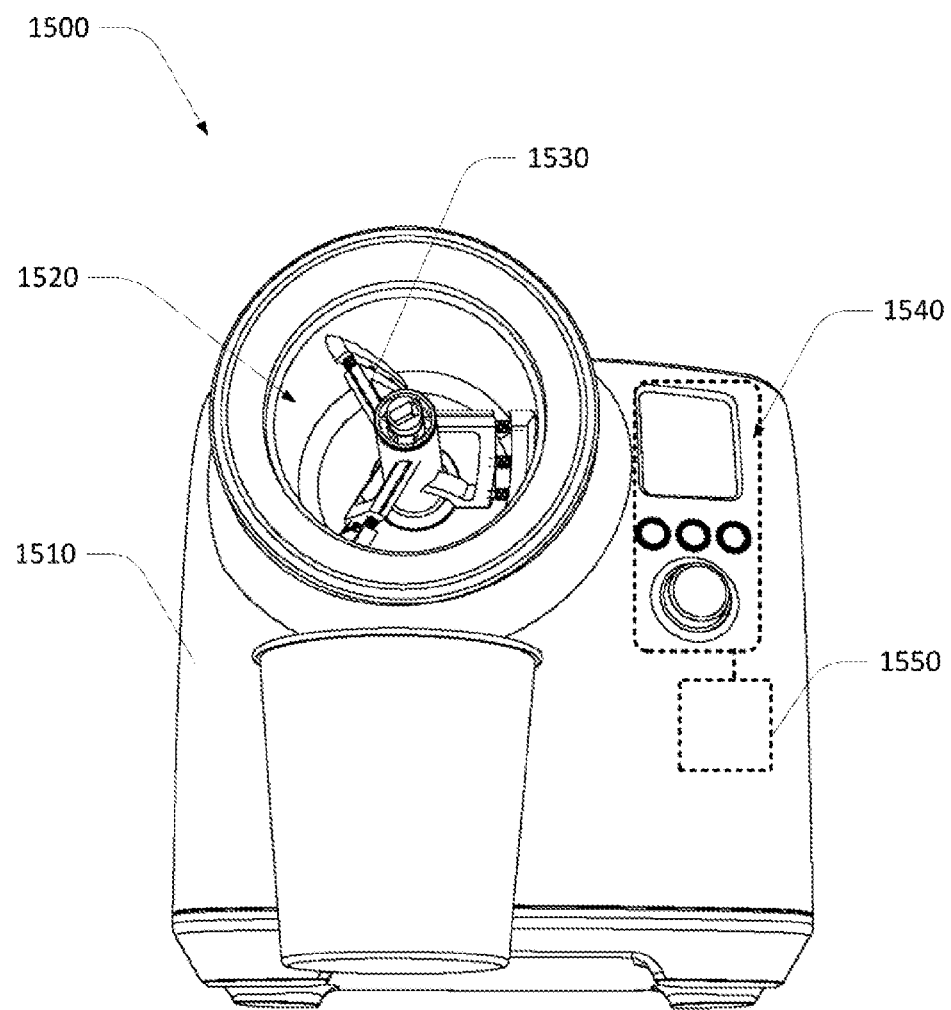
FIG. 58 shows an embodiment front loading ice-cream maker.

FIG. 58 shows an embodiment front loading ice-cream (or frozen dessert) maker 1500. The embodiment front loading ice cream maker 1500 is a domestic ice cream maker with an automatic dispensing feature.

It will be appreciated that by placing the chamber/bowl horizontally, it is possible to control the direction in which the dessert mixture is directed. For example, the mixture can be drawn inward or pushed outward by the paddle. This allows the frozen dessert to be automatically dispensed once churning is complete.

In this embodiment, the front loading ice cream maker 1500 includes a body 1510 that supports a horizontally directed mixing chamber/bowl 1520. A mixing paddle 1530 rotates within the mixing chamber for churning the frozen dessert, and dispensing the frozen dessert when churning is complete. A user interface 1540 is provided to enable user selection of input parameters used to make the frozen dessert, which is coupled to a controller module 1550 (for example—a processor, an integrated circuit and/or printed circuit board).

Figure 59:
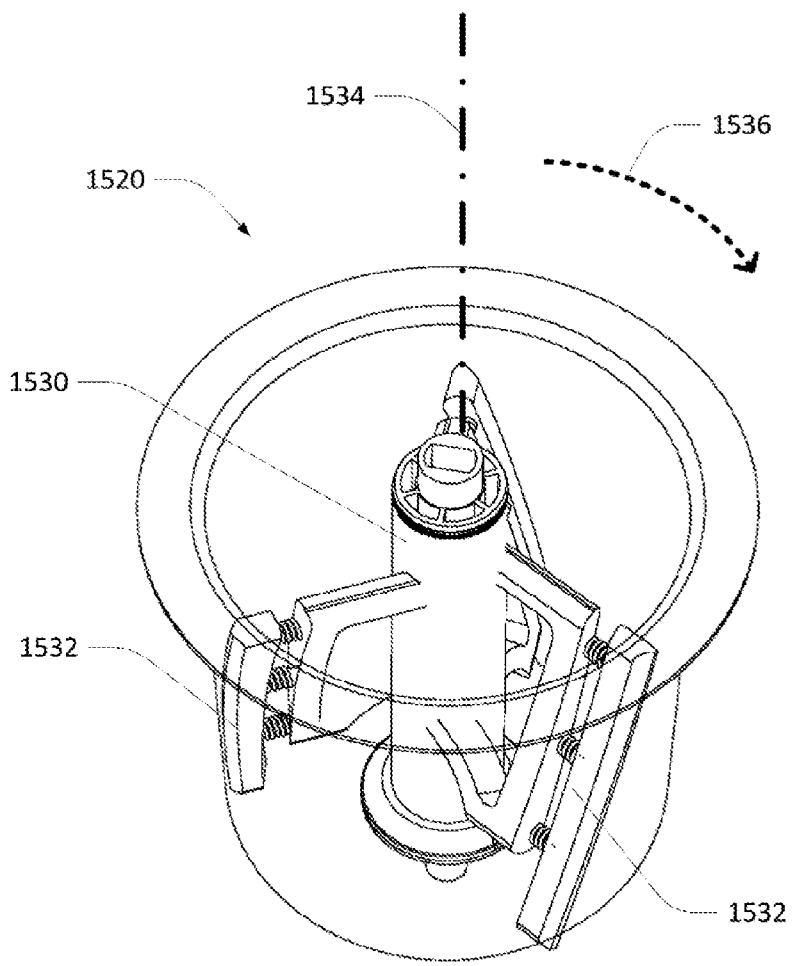
FIG. 59 shows an embodiment removable bowl with scraping paddle.

FIG. 59 shows an enlarged view of the mixing chamber/bowl 1520 and associated mixing paddle 1530. In this embodiment all scraping blades 1532 of the mixing paddle 1530 are angled or directed in the same direction with respect to the central axis 1534 of the mixing paddle. In this embodiment, clockwise rotation 1536 of the paddle (when viewed from the opening of the mixing chamber/bowl) will result in ingredients being pushed towards the opening.

Figure 60:
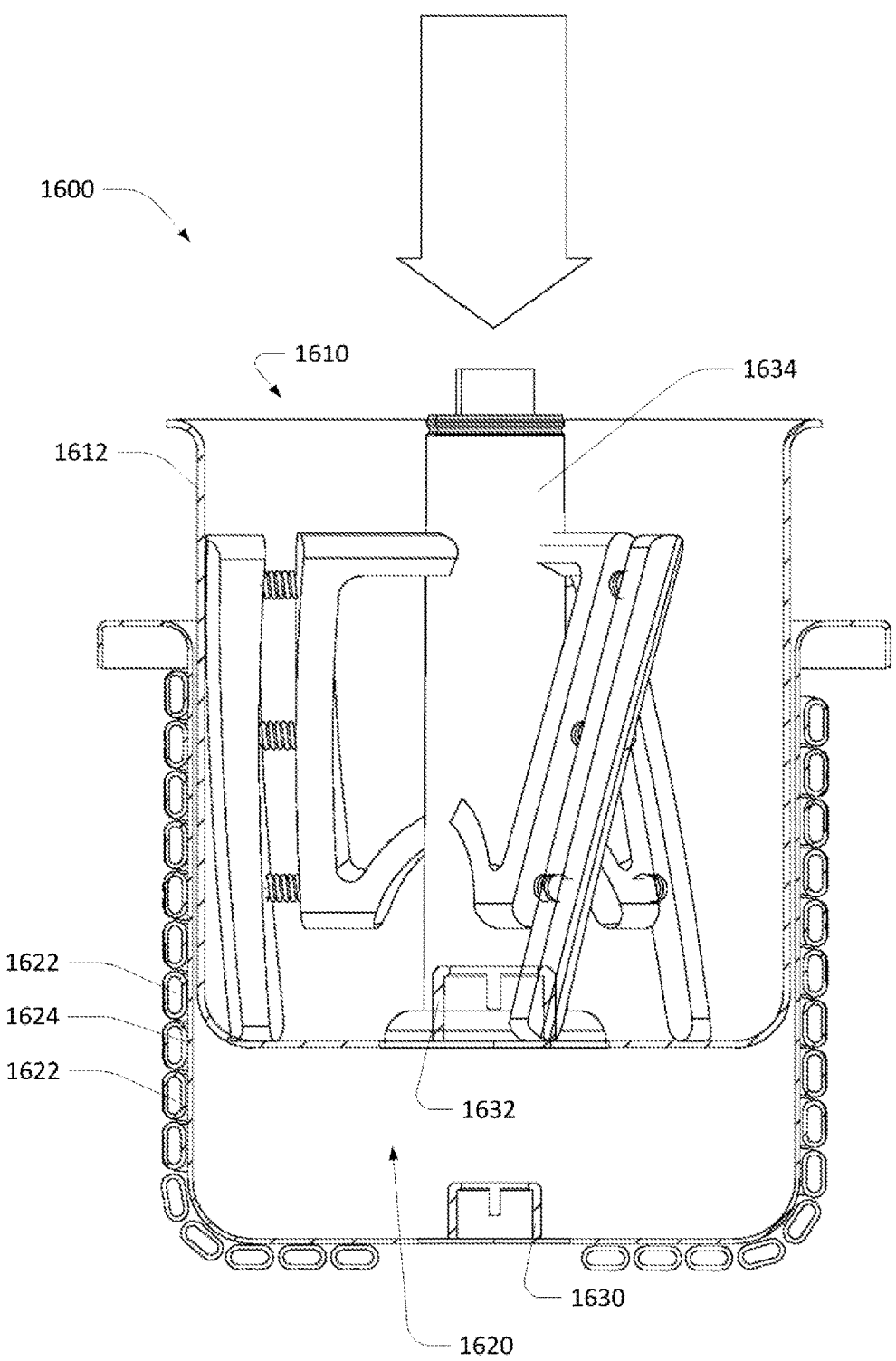
FIG. 60 shows an embodiment removable bowl with scraping paddle.

FIG. 60 shows an embodiment 1600 partial construction of an ice cream maker. In this embodiment, a removable bucket 1610 allows the frozen dessert to be transferred to a freezer. The removable cooling bucket typically has a thin metal wall 1612 and can be received in a cooling chamber 1620 of the embodiment ice cream maker. Cooling coils 1622 are located about the cooling chamber for carrying a refrigerant used to cool the chamber. It will be appreciated that it is beneficial to cool the mixture quickly whilst churning to restrict growth of ice crystal. By way of example only, locating the removable bucket 1610 into the a cooling chamber 1620 causes the drive coupling elements 1630, 1632 to engage for enabling turning of the paddle 1634.

A disadvantage of this embodiment is the air gaps between the cooling coils 1622 and the cooling chamber wall 1624, and also the cooling chamber wall 1624 and the removable bucket wall 1612. This can degrade the ability of the cooling coils to extract heat from the bucket.

Figure 61:
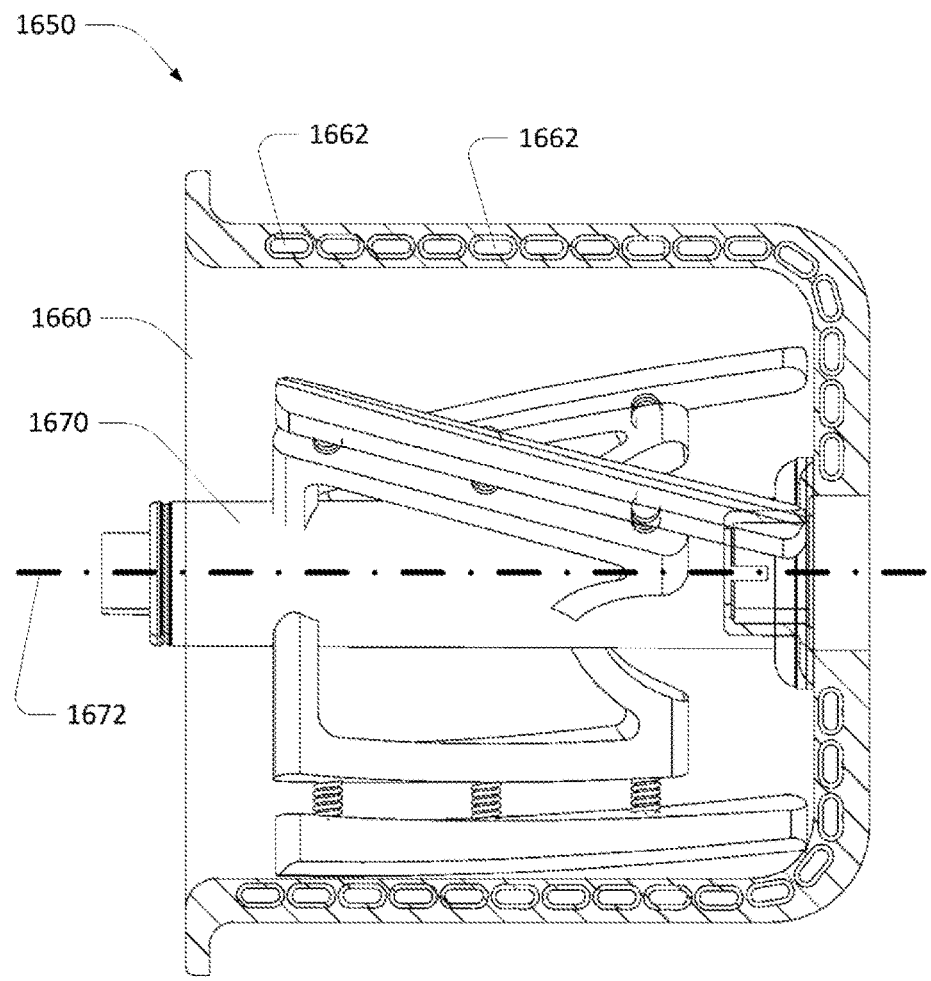
FIG. 61 shows an embodiment removable bowl with scraping paddle.

FIG. 61 shows a partial embodiment 1650 ice cream maker, utilising a mixing bucket 1660 having embedded cooling coils 1662. In this embodiment, the bucket is a die-cast thermo block cooling chamber. Stainless steel or copper cooling coils can be embedded into the die-cast chamber (for example made of aluminium) during a manufacturing process.

An advantage of this embodiment is that there maintains a physical contact between the cooling coils and the die-cast thermo block cooing chamber. An ice cream maker having a front load geometry mixing chamber allows for auto dispensing of the frozen dessert, which further removes the necessity of a removable bucket. In this embodiment, the mixing paddle 1670 has a horizontal central axis of rotation 1672

Figure 62:
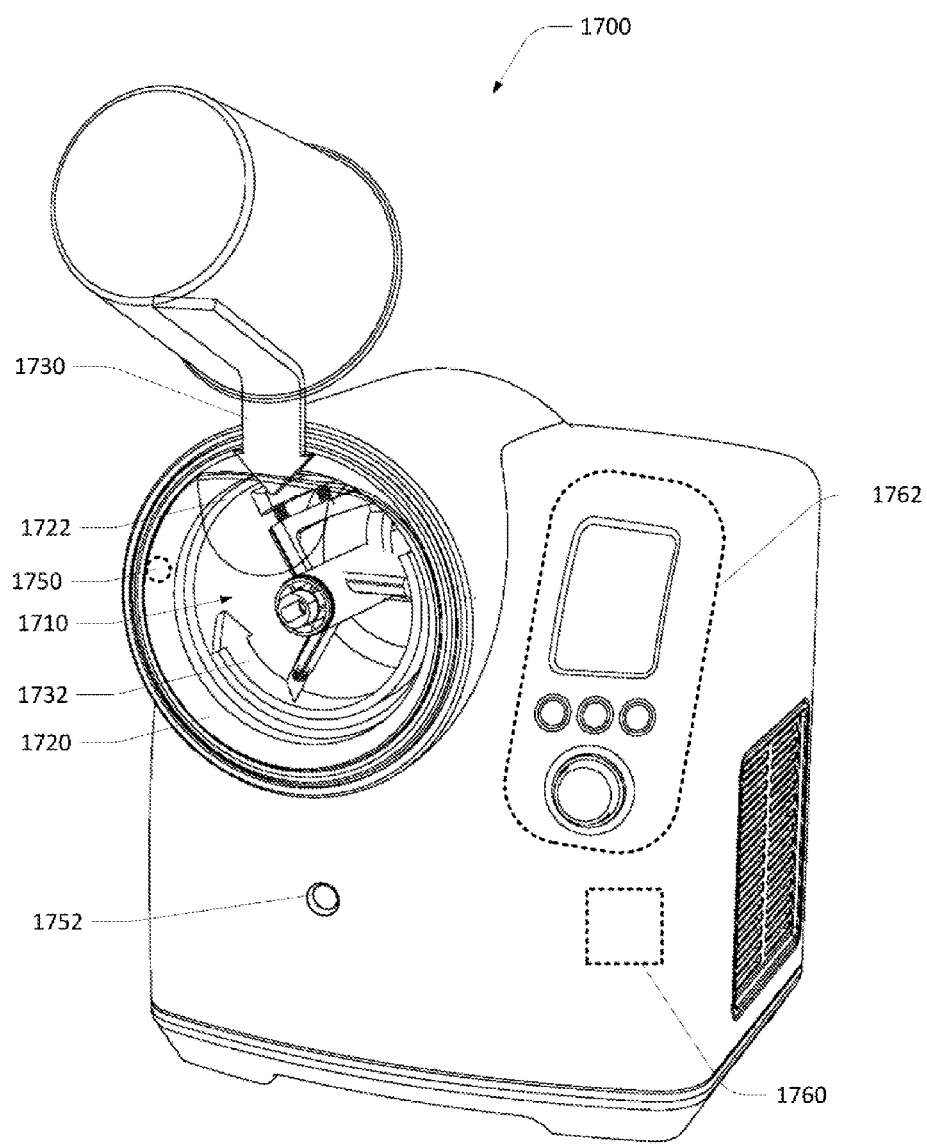
FIG. 62 shows an embodiment front loading ice-cream maker, when receiving a mixture.
Figure 63:
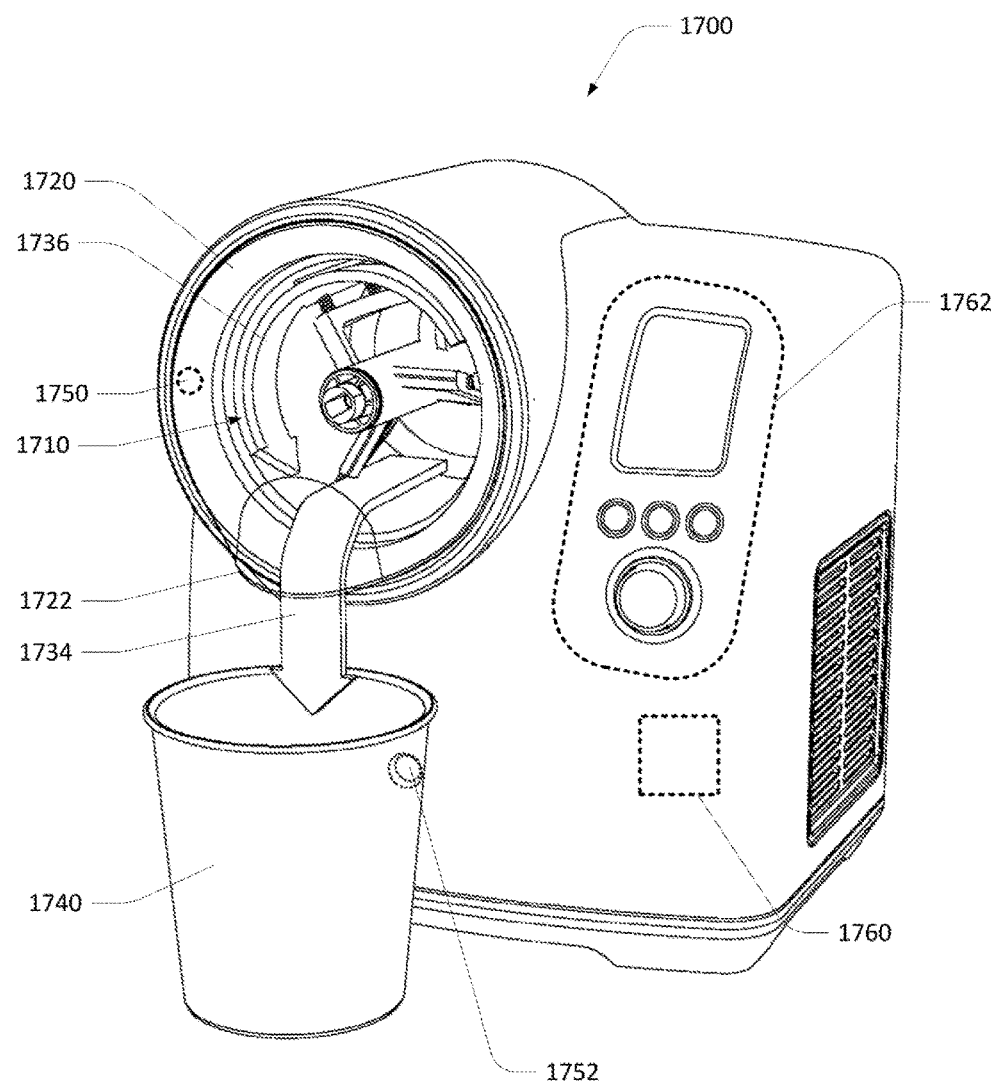
FIG. 63 shows an embodiment front loading ice-cream maker, when dispensing ice-cream.

FIG. 62 and FIG. 63 show an embodiment automatic ice cream maker 1700. The mixing chamber 1710 is horizontally directed and includes a movable/rotatable lid 1720. The lid defines a receiving (and/or dispensing) aperture 1722. The lid can be rotated to a "fill" configuration as shown in FIG. 62 or a "dispense" configuration as shown in FIG. 63.

In the "fill" configuration the aperture 1722 faces upwardly for receiving an input mixture. The fill aperture 1722 allows a mixture to enter 1730 the mixing chamber. It would be appreciated that the mixing paddle can rotate 1732 in a direction that draws the frozen dessert into the chamber and away from the lid.

In the "dispense" configuration, the aperture 1722 faces downward to allow frozen dessert to be dispensed 1734 into a receiving receptacle 1740. It would be appreciated that the mixing paddle can rotate 1736 such that the frozen dessert is pushed towards the lid and egress through the aperture.

It would be appreciated that the rotation of the lid can be manual or motorised.

Upon manual rotation of the lid to the "fill" configuration, which can be detected by a location sensor (or configuration sensor) 1750 to provide a signal to the controller to controller (or processor) 1760 to configure rotation of the motor in a direction that pulls ingredients to the back of the chamber. Any proximity sensor (e.g. 1752) for detecting a receiving receptacle can be disregarded when in the fill configuration.

The apparatus having motorised rotation of the lid can default to the "fill" configuration. A fill selector (or button) on a user interface 1762 may also be used to rotate the lid into this configuration, for example from the "dispense" configuration. The lid is maintained in the "fill" configuration when the frozen dessert is churning. When a location sensor (or configuration sensor) 1750 detects the lid being in the fill configuration, the controller/processor configures the paddle to rotate in a direction that will cause the frozen dessert to be pulled to the back of the chamber.

Upon manually rotating the lid to the "dispense" configuration, a configuration sensor can automatically cause the controller/processor to rotate in an opposite direction to dispense the frozen dessert. It would be appreciated that in a preferred embodiment, a proximity sensor would detect an object 1740 (e.g., container, bowl, cone, etc. . . . ) under the dispenser aperture, and be coupled to the processor such that dispensing only occurs when a receptacle is detected.

For embodiments with motorised rotation of the lid, a dispense selector (or button) on a user interface 1762 can be activated, causing a motor to rotate the lid to the dispense configuration. Once in the dispense configuration, in an example embodiment, the paddle will only be rotated to dispense the frozen dessert when a proximity dispenser detects a receptacle under the dispensing aperture. It would be appreciated that the user display can prompt a user to locate a suitable bowl for collection of frozen dessert. In some embodiments, the lid would not be rotated to the dispensed configuration until a suitable receptacle is detected by the proximity sensor.

The proximity sensor can operate independently of the receptacle, or cooperate with an element of the receptacle, for example an ultrasonic sensor, a photo resistive sensor, an RFID tag/reader etc. The location sensor can cooperate between the lid and the body, for example a reed switch.

Figure 64:
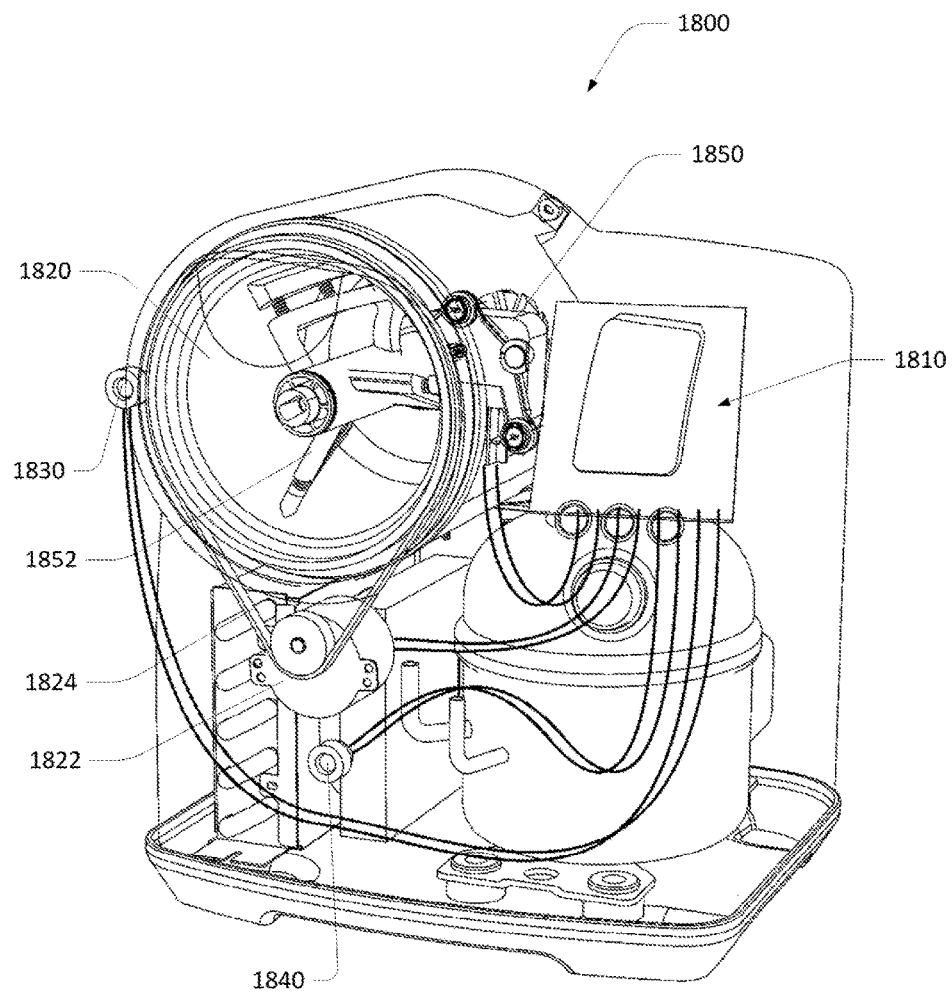
FIG. 64 shows a partial view of an embodiment front loading ice-cream maker.

FIG. 64 shows an embodiment ice cream maker 1800. This embodiment incorporates a processor/controller 1810 for controlling rotation of a lid 1820 that is rotated via a motor 1822 coupled to the lid by a belt drive 1824. In this example, the belt drive engages a circumferential groove or surface defined about the perimeter of the lid 1820.

A lid configuration sensor 1830 (for example an electronic reed switch) is coupled to the processor for enabling detection of the lid configuration.

A proximity sensor 1840 is coupled to the processor to identify a receptacle being provided for receiving dispensed frozen dessert.

A paddle drive assembly 1850 is also coupled to the processor for controlling rotation speed and direction of the paddle 1852.

Figure 65:
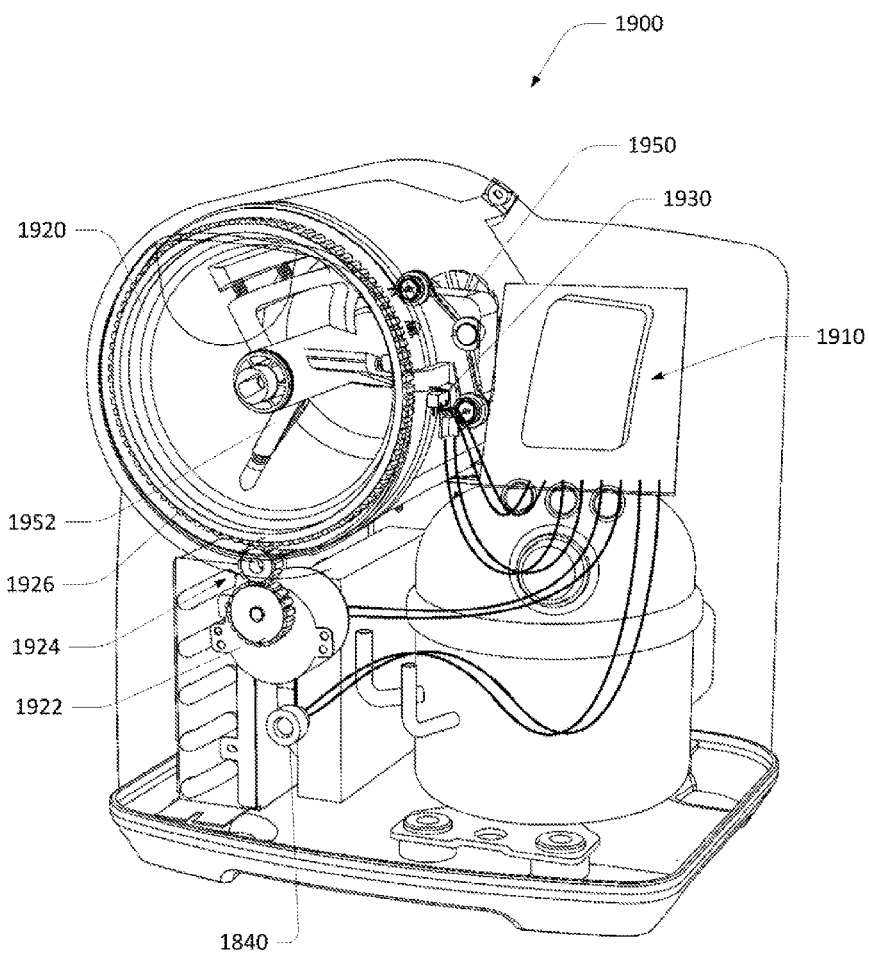
FIG. 65 shows a partial view of an embodiment front loading ice-cream maker.

FIG. 65 shows an embodiment ice cream maker 1900. This embodiment incorporates a processor/controller 9810 for controlling rotation of a lid 1920 that is rotated via a motor 1922 coupled to the lid by a gear drive 1924. In this example, the gear drive engages a circumferential gear defined about the perimeter of the lid 1920.

A lid configuration sensor 1930 (for example an electronic reed switch) is coupled to the processor for enabling detection of the lid configuration.

A proximity sensor 1940 is coupled to the processor to identify a receptacle being provided for receiving dispensed frozen dessert.

A paddle drive assembly 1950 is also coupled to the processor for controlling rotation speed and direction of the paddle 1952.

It will be appreciated that:

A centrally rotatable lid, can rotate about a horizontal axis in an ice cream maker to facilitate receiving a frozen dessert pre-mix or the dispensing of the frozen dessert.

The rotatable lid can be operatively associated with a location sensor to detect lid position, which is in communication with the motor controller. The motor can spin in a pre-determined direction depending on lid position.

The rotatable lid can be operatively associated with a proximity sensor to detect an object in the dispensing zone, which is in communication with the motor controller. The motor may only spin in the direction to cause the dispensing of the frozen dessert when it senses a receptacle.

The rotatable lid is motorised to allow for one touch frozen dessert dispensing.

A scraping paddle in an ice cream maker can include a live hinge, which is cost effective and easier to clean. The paddle/live hinge can be angled with respect to the central axis of the mixing bucket/bowl to cause frozen dessert to be either pushed up or drawn down depending on direction of rotation of the paddle.

An ice-cream maker can include cast-in cooling coils (for example provided in an aluminium casting) for direct cold transfer.

An ice-cream maker can include a mixing bucket/bowl that is orientated horizontally for facilitating automatic-dispensing/self-dispensing of frozen dessert, in cooperation with a paddle.

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. An apparatus for making a frozen dessert, the apparatus including: a chassis; a reservoir located within the chassis for receiving a liquid dessert mixture to be cooled: a rotatable paddle located within the reservoir, the paddle being adapted to rotate about an axis within the reservoir; a drive motor for driving rotation of the paddle; a control module for controlling the drive motor to rotate the paddle; wherein the reservoir and the axis of rotation are horizontally directed; and the apparatus further including: a lid that closes an opening of the reservoir, the lid defining an aperture for receiving the mixture; and wherein the lid rotates with respect to a horizontal axis, such that the aperture can be directed upwardly to a fill configuration for receiving the mixture and directed downwardly to a dispense configuration for enabling egress of the frozen dessert.

2. The apparatus according to claim 1, the apparatus further including:
a first sensor coupled to the control module for detecting if the lid is in the fill configuration or the dispense configuration.

3. The apparatus according to claim 2, wherein the control module will control rotation direction of the paddle based on a detected lid configuration.

4. The apparatus according to claim 1, the apparatus further including:
a second sensor coupled to the control module for detecting proximity of a vessel for receiving the frozen dessert.

5. The apparatus according to claim 1, the apparatus further including:
a second motor controlled by control module, the second motor being coupled to the lid such that operation of the second motor enables rotation of the lid to either the fill configuration or the dispense configuration.

6. The apparatus according to claim 5, the apparatus further including: a second sensor coupled to the control module for detecting proximity of a vessel for receiving the frozen dessert.

7. The apparatus according to claim 6, wherein the control module will control rotation of the lid only when the vessel is detected.

8. The apparatus according to claim 5, wherein the apparatus further includes: a dispense selector on a user interface for causing the second motor to rotate the lid to the dispense configuration; a user display that prompt a user to locate a suitable bowl for collection of frozen dessert.

9. The apparatus according to claim 5, wherein the second motor is coupled to the lid by a belt drive that engages a circumferential surface defined about the perimeter of the lid.

10. The apparatus according to claim 5, wherein the second motor is coupled to the lid by a gear drive that engages a circumferential gear defined about the perimeter of the lid.

11. The apparatus according to claim 1, wherein the paddle has a body coupled to at least one respective scraper element by a living hinge, such that the scraper element has a scraping edge that is radially-outward biased by the living hinge for abuttingly engaging a wall of the reservoir.

12. The apparatus according to claim 1, wherein off-axis camber of the scraper element and selective rotation direction of the paddle can cause the mixture to be directed toward or away from the base.

13. The apparatus according to claim 1, wherein the control module will control rotation direction of the paddle to cause egress of the frozen dessert only when the vessel is detected.

14. The apparatus according to claim 1, wherein the control module is networked to a least one other processor in a networked deployment.

* * * * *